(12) United States Patent
Hattori et al.

(10) Patent No.: US 7,293,018 B2
(45) Date of Patent: *Nov. 6, 2007

(54) APPARATUS, METHOD, AND PROGRAM FOR RETRIEVING STRUCTURED DOCUMENTS

(75) Inventors: Masakazu Hattori, Yokohama (JP);
Takuya Kanawa, Yokohama (JP);
Katsuhiko Nonomura, Ichikawa (JP);
Hiroshi Niina, Kawasaki (JP); Shozo Isobe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 468 days.

This patent is subject to a terminal disclaimer.

(21) Appl. No.: 10/973,869

(22) Filed: Oct. 27, 2004

(65) Prior Publication Data

US 2005/0060306 A1 Mar. 17, 2005

Related U.S. Application Data

(63) Continuation of application No. 10/107,066, filed on Mar. 28, 2002, now Pat. No. 6,889,223.

(30) Foreign Application Priority Data

Mar. 30, 2001 (JP) ............................. 2001-099973

(51) Int. Cl.
G06F 17/30 (2006.01)
(52) U.S. Cl. ............................. 707/3; 707/4; 707/100
(58) Field of Classification Search ...................... 707/3
See application file for complete search history.

(56) References Cited

U.S. PATENT DOCUMENTS

| 5,682,539 | A | | 10/1997 | Conrad et al. | |
|---|---|---|---|---|---|
| 6,094,649 | A | * | 7/2000 | Bowen et al. | 707/3 |
| 6,510,434 | B1 | * | 1/2003 | Anderson et al. | 707/100 |
| 6,684,204 | B1 | * | 1/2004 | Lal | 707/3 |
| 6,721,727 | B2 | * | 4/2004 | Chau et al. | 707/3 |
| 6,959,416 | B2 | * | 10/2005 | Manning et al. | 715/513 |
| 2002/0022956 | A1 | | 2/2002 | Ukrainczyk et al. | |

FOREIGN PATENT DOCUMENTS

| JP | 7-44567 | 2/1995 |
|---|---|---|
| JP | 2000-90091 | 3/2000 |
| JP | 2001-14326 | 1/2001 |

OTHER PUBLICATIONS

Notification of Reasons for Rejection JP 2001-099973.
U.S. Appl. No. 09/714,627, filed Nov. 17, 2000, to Hattori et al.

* cited by examiner

*Primary Examiner*—Jeffrey Gaffin
*Assistant Examiner*—Christyann Pulliam
(74) *Attorney, Agent, or Firm*—Finnegan, Henderson, Farabow, Garrett & Dunner, L.L.P.

(57) ABSTRACT

When a retrieval condition including a first desired word and a first desired component including a value in which the first desired word is included, is inputted, a first detecting device detects second desired components each being similar to the first desired component, an acquiring device acquirers second desired words each being similar to the first desired word, a first retrieving device retrieves first structured documents each including a first component including a value in which one of the first desired word and the second desired words is included, a second retrieving device retrieves second structured documents each including a second component corresponding to one of the first desired component and the second desired components and including or corresponding to the first component.

14 Claims, 66 Drawing Sheets

```
<Patent>
  <Title>XML data base</Title>
  <Date of application><Year>2000</Year><Month>10</Month><Day>10</Day>
    </Date of application>
  <Applicant>T company</Applicant>
  <Abstract>Provides database for systematically managing XML</Abstract>
</Patent>
```

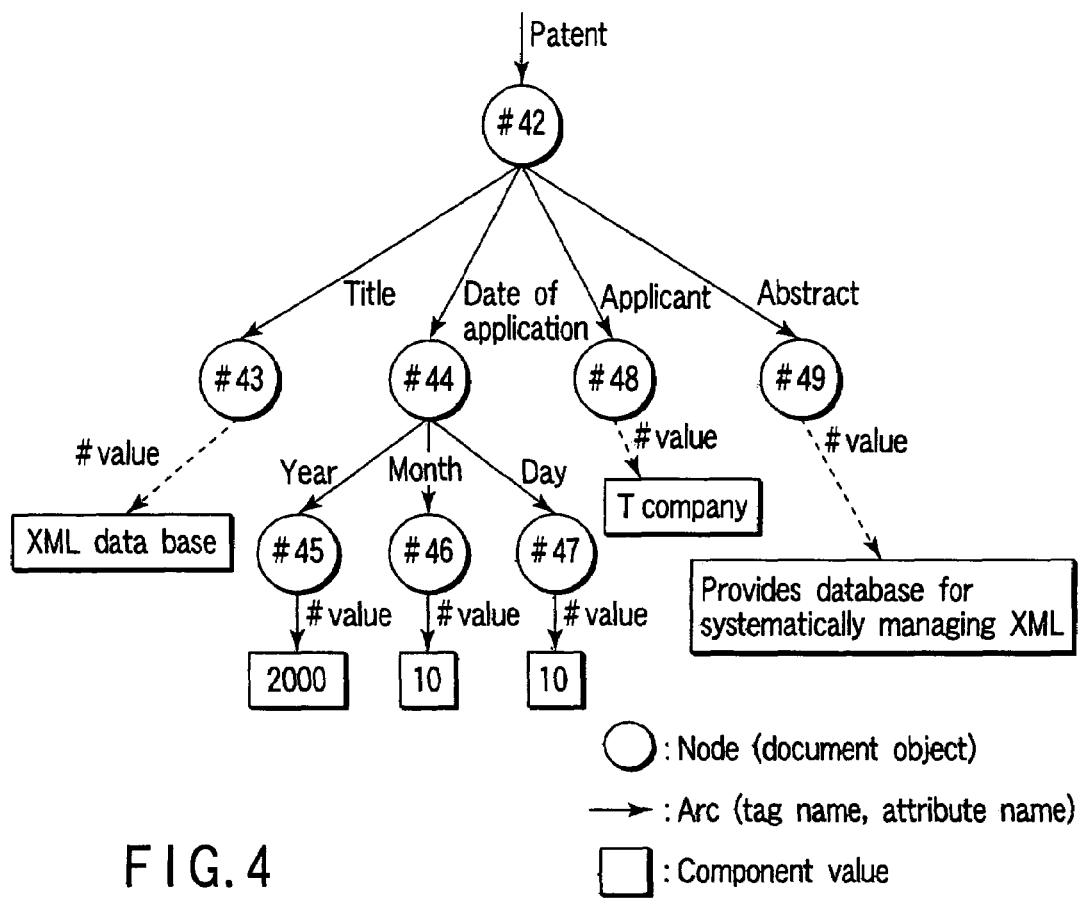
FIG. 4
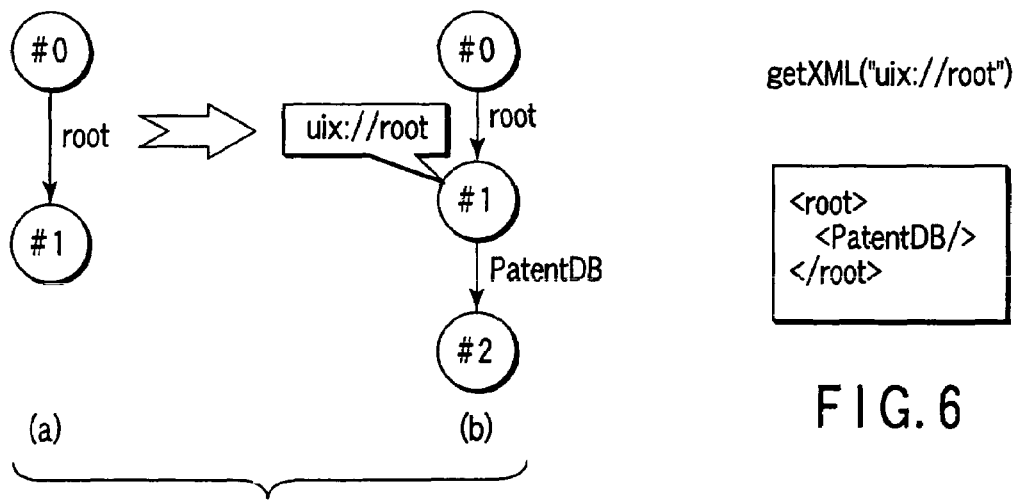
FIG. 5
FIG. 6

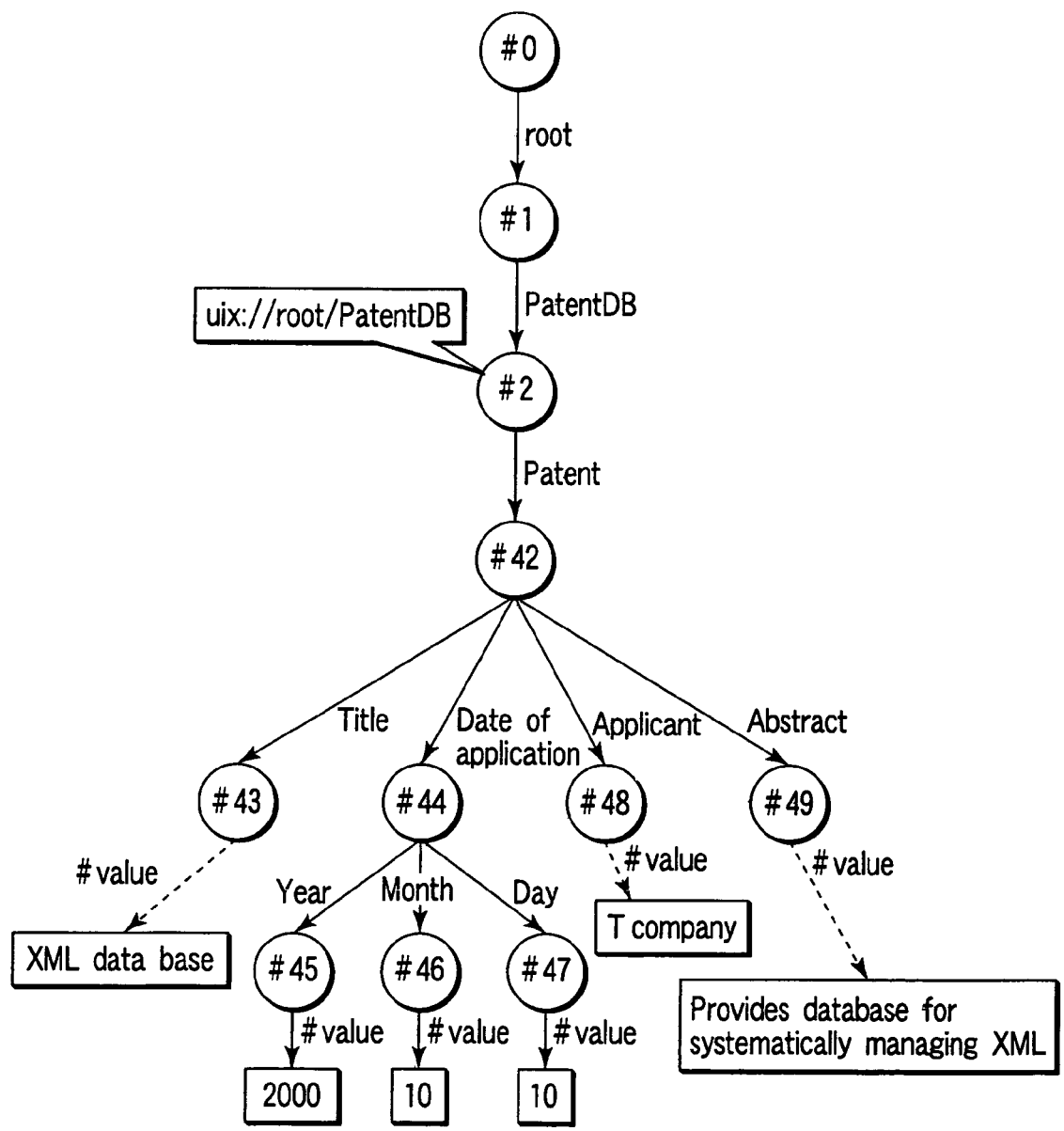
F I G. 7 getXML("uix://root/PatentDB")

```
<PatentDB>
  <Patent>
    <Title>XML data base</Title>
    <Date of application><Year>2000</Year><Month>10</Month>
      <Day>10</Day></Date of application>
    <Applicant>T company</Applicant>
    <Abstract>Provides database for systematically managing XML
      </Abstract>
  </Patent>
  <Patent>
    ...
  </Patent>
  <Patent>
    ...
  </Patent>
</PatentDB>
```

FIG. 11

```
<Schema>
  <ElementType name="Patent" content="eltOnly">
    <group order="seq">
      <element type="Title"/>
      <element type="Date of application"/>
      <element type="Applicant"/>
      <element type="Abstract"/>
    </group>
  </ElementType>
  <ElementType name="Title"content="textOnly"/>
  <ElementType name="Applicant"content="textOnly"/>
  <ElementType name="Abstract"content="textOnly"/>
  <ElementType name="Year"content="textOnly"/>
  <ElementType name="Month"content="textOnly"/>
  <ElementType name="Day"content="textOnly"/>
  <ElementType name="Date of application"content="eltOnly"/>
    <group order="seq">
      <element type="Year"/>
      <element type="Month"/>
      <element type="Day"/>
    </group>
  </ElementType>
</Schema>
```

FIG. 12

```
<Concept name="Information model">
  <Concept name="Document">
    <Concept name="Structured document">
      <Concept name="XML"/>
      <Concept name="SGML"/>
    </Concept>
    <Concept name="Non structured document">
      <Concept name="Text"/>
    </Concept>
  </Concept>
  <Concept name="Relation">
    . . . . . . . . .
  </Concept>
  <Concept name="Object">
    . . . . . . . . .
  </Concept>
</Concept>
```

FIG. 16

```
<Concept name="Information manipulation">
  <Concept name="Retrieval"/>
  <Concept name="Storage"/>
  <Concept name="Processing"/>
  <Concept name="Distribution">
</Concept>
```

FIG. 17

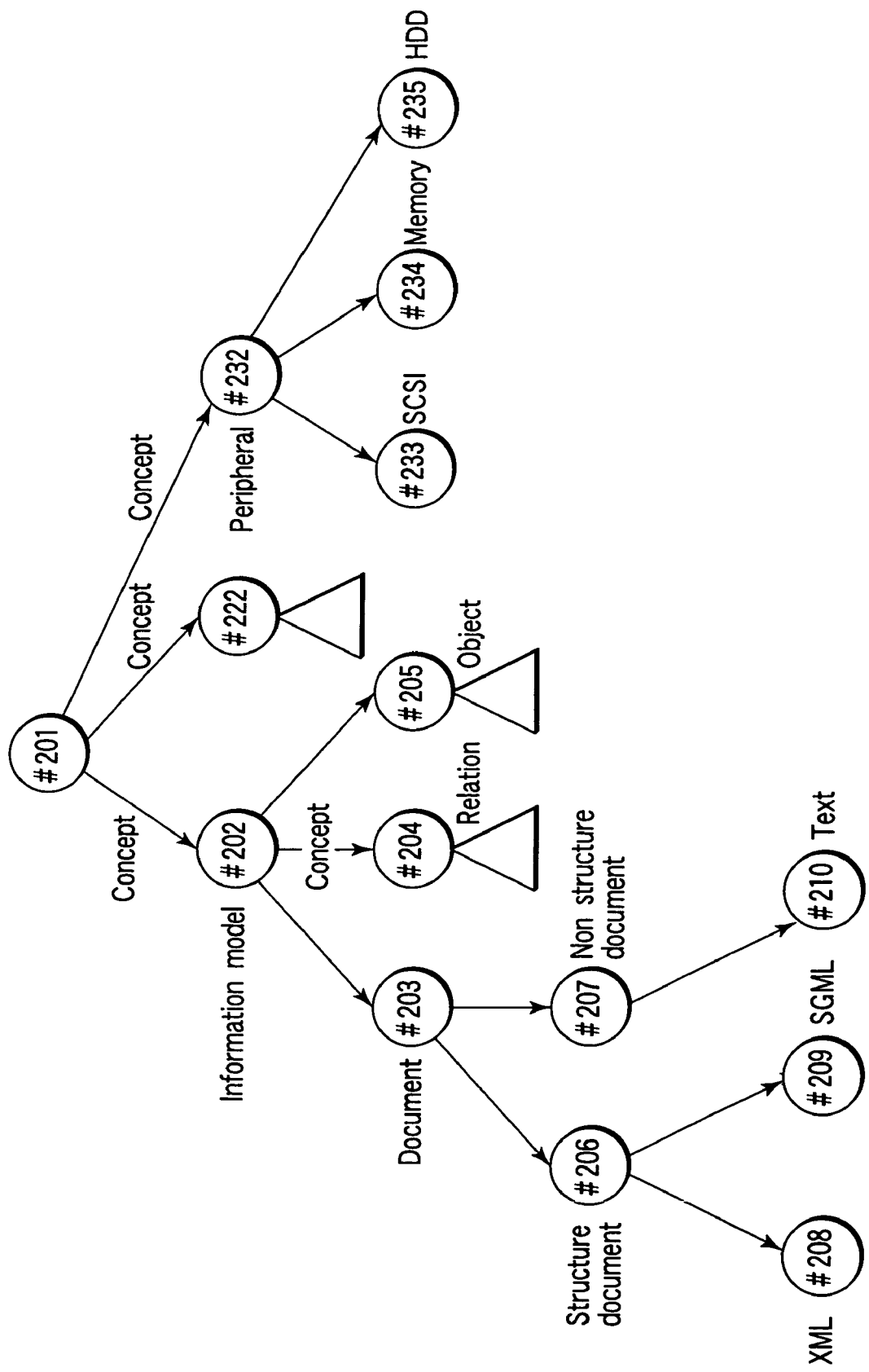
F I G. 19

Temporary file A
tmp000.xml

```
<Patent xmlns="x-schema:tmp001.xml">
  <Title>XML data base</Title>
  <Date of application><Year>2000</Year><Month>10</Month>
    <Day>10</Day></Date of application>
  <Applicant>T company</Applicant>
  <Abstract>Provides database for systematically managing XML
    </Abstract>
  <A>Data</A>
</Patent>
```

FIG. 22

Temporary file B
tmp001.xml

```
<Schema>
  <ElementType name="Patent" content="eltOnly">
    <group order="seq">
      <element type="Title"/>
      <element type="Date of application"/>
      <element type="Applicant"/>
      <element type="Abstract"/>
    </group>
  </ElementType>
  <ElementType name="Title"content="textOnly"/>
  <ElementType name="Applicant"content="textOnly"/>
  <ElementType name="Abstract"content="textOnly"/>
  <ElementType name="Year"content="textOnly"/>
  <ElementType name="Month"content="textOnly"/>
  <ElementType name="Day"content="textOnly"/>
  <ElementType name="Date of application"content="eltOnly"/>
    <group order="seq">
      <element type="Year"/>
      <element type="Month"/>
      <element type="Day"/>
    </group>
  </ElementType>
</Schema>
```

FIG. 23

Temporary file A
tmp000.xml

```
<Patent xmlns="x-schema:tmp001.xml">
  <Title>XML data base</Title>
  <Date of application><Year>2000</Year><Month>10</Month>
    <Day>10</Day></Date of application>
  <Applicant>T company</Applicant>
  <Abstract>Provides database for systematically managing XML
    </Abstract>
</Patent>
```

FIG. 24

Temporary file B
tmp001.xml

```
<Schema>
  <ElementType name="Patent" content="eltOnly">
    <group order="seq">
      <element type="Title"/>
      <element type="Date of application"/>
      <element type="Applicant"/>
      <element type="Abstract"/>
    </group>
  </ElementType>
  <ElementType name="Title"content="textOnly"/>
  <ElementType name="Applicant"content="textOnly"/>
  <ElementType name="Abstract"content="textOnly"/>
  <ElementType name="Year"content="textOnly"/>
  <ElementType name="Month"content="textOnly"/>
  <ElementType name="Day"content="textOnly"/>
  <ElementType name="Date of application"content="eltOnly"/>
    <group order="seq">
      <element type="Year"/>
      <element type="Month"/>
      <element type="Day"/>
    </group>
  </ElementType>
</Schema>
```

FIG. 25

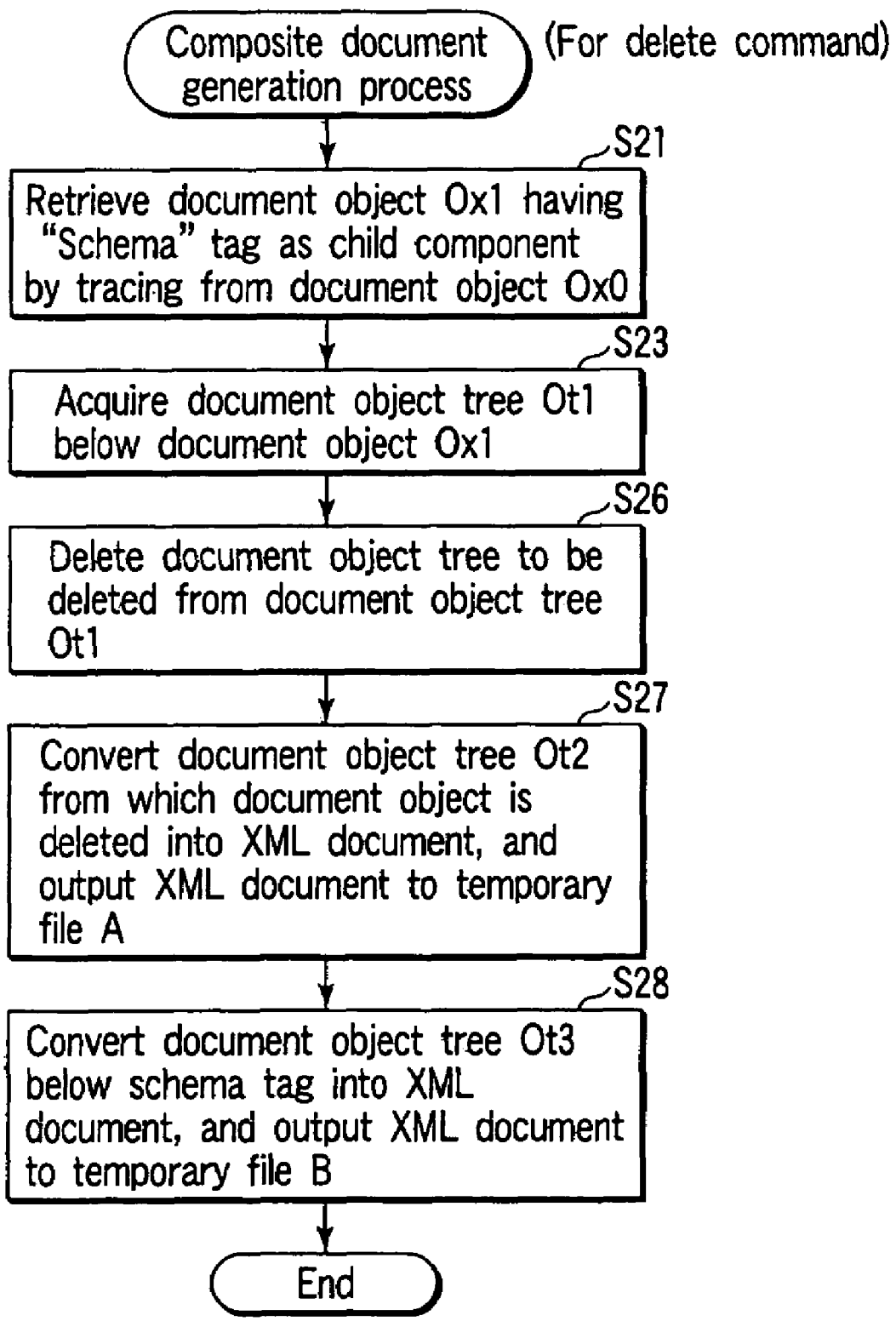
F I G. 28

Temporary file A
tmp000.xml

```
<Patent xmlns="x-schema:tmp001.xml">
  <Title>XML data base</Title>
  <Applicant>T company</Applicant>
  <Abstract>Provides database for systematically managing XML
    </Abstract>
</Patent>
```

F I G. 29

Temporary file B
tmp001.xml

```
<Schema>
  <ElementType name="Patent" content="eltOnly">
    <group order="seq">
      <element type="Title"/>
      <element type="Date of application"/>
      <element type="Applicant"/>
      <element type="Abstract"/>
    </group>
  </ElementType>
  <ElementType name="Title"content="textOnly"/>
  <ElementType name="Applicant"content="textOnly"/>
  <ElementType name="Abstract"content="textOnly"/>
  <ElementType name="Year"content="textOnly"/>
  <ElementType name="Month"content="textOnly"/>
  <ElementType name="Day"content="textOnly"/>
  <ElementType name="Date of application"content="eltOnly"/>
    <group order="seq">
      <element type="Year"/>
      <element type="Month"/>
      <element type="Day"/>
    </group>
  </ElementType>
</Schema>
```

F I G. 30

Undefined tag A appears
6th line : data</A>

```
<kf:query>
    <kf:select>
    Output format description field
    </kf:select>
    <kf:from>
    XML data bind description field
    </kf:from>
    <kf:where>
    Condition description field
    </kf:where>
</kf:query>
```

FIG. 39

Query for plain retrieval

```
<query>
 <kf:query>
   <kf:select>
      <result>
         <Title>$t</Title>
      </result>
   </kf:select>
   <kf:from path="/uix://root/PatentDB">
      <PatentDB>
         <Patent>
            <Title>$t</Title>
            <kf:star><Year>$y</Year></kf:star>
            <Abstract>$s</Abstract>
         </Patent>
      <PatentDB>
   </kf:from>
   <kf:where>
      <kf:cmp op="EQ" param1=$y" param2="1999"/>
      <kf:eval exp="MyLike($s,'PC')"/>
   </kf:where>
 </kf:query>
</query>
```

FIG. 40

```
<out>
 <result>
  <Title>Schema generating device</Title>
 <result>
 <result>
  <Title>Semi-structured data storage system</Title>
 <result>
 <result>
  <Title>Natural language retrieval device</Title>
 <result>
 <result>
  <Title>Data management system</Title>
 <result>
 ...
</out>
```

FIG. 41

Query for conceptual retrieval

```
<query>
 <kf:query>
    <kf:select>
       <result>
          <Title>$t</Title>
       </result>
    </kf:select>
    <kf:from path="/uix://root/PatentDB">
       <PatentDB>
          <Patent>
             <Title>$t</Title>
             <keywords>$k</keywords>
          </Patent>
       </PatentDB>
    </kf:from>
    <kf:from path="/uix://root/ConceptDB">
      <Concept name="Peripheral">
         <Concept name="$x"/>
      </Concept>
    </kf:from>
    <kf:where>
      <kf:or>
         <kf:cmp op="EQ" param1="$k" param2="Peripheral"/>
         <kf:cmp op="EQ" param1="$k" param2="$x"/>
      </kf:or>
    </kf:where>
 </kf:query>
<query>
```

F I G. 42

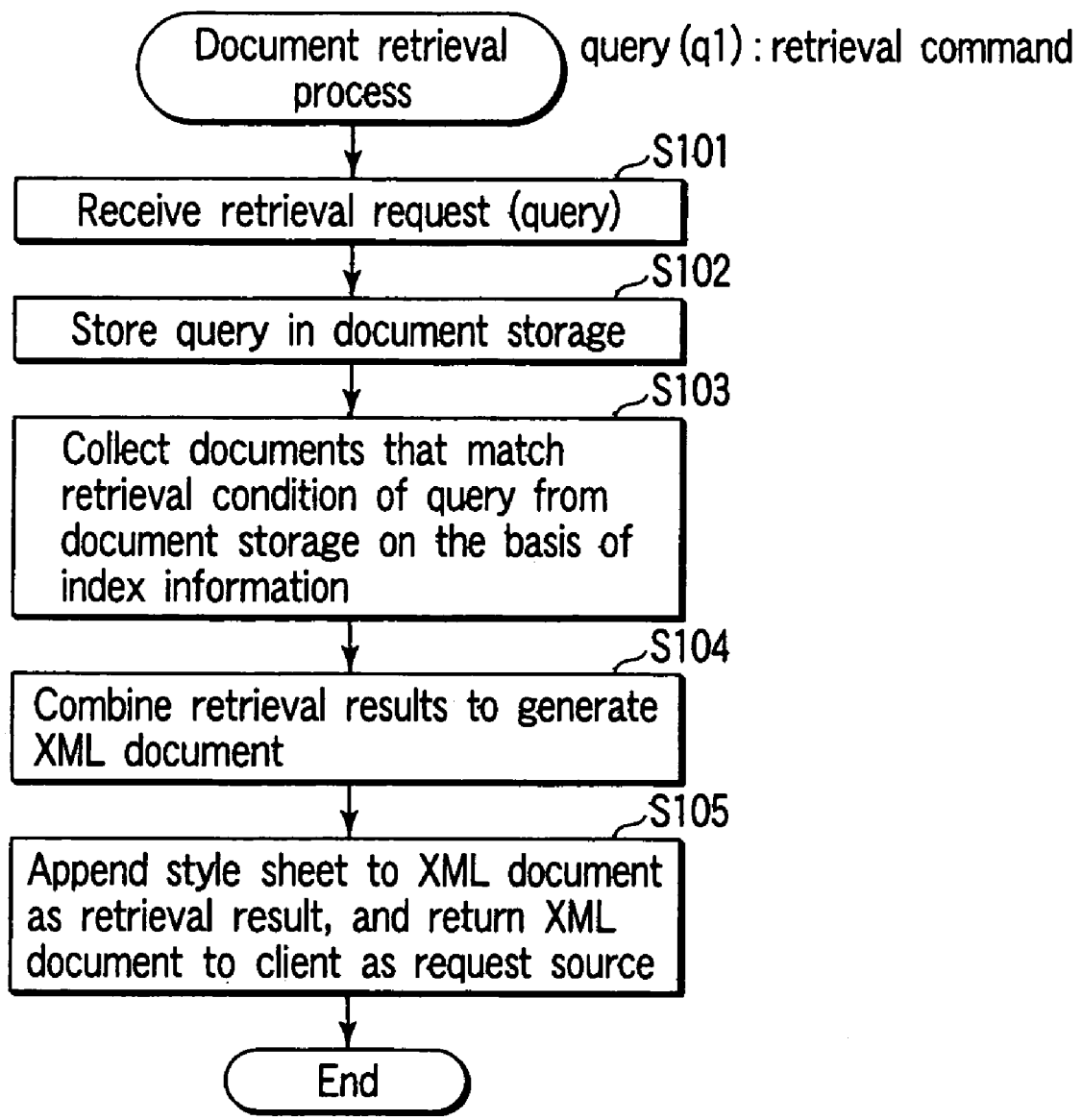
F I G. 43

```
<query>
  <kf:query xmlns:kf="">
    <kf:select>
      <result>$u</result>
    </kf:select>
    <kf:from path="uix://root">
      <kf:star>
        <kf:dot><xq:as tagName="$e"path="$u">
          <kf:star>
            <Title>$t</Title>
          </kf:star>
          <kf:star>
            <Year>$y</Year>
          </kf:star>
        </kf:dot>
      </kf:star>
    <kf:from>
    <kf:where>
      <kf:cmp op1="member" op2="$e" op3="Patent"/>
      <kf:cmp op1="like" op2="$t" op3="Document"/>
      <kf:cmp op1=">=" op2="$y" op3="1998"/>
    </kf:where>
  </kf:query>
</query>
```

FIG. 45

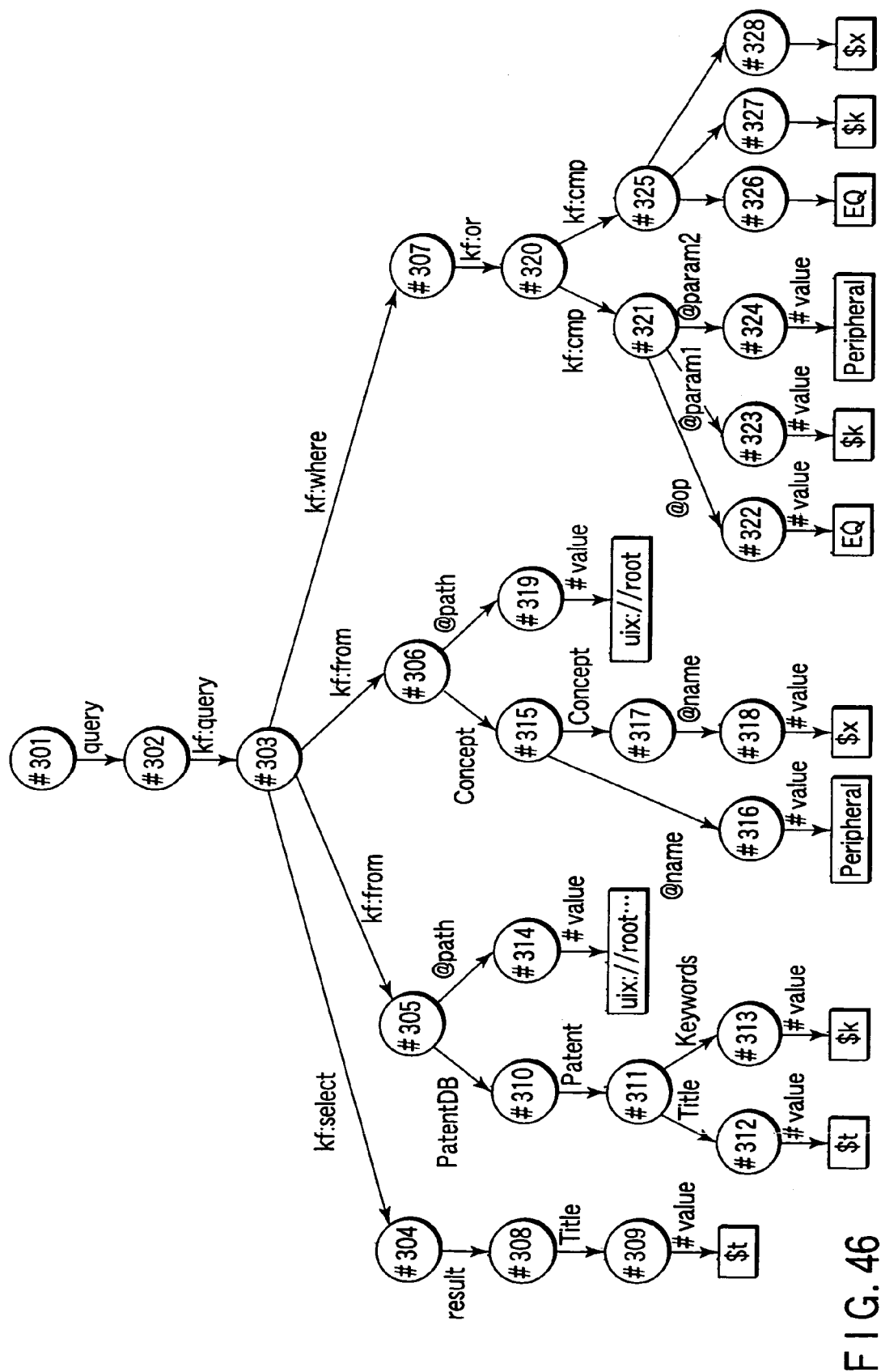
F I G. 46

```
<query>
 <kf:query xmlns:kf="">
  <kf:select>
   <result>$u</result>
  </kf:select>
  <kf:from path="uix://root">
   <kf:star>
    <Schema><kf:as path="$u"/>
     <ElementType name="$a1">
     </ElementType>
     <ElementType name="$a2">
     </ElementType>
    </Schema>
   </kf:star>
  </kf:from>
  <kf:where>
   <kf:cmp op1="like" op2="$a1" op3="Patent"/>
   <kf:cmp op1="like" op2="$a2" op3="Summary"/>
  </kf:where>
 </kf:query>
</query>
```

FIG. 48

```
<query>
  <kf:query>
    <kf:select>
      <result>
        <kf:as>$elt</kf:as>
      </result>
    </kf:select>
    <kf:from path="uix://root/QueryDB">
      <query>
        <from>
          <PatentDB/>
        <from>
        <kf:as>$elt</kf:as>
      <query>
    </kf:from>
  </kf:query>
</query>
```

FIG. 49

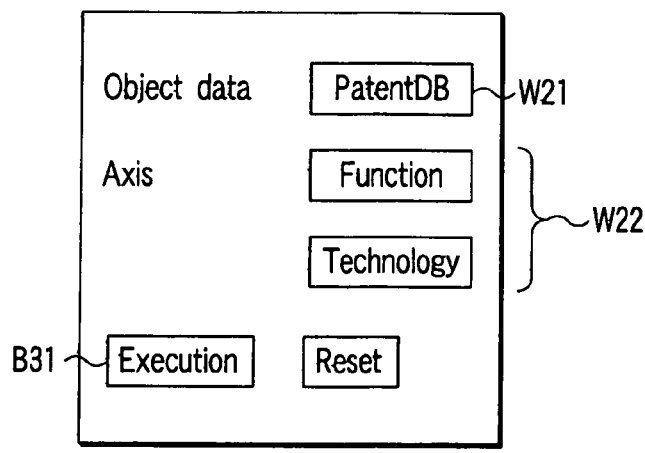

FIG. 51

```
<query>
 <kf:query xmlns:kf="" vars="$p$q">
  <kf:select>
    <data x="$x" y="$y" z="$z"/>
  <kf:select>
  <kf:from path="uix://root/PatentDB">
    <Patent>
       <KOKAI pub. No.>$z</KOKAI pub. No.>
       <kf:star>$key1</kf:star>
       <kf:star>$key2</kf:star>
    </Patent>
  </kf:from>
  <kf:from path="uix://root/ConceptDB/$p">
    <Concept name="$x">
      <kf:star>
        <Concept name="$key1"/>
      </kf:ster>
    </Concept>
  <kf:from>
  <kf:from path="uix://root/ConceptDB/$q">
    <Concept name="$y">
      <kf:star>
        <Concept name="$key2"/>
      </kf:star>
    </Concept>
  </kf:from>
  <kf:query>
</query>
```

FIG. 52

```
<result>
  <data x="Retrieval" y="Implemented database" z="KOKAI pub. No.11-12345"/>
  <data x="Retrieval" y="Implemented database" z="KOKAI pub. No.11-12346"/>
  <data x="Storage" y="Implemented database" z="KOKAI pub. No.11-34567"/>
  <data x="Analysis support" y="Implemented database" z="KOKAI pub. No.11-45678"/>
  <data x="Retrieval" y="Semi-structured database" z="KOKAI pub. No.11-23456"/>
  <data x="Storage" y="Semi-structured database" z="KOKAI pub. No.11-23457"/>
  <data x="Storage" y="Natural language process" z="KOKAI pub. No.11-55678"/>
</result>
```

F I G. 53

| Function / Technology | Retrieval | Storage | Analysis support |
|---|---|---|---|
| Implemented database | KOKAI pub. No.11-12345<br>KOKAI pub. No.11-12346 | KOKAI pub. No.11-34567 | KOKAI pub. No.11-45678 |
| Semi-structured database | KOKAI pub. No.11-23456 | KOKAI pub. No.11-23457 | |
| Natural language process | | KOKAI pub. No.11-55678 | |

F I G. 54

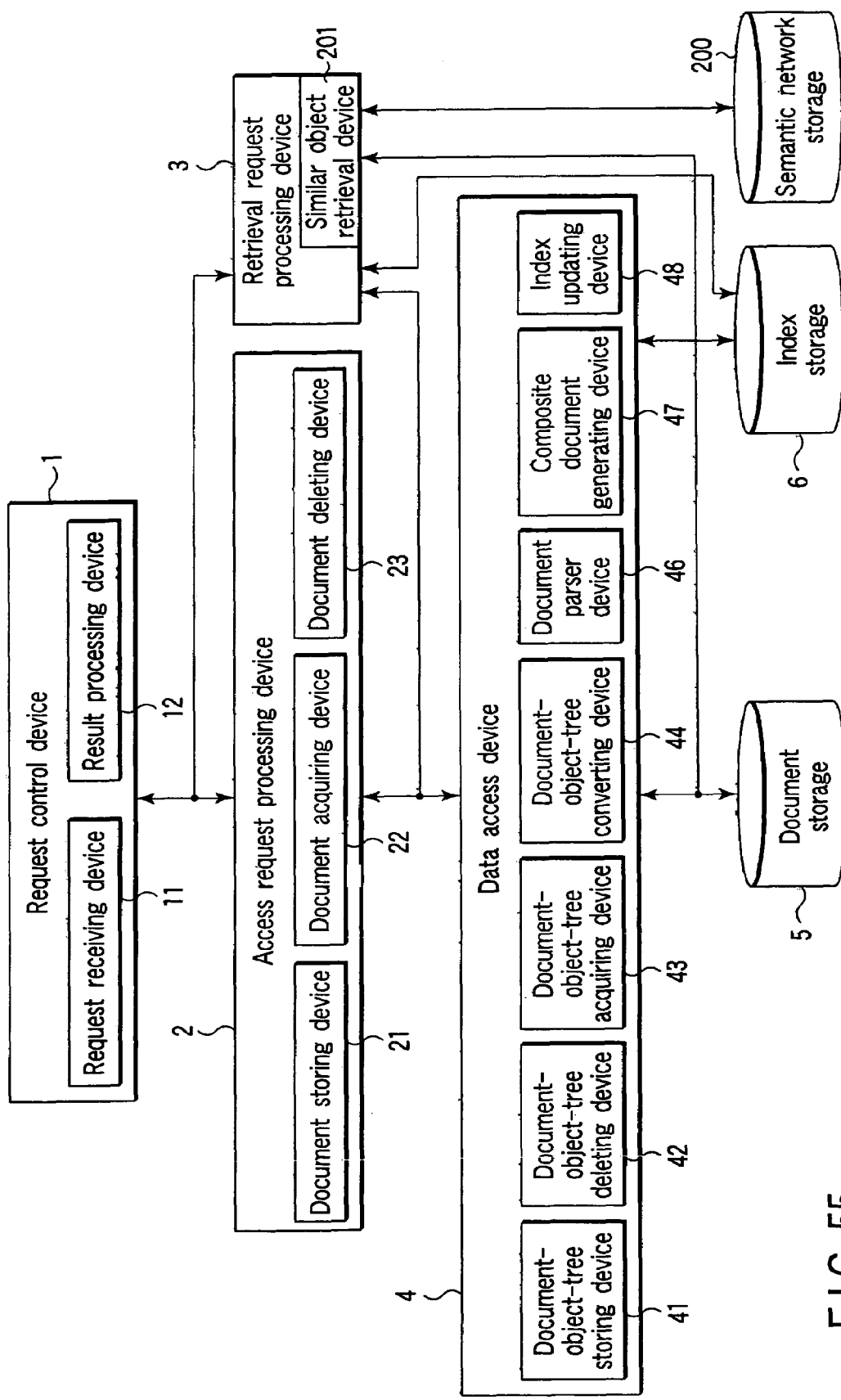
F I G. 55

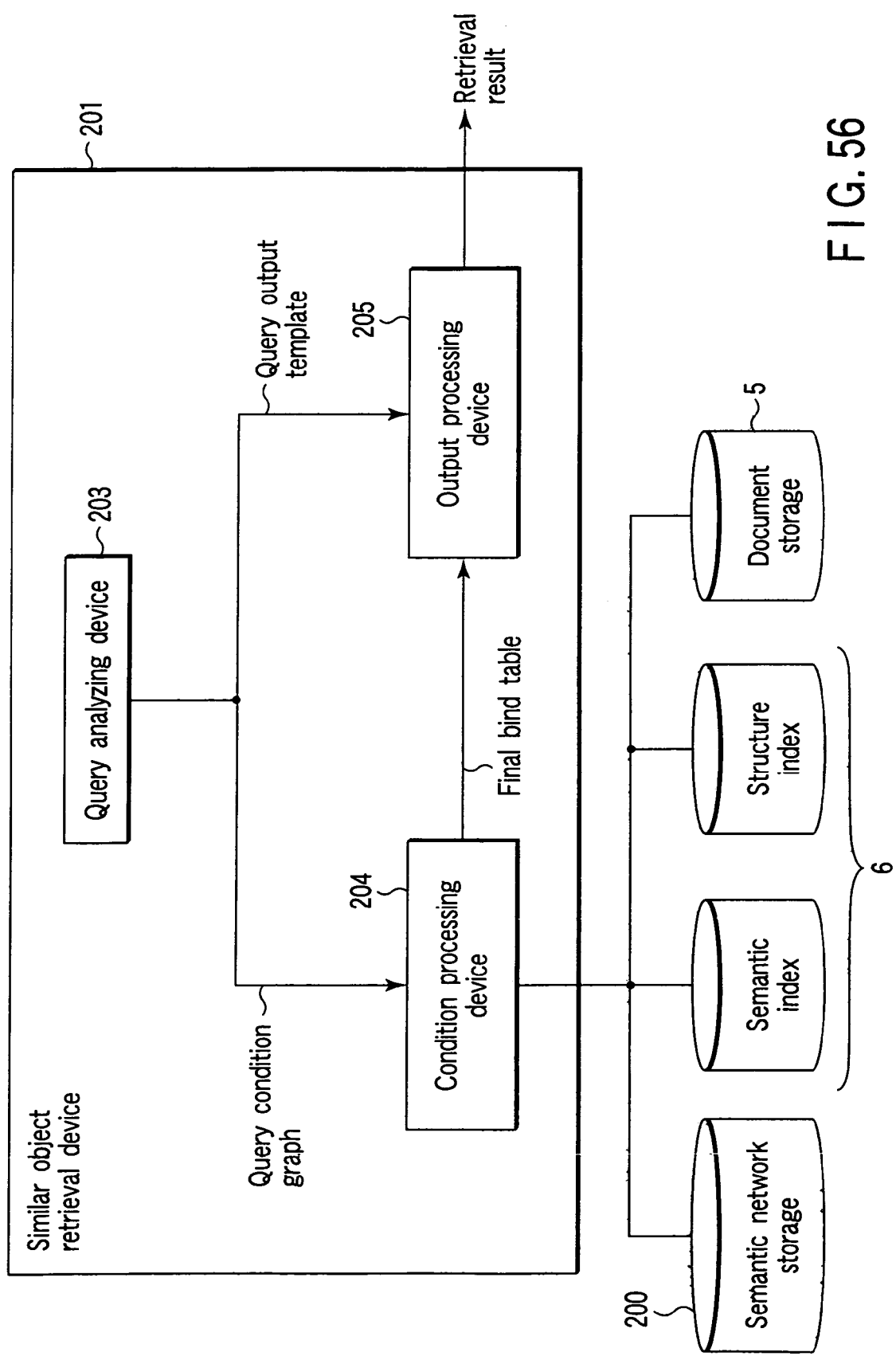
F I G. 56

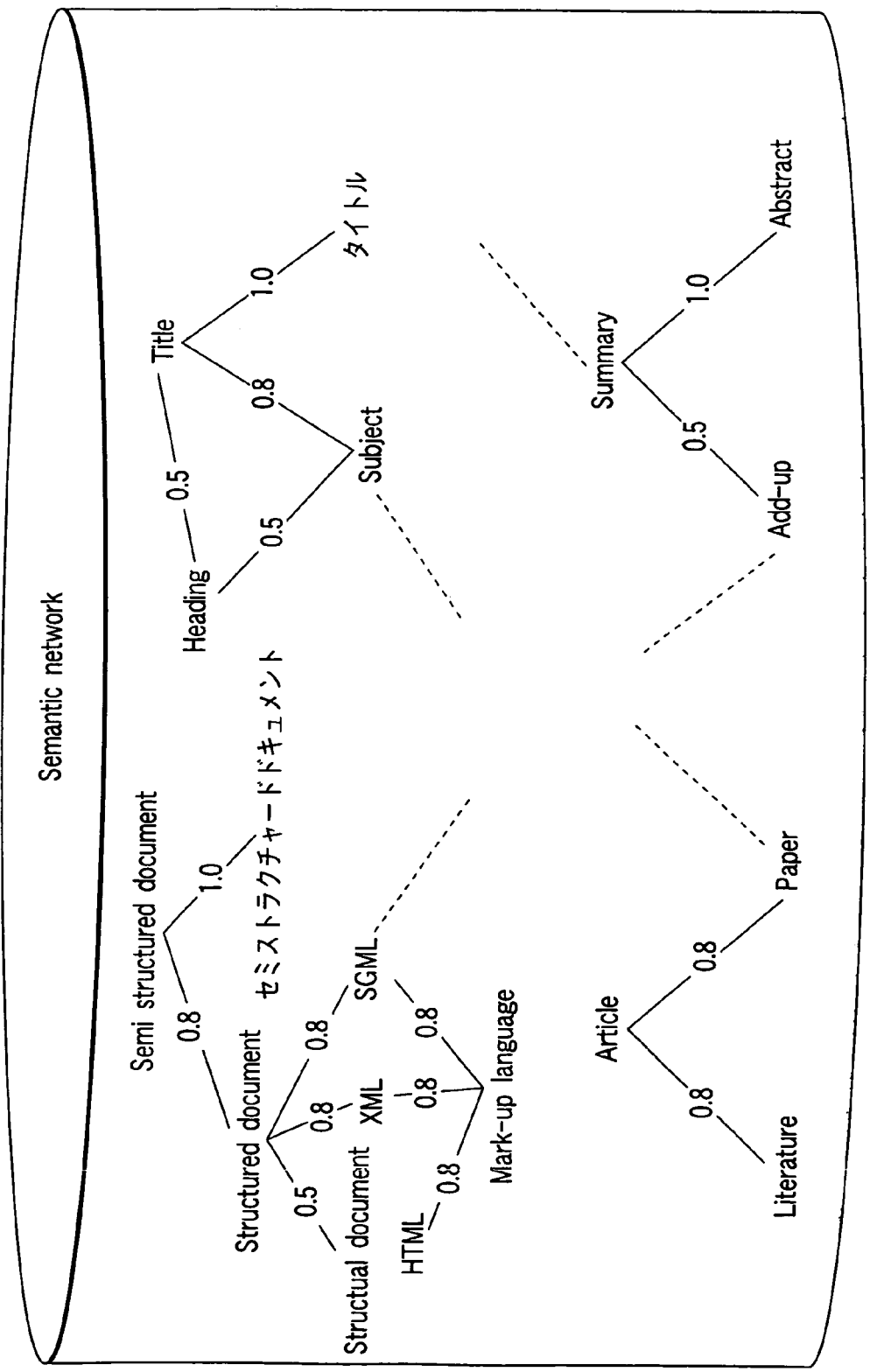
F I G. 59

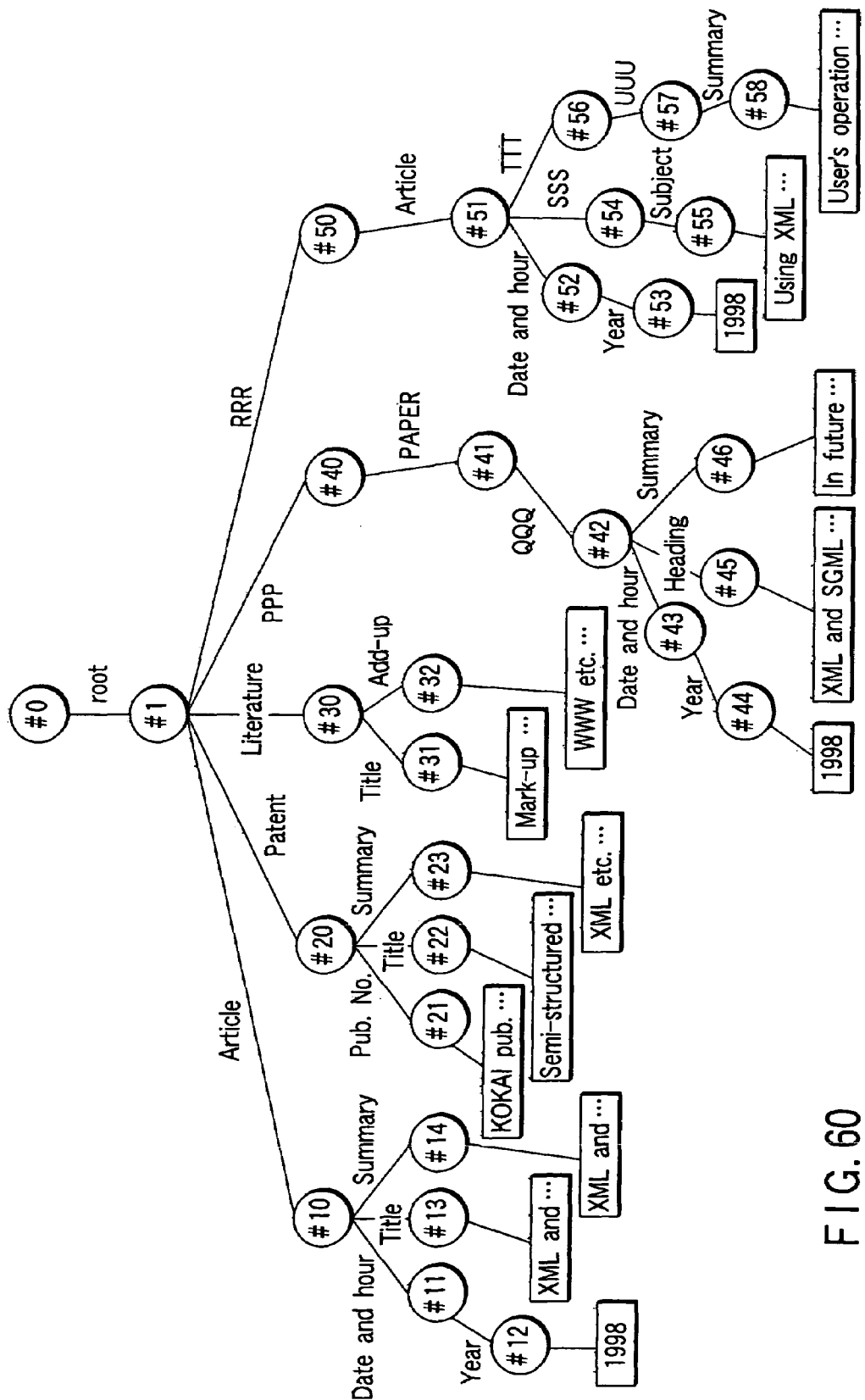
F I G. 60

```
<Article>
    <Date and hour><Year>1998</Year></Date and hour>
    <Title>About XML and SGML</Title>
    <Summary>Explain difference between XML and SGML</Summary>
            ...
</Article>
```

FIG. 61

```
<Patent>
    <Pub. No.>KOKAI pub. No.○○-×××××</Pub. No.>
    <Title>Semi-structured document database</Title>
    <Summary>Management method of semi-structured documents
        such as XML and the like</Summary>
            ...
</Patent>
```

FIG. 62

```
<Literature>
    <Title>Status quo of markup language</Title>
    <Add-up>Widespread in WWW and the like…</Add-up>
            ...
</Literature>
```

FIG. 63

```
<PAPER>
    <QQQ>
        <Date and hour><Year>1998</Year></Date and hour>
        <Heading>Future of XML and SGML…</Heading>
        <Summary>XML as applied language in future…
            </Summary>
        …
    </QQQ>
</PAPER>
```

FIG. 64

```
<Article>
    <Date and hour><Year>1998</Year></Date and hour>
    <SSS>
        <Subject>User's style using XML…</Subject>
    </SSS>
    <TTT>
        <UUU>
            <Summary>By user's operation…</Summary>
        </UUU>
    </TTT>
</Article>
```

FIG. 65

```
<kf:query>>
    <kfsim:select>
        <PAPER>
            <TITLE>$t</TITLE>
            <ABST>$a</ABST>
        </PAPER>
    </kfsim:select>
    <kfsim:from path="uix://root">
        <Article>
            <Title>$t</Title>
            <Summary>$a</Summary>
        </Article>
    </kfsim:from>
    <kf:where>
        <kfsim:cmp op="include" param1="$t" param2="XML,SGML"/ >
    </kf:where>
</kf:query>
```

FIG. 66

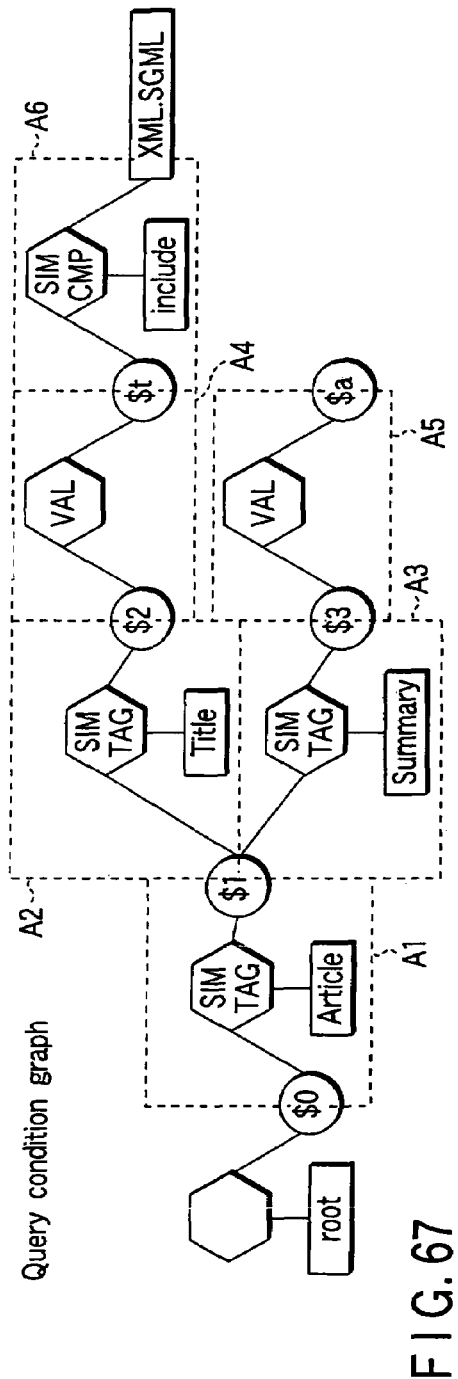
F I G. 67
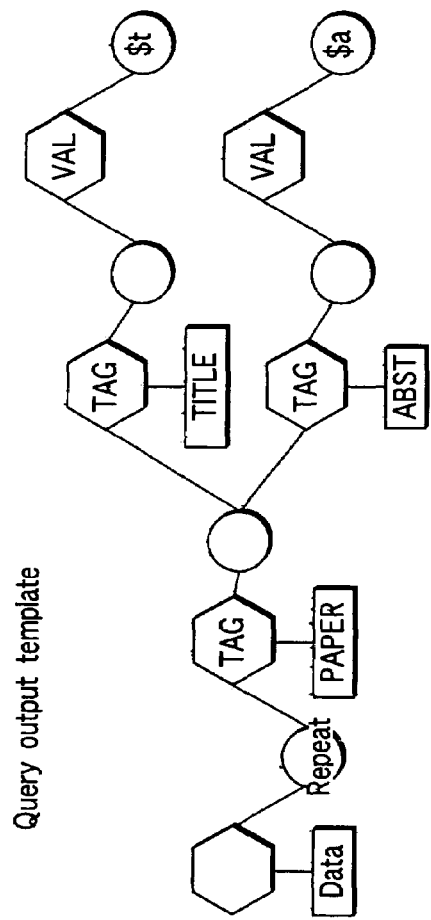
F I G. 68

Similarity evolving (Q1)

XML,SGML

XML—1.0
SGML—1.0
Structured document—0.8
Mark-up language—0.8
Semi-structured document—0.64
セミストラクチャードドキュメント—0.64
HTML—0.64
Structual document—0.4

Title

Title—1.0
タイトル—1.0
Subject—0.64
Heading—0.5

Article

Article—1.0
Paper—1.0
Literature—0.8

Summary

Summary—1.0
Abstract—1.0
Add-up—0.5

F I G. 78

Location evolving (Q2)

|  | $t |
|---|---|
| XML | #13'—1.0 |
|  | #14'—1.0 |
|  | #45'—1.0 |
|  | #46'—1.0 |
|  | #55'—1.0 |
| SGML | #13'—1.0 |
|  | #14'—1.0 |
|  | #45'—1.0 |
| Mark-up language | #31'—0.8 |
| Semi-structured document | #22'—0.64 |
|  | #23'—0.64 |

Structure evolving (Q3)

|  | $2 |
|---|---|
| Title | #13—1.0 |
|  | #22—1.0 |
|  | #31—1.0 |
| Subject | #55—0.8 |
| Heading | #45—0.5 |

Structure evolving (Q4)

|  | $3 |
|---|---|
| Summary | #14—1.0 |
|  | #46—1.0 |
|  | #58—1.0 |
| Add-up | #32—0.5 |

Structure evolving (Q5)

|  | $1 |
|---|---|
| Article | #10—1.0 |
|  | #51—1.0 |
| Paper | #41—1.0 |
| Literature | #30—0.8 |

| $t | $2 |
|---|---|
| #13→1.0 | #13→1.0<br>#10→0.5 |
| #14→1.0 | #14→1.0<br>#10→1.0 |
| #45→1.0 | #45→1.0<br>#42→0.5<br>#41→0.3<br>#40→0.2 |
| #46→1.0 | #46→1.0<br>#42→0.5<br>#41→0.3<br>#40→0.2 |
| #55→1.0 | #55→1.0<br>#54→0.5<br>#51→0.3<br>#50→0.2 |
| #31'→0.8 | #31→1.0<br>#30→0.5 |
| #22'→0.64 | #22→1.0<br>#20→0.5 |
| #23'→0.64 | #23→1.0<br>#20→0.5 |

B2

| $2 |
|---|
| #13→1.0 |
| #22→1.0 |
| #31→1.0 |
| #55→0.8 |
| #45→0.5 |

Bind table combining (Q8) ⇒

B7

| $t | $2 |
|---|---|
| #13'→1.0 | #13→1.0 |
| #45'→1.0 | #45→0.5 |
| #55'→1.0 | #55→0.8 |
| #31'→0.8 | #31→1.0 |
| #22'→0.64 | #22→1.0 |

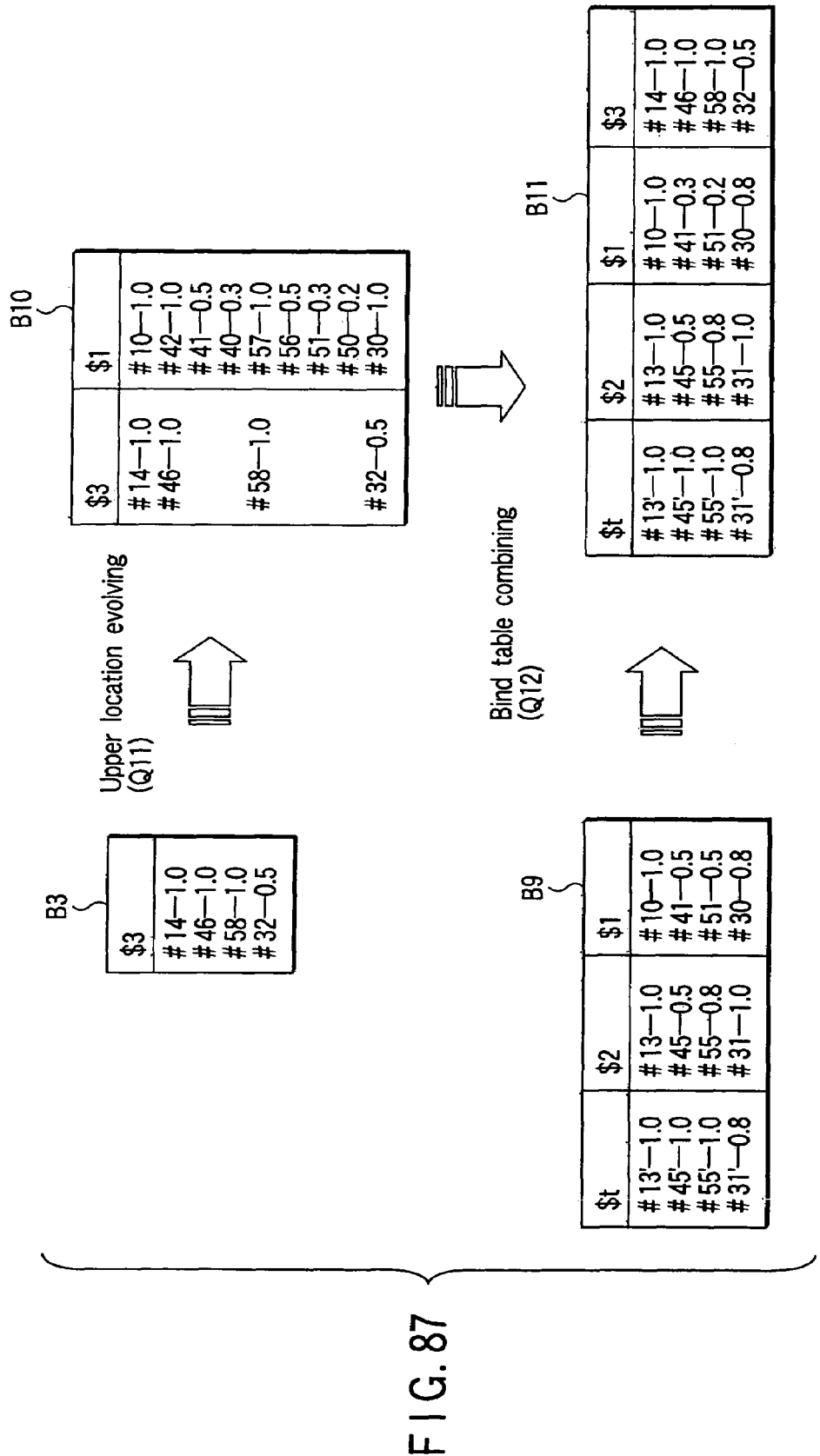
F I G. 87

| $t | $2 | $1 | $3 | $a | $sim |
|---|---|---|---|---|---|
| #13'—1.0 | #13—1.0 | #10—1.0 | #14—1.0 | #14'—1.0 | 1.0 |
| #45'—1.0 | #45—0.5 | #41—0.3 | #46—1.0 | #46'—1.0 | 0.2 |
| #55'—1.0 | #55—0.8 | #51—0.2 | #58—1.0 | #58'—1.0 | 0.2 |
| #31'—0.8 | #31—1.0 | #30—0.8 | #32—0.5 | #32'—1.0 | 0.3 |

F I G. 89

```
<Data set>
    <PAPER score="1.0">
        <TITLE>About XML and SGML</TITLE>
        <ABST>Explain difference between XML and SGML</ABST>
    </PAPER>
    <PAPER score="0.3">
        <TITLE>Status quo of markup language</TITLE>
        <ABST>Widespread in WWW and the like···</ABST>
    </PAPER>
    <PAPER score="0.2">
        <TITLE>User's style using XML···</TITLE>
        <ABST>By user's operation···</ABST>
    </PAPER>
    <PAPER score="0.2">
        <TITLE>Future of XML and SGML</TITLE>
        <ABST>XML as applied language in future···</ABST>
    </PAPER>
</Data set>
```

F I G. 90

```
<Data set>
    <PAPER score="1.0">
        <TITLE>About XML and SGML</TITLE>
        <ABST>Explain difference between XML and SGML</ABST>
    </PAPER>
    <PAPER score="0.5">
        <TITLE>Future of XML and SGML</TITLE>
        <ABST>XML as applied language in future…</ABST>
    </PAPER>
    <PAPER score="0.3">
        <TITLE>User's style using XML…</TITLE>
        <ABST>By user's operation…</ABST>
    </PAPER>
    <PAPER score="0.3">
        <TITLE>Status quo of markup language</TITLE>
        <ABST>Widespread in WWW and the like…</ABST>
    </PAPER>
</Data set>
```

FIG. 91

APPARATUS, METHOD, AND PROGRAM FOR RETRIEVING STRUCTURED DOCUMENTS

This is a continuation of U.S. application Ser. No. 10/107,066, now U.S. Pat. No. 6,889,223, filed Mar. 28, 2002, which is incorporated herein by reference.

CROSS-REFERENCE TO RELATED APPLICATIONS

This application is based upon and claims the benefit of priority from the prior Japanese Patent Application No. 2001-099973, filed Mar. 30, 2001, the entire contents of which are incorporated herein by reference.

BACKGROUND OF THE INVENTION

1. Field of the Invention

The present invention relates to an apparatus and method for retrieving a desired structured document from a structured document database having a hierarchical logical structure that stores a plurality of structured documents having different document structures.

2. Description of the Related Art

For example, a structured document database that stores and manages XML (Extensible Markup Language) data provides means for retrieving a desired structured document using a retrieval request described in a query language. Some query languages have a construction similar to SQL (Structured Query Language), and describe retrieval locations, retrieval conditions, information extraction portions, and the like. However, upon generating query data based on such query language, the user side must have information associated with the DTD (Document Type Definition) of structured documents stored in the structured document database and lexicon generation status.

A lexicon includes many synonyms and similar words. For example, "title" can also be expressed as "heading" or "subject", and "summary" can also be expressed as "add-up" or "abstract". However, the conventional query language is too strict to make retrieval that absorbs such lexical ambiguity.

On the other hand, in the field of a document information retrieval (search) engine, a retrieval request is expressed using a keyword string. Some sophisticated document retrieval engines have a function of making a retrieval adding a keyword string associated with a keyword string using a synonym dictionary, similar word dictionary, and the like (broadly interpreting the input retrieval request). Using this function, lexical ambiguity of documents can be coped with. However, documents are simply retrieved while ignoring the document structure as important information of structured documents.

The conventional structured document retrieving scheme suffers the following problems.

(1) A similar object retrieval that considers not only lexical similarity but also similarity of the document structure cannot be made.

(2) A retrieval request which extracts some similar components in a structured document cannot be described unlike the SQL of the database.

(3) Similarity calculations of a lexical item must be made.

BRIEF SUMMARY OF THE INVENTION

It is an object of the present invention to provide a method and an apparatus which can easily retrieve structured documents, each document structure of the structured documents is equal/similar to that designated in the retrieval condition and words included in each of the structured documents and the components in which the words included are equal/similar to those designated in the retrieval condition.

According to a first aspect of the present invention, there is provided a method for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents as a value included in one of the components, the method comprising: (a) inputting at least a retrieval condition including at least one first desired word, and at least one first desired component including a value in which the first desired word is included; (b) detecting a plurality of second desired components each being similar to the first desired component, in the hierarchical structure; (c) detecting a plurality of first components each including a value in which the first desired word is included, from the structured-document-database; (d) detecting a plurality of second components each corresponding to one of the first desired component and the second desired components and including or corresponding to one of the first component, from the structured-document-database; (e) extracting a plurality of desired structured documents each including one of the second components, from the structured-document-database.

According to a second aspect of the present invention, there is provided an apparatus for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the apparatus comprising: (a) an input device configured to input at least a retrieval condition including at least one first desired word, and at least one first desired component including a value in which the first desired word is included; (b) a first detecting device configured to detect a plurality of second desired components each being similar to the first desired component, in the hierarchical structure; (c) a first retrieving device configured to retrieve a plurality of first structured documents each including at least one first component including a value in which the first desired word is included, from the structured-document-database; (d) a second retrieving device configured to retrieve a plurality of second structured documents each including a second component corresponding to one of the first desired component and the second desired components and including or corresponding to the first component, from the first structured documents.

BRIEF DESCRIPTION OF THE SEVERAL VIEWS OF THE DRAWING

FIG. 4 depicts the document structure of the structured document shown in FIG. 3;

FIG. 5 is a view for explaining an append command, i.e., a case wherein an append command is executed in an initial state of a structured document database;

FIG. 6 shows the processing result upon executing an acquire command with respect to the structured document database in the state shown in FIG. 5(b);

FIG. 7 shows a case wherein a document object tree of one "patent" information is appended to the structured document database in the state shown in FIG. 5(b) by executing an append command;

FIG. 11 shows the execution result obtained when an acquire command for extracting "patent" information below node "patent DB" is executed for the structured document database in the state shown in FIG. 8;

FIG. 12 shows an example of a schema that defines the document structure of an XML document;

FIG. 16 shows an example of a structured document which expresses a concept hierarchy used in retrieval as needed;

FIG. 17 shows an example of a structured document which expresses a concept hierarchy used in retrieval as needed;

FIG. 19 shows a document object tree of "concept" information shown in FIGS. 16 and 17 that is appended to node "#201" shown in FIG. 18;

FIG. 22 shows the conversion result of a document object tree of a composite document obtained by inserting a document object tree of a storage document of parameters in an append command into a document object tree acquired from the structured document database, i.e., an example of a composite document stored in temporary file A;

FIG. 23 shows an example of a schema document which is stored in temporary file B and is acquired from the structured document database;

FIG. 24 shows another example of a composite document stored in temporary file A;

FIG. 25 shows an example of a schema document which is stored in temporary file B and is acquired from the structured document database;

FIG. 28 is a flow chart showing the process in step S46 (the process (for a delete command) of the composite document generating device) in FIG. 27;

FIG. 29 shows still another example of a composite document stored in temporary file A, i.e., an example of a composite document generated upon executing a delete command;

FIG. 30 shows an example of a schema document which is stored in temporary file B and is acquired from the structured document database;

FIG. 39 shows an example of a query (XML document);

FIG. 40 shows an example of a query (XML document) of plain retrieval;

FIG. 41 shows a retrieval result (XML document) using the query of plain retrieval shown in FIG. 40;

FIG. 42 shows an example of a query (XML document) of conceptual retrieval;

FIG. 43 is a flow chart for explaining a document retrieval processing operation of the structured document management system shown in FIG. 1;

FIG. 45 shows a query generated based on information input on the window shown in FIG. 44;

FIG. 46 shows a storage example of the query shown in FIG. 42 in the structured document database;

FIG. 48 shows an example of a query of schema retrieval;

FIG. 49 shows an example of a query used to retrieve a query;

FIG. 51 shows a display example of an input window for conceptual retrieval;

FIG. 52 shows a query corresponding to input information in the input window shown in FIG. 51;

FIG. 53 shows an XML document as a retrieval result corresponding to the query shown in FIG. 52;

FIG. 54 shows an example of a patent map;

FIG. 55 is a block diagram showing an example of the arrangement of a structured document management system according to an embodiment of the present invention;

FIG. 56 is a block diagram showing an example of the arrangement of a similar object retrieval device;

FIG. 59 illustrates a semantic network stored in a semantic network storage;

FIG. 60 illustrates the storage states of structured documents in a structured document database in a document storage shown in FIG. 55;

FIG. 61 shows an example of a structured document stored in the structured document database shown in FIG. 60;

FIG. 62 shows an example of a structured document stored in the structured document database shown in FIG. 60;

FIG. 63 shows an example of a structured document stored in the structured document database shown in FIG. 60;

FIG. 64 shows an example of a structured document stored in the structured document database shown in FIG. 60;

FIG. 65 shows an example of a structured document stored in the structured document database shown in FIG. 60;

FIG. 66 shows an example of a query of similar object retrieval;

FIG. 67 shows an example of a query condition graph;

FIG. 68 shows an example of a query output graph (query output template);

FIG. 78 shows the similarity evolving result of a lexical item (including a component name) designated in the retrieval condition;

FIG. 79 shows intermediate bind table B1 obtained by location evolving;

FIG. 80 shows intermediate bind table B2 obtained by structure evolving;

FIG. 81 shows intermediate bind table B3 obtained by structure evolving;

FIG. 82 shows intermediate bind table B4 obtained by structure evolving;

FIG. 85 is a view for explaining a process for generating intermediate bind table B7 by combining intermediate bind tables B6 and B2;

FIG. 87 is a view for explaining a process for executing an upper location evolving process for intermediate bind table B3, and generating intermediate bind table B11 by combining that table with intermediate bind table B9;

FIG. 89 shows a final bind table;

FIG. 90 shows an example of a similar object retrieval result; and

FIG. 91 shows another example of a similar object retrieval result.

DETAILED DESCRIPTION OF THE INVENTION

An outline of a structured document management system will be explained below prior to the description of an embodiment of the present invention.

(Description of Structured Document Management System)

Structured documents include documents described in XML, SGML, and the like. SGML (Standard Generalized Markup Language) is the standard specified by ISO (International Organization for Standardization). XML is the standard specified by W3C (World Wide Web Consortium). These are structured document standards which allow to structure documents.

A document described in XML will be exemplified below as a structured document. Data that defines the document structure of a structured document (document structure definition data) is called a schema. In XML, schema languages such as XML-Schema, XDR (XML Data Reduced), and the like have been proposed to define a schema. A case will be exemplified below wherein a schema is described in XDR.

The schema is also a structured document to be managed by the structured document management system, and will also be referred to as a schema document. A structured document other than the schema document and has various contents such as a patent specification, mail message, weekly report, advertisement, and the like will also be referred to as a contents document.

The structured document management system manages the schema documents, contents documents, and queries that describe retrieval requests from the user (to be described later), i.e., query documents. These documents will be generally referred to as "documents".

In the following description, "documents" indicate all of contents, schema, and query documents unless otherwise specified.

Prior to the description of the embodiment, XML will be briefly explained below.

Figures 2, 3:
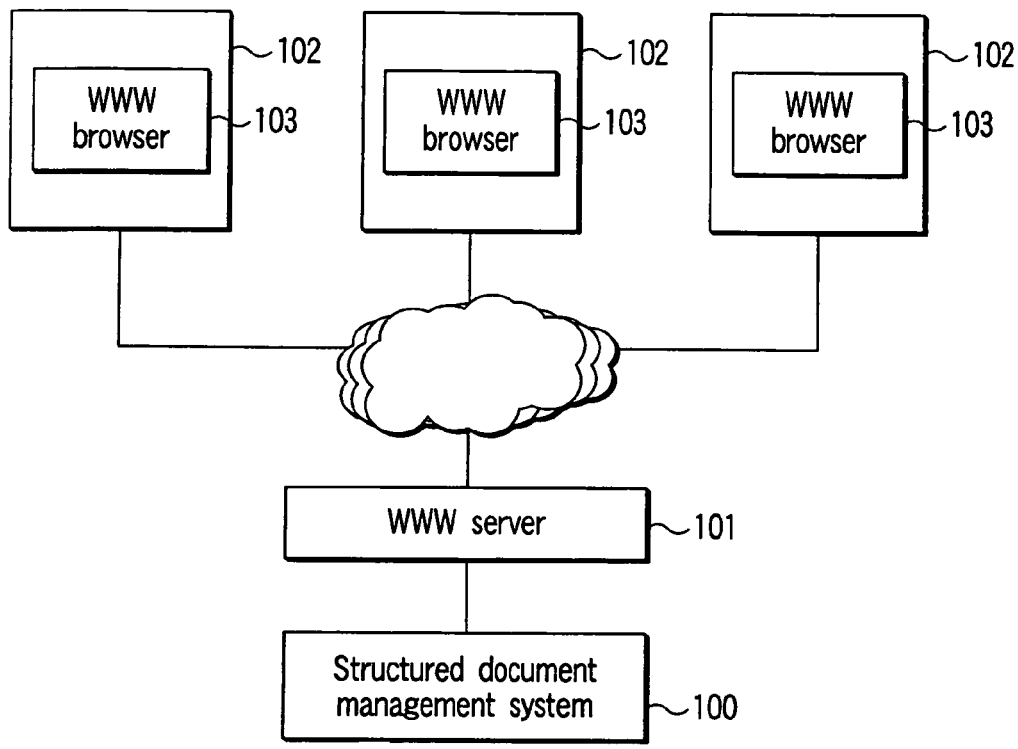
FIG. 2 shows one use pattern of the structured document management system shown in FIG. 1, i.e., a case wherein the structured document management system runs as a back end of WWW.
FIG. 3 shows an example of a structured document described in XML.

FIG. 3 shows an example of "patent" information as an example of the structured document described in XML. XML and SGML use tags to express the document structure. Tags include start and end tags. Each component of the document structure is bounded by start and end tags. A start tag is defined by closing a component name (tag name) by ">", and an end tag is defined by closing a component name by "</" and ">". The contents of a component that follows a tag are text (character string) or repetition of a child component. Also, the start tag can be set with attribute information like "<component name attribute="attribute value">". A component which does not contain any text like "<patent DB></patent DB>" can also be simply expressed by "<patent DB/>".

The document shown in FIG. 3 has a component that starts from a "patent" tag as a root, and includes components that respectively start from "title", "date of application", "applicant", and "abstract" tags as child components. For example, a component starting from the "title" tag includes text (character string) like "XML database" as a component value.

Normally, a structured document of, e.g., XML repetitively includes arbitrary components, and the document structure is not determined in advance.

In order to logically express the structured document shown in FIG. 3, a tree expression shown in FIG. 4 is used. The tree is formed by nodes (circles assigned with numbers), arcs (lines with data which connect circles representing nodes), and text bounded by boxes.

One node corresponds to one component, i.e., one document object. A plurality of arcs with labels corresponding to tag names and attribute names extend from each node. Each arc points to a character string (text) as a node value or component value. An alphanumeric value (for example "#0", "#49") described in each node is an object ID used to identify each document object.

The tree structure shown in FIG. 4 will be referred to as a document object tree of the structured document shown in FIG. 3 hereinafter.

Figure 1:
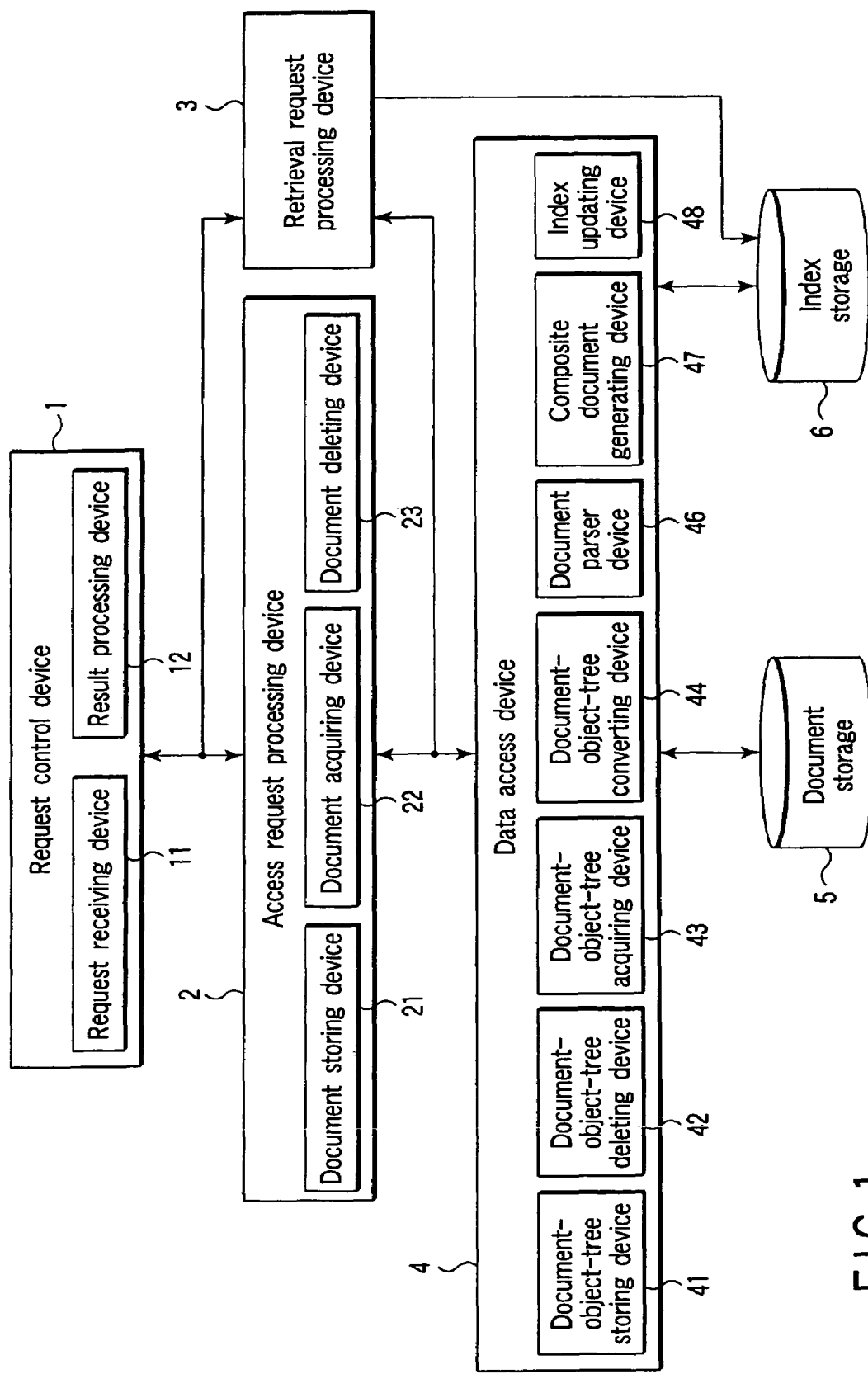
FIG. 1 is a block diagram showing the arrangement of a structured document management system according to an embodiment of the present invention.

FIG. 1 shows an example of the arrangement of a structured document management system according to this embodiment. Referring to FIG. 1, the structured document management system roughly comprises a request control device 1, access request processing device 2, retrieval request processing device 3, data access device 4, document storage 5, and index storage 6. The document storage 5 and index storage 6 comprise, e.g., an external storage device.

The system arrangement shown in FIG. 1 can be implemented using software.

The request control device 1 comprises a request receiving device 11 and result processing device 12. The request receiving device 11 receives user's requests such as a document storing request, document acquiring request, document retrieval request, and the like, and calls the access request processing device 2. The result processing device 12 returns the processing result of the access request processing device 2 to the user as the request source.

The access request processing device 2 comprises a plurality of processing devices corresponding to various requests from the user (e.g., a document storing request, document acquiring request, document delete request, and the like): a document storing device 21, document acquiring device 22, and document deleting device 23.

The document storing device 21 stores a document in a designated logical area in the document storage 5.

The document acquiring device 22 acquires a document present in a designated area when the logical area in the document storage 5 is designated.

The document deleting device 23 deletes a document present in a designated logical area in the document storage 5.

Figure 8:
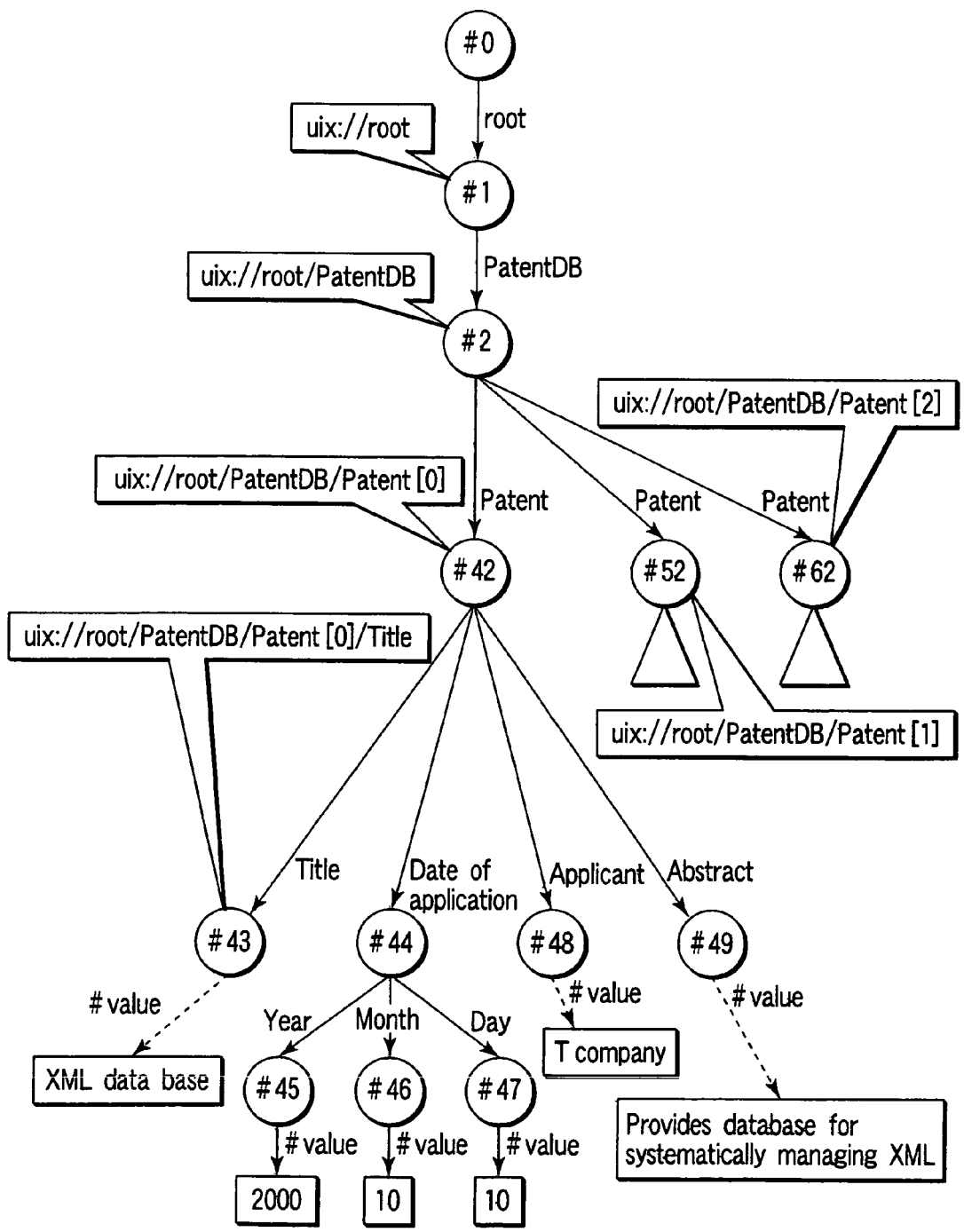
FIG. 8 shows a case wherein a document object tree of three pieces of "patent" information is appended to the structured document database in the state shown in FIG. 5(b) by executing an append command.

The document storage 5 is a structured document database, and stores documents in a hierarchical tree structure like a directory structure of UNIX, as shown in, e.g., FIG. 8.

As shown in FIG. 8, the structured document database can be expressed in the same manner as the tree structure of one structured document shown in FIG. 4. That is, a partial hierarchical tree (partial tree) below an arbitrary node is a structured document extracted from the structured document database, and will be referred to as a document object tree hereinafter. Each node is assigned an object ID. The object ID is a unique numerical value in the structured document database.

Assume that a node which serves as the root of the hierarchical tree is assigned object ID "#0" so as to specify that it is a root node.

The root node, i.e., node "#0" is linked to a node with object ID "#1", which starts from a "root" tag. Node "#1" is linked to a node with object ID "#2", which starts from a "patent DB" "tag. Node "#2" is linked to nodes with object IDs "#42", "#52", and "#62", which respectively start from "patent" tags.

The "patent" information shown in FIG. 3 corresponds to the partial tree below node "#42" in FIG. 8. This node is linked to nodes which start from a "title" tag, "applicant" tag, "abstract" tag, and the like, and end nodes are linked to character strings (component values) such as "XML database . . . ", "T company", "provides database for systematically managing XML", and the like.

In FIG. 8, the partial tree below the node with object ID "#52", and that below the node with object ID "#62" are also document object trees each of which corresponds to one "patent" information.

The component value "XML database" linked to node "#43" is connected to that node "#43" via a special tag name "#value". Since this tag name starts from "#", it cannot be used as a standard tag name in the XML standard.

In order to designate a specific node in the structured document database, a structured document pass is used. The structured document pass is a character string which starts from "uix://root". uix (Universal Identifier for XML) is a character string that indicates the structured document pass.

For example, if "uix://root/patent DB" is described as the structured document pass, a logical area in the document storage 5 designated by this structured document pass extends from node "#1" to a node indicated by an arc with "patent DB", i.e., node "#2" in FIG. 8.

Likewise, a structured document pass "uix://root/patent DB/patent" designates node "#42" in FIG. 8, and a structured document pass "uix://root/patent DB/date of application/year" indicates node "#45" in FIG. 8.

For example, when a plurality of pieces of "patent" information are to be stored below node "#2", i.e., a component "patent DB" in FIG. 8, indices may be appended to a component name ("patent" in this case) so as to identify each "patent" information.

The first "patent" information in "patent DB" is expressed by "uix://root/patent DB/patent [0]", which, however, is equivalent to "uix://root/patent DB/patent". The second "patent" information in "patent DB" is expressed by "uix://root/patent DB/patent [1]", and the fifth "patent" information in "patent DB" is expressed by "uix://root/patent DB/patent [4]".

The index storage 6 stores a structure index and lexical index used in retrieval.

Figure 9:
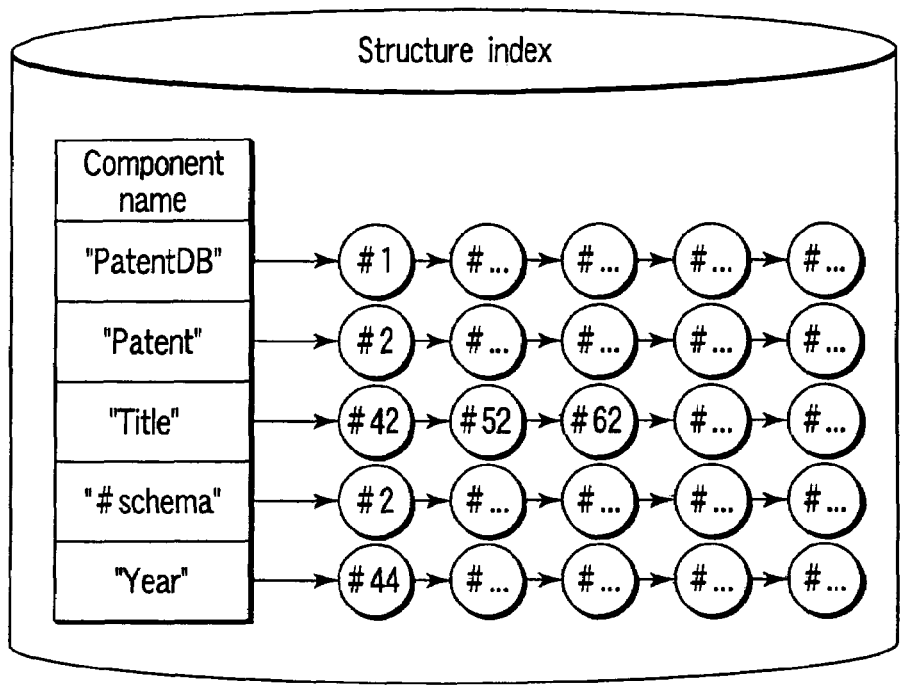
FIG. 9 shows a storage example of a structure index.

The structure index is an index file that associates component names stored in the structured document database with structured documents (document object trees) which start from components with those component names. For example, in the structured document database in FIG. 8, if a component name "patent" (corresponding to "patent" information) is present in a structured document below node "#42", a structured document below node "#52", and a structured document below node "#62", a parent node of nodes "#42", "#52", and "#62", i.e., node "#2", is stored in the structure index to be linked to the component name "patent", as shown in FIG. 9.

In this way, when an index is formed using a parent node, the index file can be compressed. That is, when an index is formed using a parent node, even when the number of child nodes increases, the number of nodes to be linked to each component name does not increase since the parent node represents the child nodes.

Figure 10:
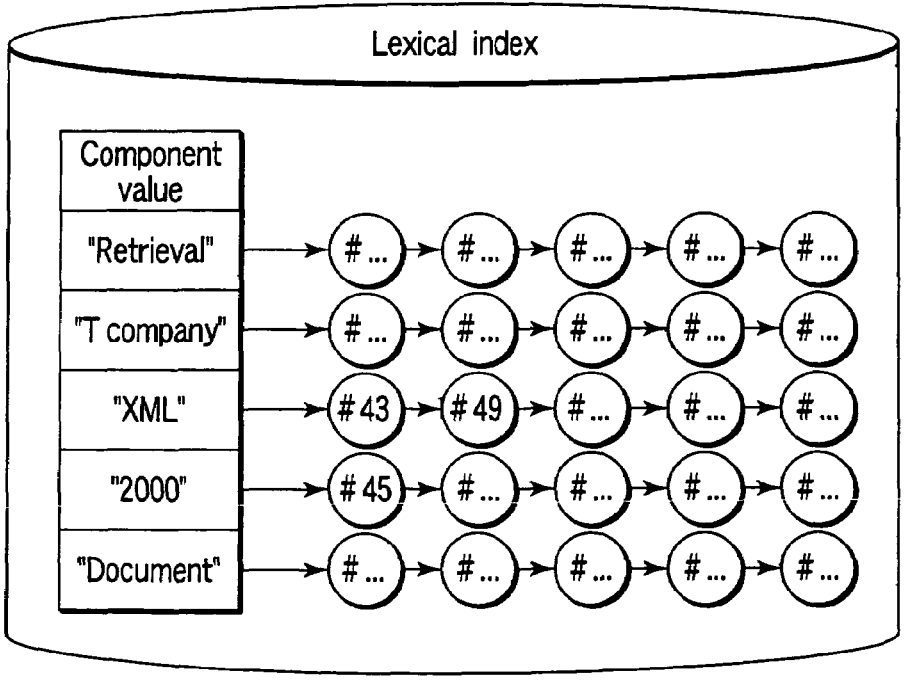
FIG. 10 shows a storage example of a lexical index.

The lexical index is an index file that associates character string data stored in the structured document database, and the positions of structured documents (document object trees) that include those character string data. For example, in the structured document database shown in FIG. 8, a character string "XML" is present in a structured document below node "#43" and a structured document below node "#49". In this case, the lexical index stores nodes "#43" and "#49" to be linked to the character string "XML", as shown in FIG. 10.

The designated logical area in the document storage 5 is the storage location of a document designated by the user using the structured document pass. The structured document pass is an expression which is visible to the user.

The description will revert to FIG. 1.

The data access device 4 executes various processes to access the document storage 5. The data access device 4 comprises a document-object-tree storing device 41, document-object-tree deleting device 42, document-object-tree acquiring device 43, document-object-tree converting device 44, document parser device 46, composite document generating device 47, and index updating device 48.

The document-object-tree storing device 41 stores a document object tree in a designated physical area in the document storage 5.

The document-object-tree deleting device 42 deletes a document object tree present in a designated physical area in the document storage 5.

The document-object-tree acquiring device 43 acquires a document object tree present in a designated physical area (by, e.g., a structured document pass) in the document storage 5.

The document-object-tree converting device 44 converts a document object tree into a structured document (XML document).

The document parser device 46 loads a structured document input by the user, and checks its document structure. Furthermore, if a schema as document structure definition data is found, the device 46 inspects if the document structure of the input structured document follows the schema. The output result is a document object tree. The document parser can be built by combining a lexical analyzer (that makes parsing to convert a character string into tokens) such as lex (lexical analyzer generator) and a parser generator such as yacc (yet another compiler compiler).

The composite document generating device 47 generates data required to inspect if a document matches a schema, upon storing or deleting a document.

The index updating device 48 updates the structure and lexical indices shown in FIGS. 9 and 10 every time the storage contents of the structured document database are updated upon storing or deleting a document.

The physical area in the document storage 5 is internal data indicates the unique location of each document data in the structured document database such as a file offset, object ID, and the like. This area is invisible to the user.

The retrieval request processing device 3 retrieves a document stored in the document storage 5 using the respective processing function devices equipped in the data access device 4. Upon receiving a document retrieval request from the user by the request receiving device 11 in the request control device 1, the retrieval request processing device 3 receives a query document described in a query language from the request receiving device 11. The retrieval request processing device 3 then accesses the index storage 6 and document storage 5 via the data access device 4 to acquire a set of documents that match the retrieval request (retrieval condition included in the retrieval request), and outputs the result via the result processing device 12.

FIG. 2 shows one use pattern of the structured document management system shown in FIG. 1. In FIG. 2, a structured document management system 100 with the arrangement shown in FIG. 1 runs as a back end of WWW (World Wide Web).

On a plurality of (e.g., three in this case) client terminals (e.g., a personal computer, portable communication terminal, and the like) 102, WWW browsers 103 are running. The user can access the structured document management system 100 by accessing a WWW server 101 from each client terminal. Each WWW browser 103 and WWW server 101 communicate with each other using HTTP (Hyper Text Transfer Protocol). The WWW server 101 and structured document management system 100 communicate with each other using CGI (Common Gateway Interface), COM (Component Object Model), or the like.

A user's request such as a document storing request, document acquiring request, document retrieval request, or the like is sent from the WWW browser 103, and is received by the structured document management system 100 via the WWW server 101. The processing result of the structured document management system 100 is returned to the WWW browser 103 as the request source via the WWW server 101.

Details of (1) storage function and (2) retrieval function of the structured document management system shown in FIG. 1 will be described below. In (3) application example, patent research using conceptual retrieval will be exemplified.

(Storage Function)

Storage-system commands in the structured document management system in FIG. 1 include:
    insertXML(pass, N-th, XML): store document
    appendXML(pass, XML): store document getXML(pass): acquire document
removeXML(pass): delete document
setSchema(pass, schema): store schema
getSchema(pass): acquire schema "insertXML" (to be simply referred to as an insert command hereinafter) is a command for inserting a document at the N-th position below the structured document pass designated in ( ).

"appendXML" (to be simply referred to as an append command hereinafter) is a command for inserting a document at the last position below the structured document pass designated in ( ).

"getXML" (to be simply referred to as an acquire command hereinafter) is a command for extracting a document below the structured document pass designated in ( ).

"removeXML" (to be simply referred to as a delete command hereinafter) is a command for deleting a document (a document other than a schema document; mainly, a contents document) below the structured document pass designated in ( ).

"setSchema" (to be simply referred to as a schema store command hereinafter) is a command for setting a schema in the structured document pass designated in ( ).

"getSchema" (to be simply referred to as a schema acquire command hereinafter) is a command for extracting a schema set in the structured document pass designated in ( ).

Of these command, processes that pertain to the insert command, append command, and schema store command are executed by the document storing device 21 in the access request processing device 2, processes that pertain to the acquire command and schema acquire command are executed by the document acquiring device 22, and a process that pertains to the delete command is executed by the document deleting device 23.

A case will be explained below with reference to FIG. 5 wherein an append command is executed in the initial state (see FIG. 5(a)) of the structured document database.

As a result of executing "appendXML("uix://root", "<patent DB/>")" with respect to the initial state in which nodes "#0" and "#1" are connected via arc "root", as shown in FIG. 5(a), node "#2" and arc "patent DB" are generated, as shown in FIG. 5(b).

A case will be explained below wherein an acquire command is executed for the structured document database in the state shown in FIG. 5(b).

For example, when "getXML("uix://root")" is executed, a document object tree below node "#0" indicated by arc "root" in FIG. 5(b) is extracted, and is converted into an XML document. As a result, a character string "<root><patent DB/></root>" is extracted, and is converted into an XML document shown in FIG. 6. The process of the acquire command is executed by the document acquiring device 22 of the access request processing device 2.

A case will be described below wherein an append command for storing "patent" information as a contents document (XML document) shown in FIG. 3 is executed for the structured document database in the state shown in FIG. 5(b). In this case, "appendXML("uix://root/patent DB", "<patent> . . . </patent>")" is executed. ""<patent> . . . </patent>"" in this command corresponds to an XML document of "patent" information shown in FIG. 3.

Upon executing the process of the append command, a document object tree (corresponding to FIG. 4) having node "#42" as a top node is appended below node "#2", as shown in FIG. 7.

Assume that the following append command is repetitively executed three times for the structured document database in the state shown in FIG. 5(b).

"appendXML("uix://root/patent DB", "<patent> . . . </patent>")"

""<patent> . . . </patent>"" in this command corresponds to a contents document having the same document structure as that of the XML document shown in FIG. 3.

As a result, document object trees having nodes "#42", "#52", and "#62" as top nodes are appended below node "#2", as shown in FIG. 8.

A case will be explained below wherein an acquire command for extracting "patent" information below node "patent DB" is executed for the structured document database in the state shown in FIG. 8. In this case, "getXML("uix://root/patent DB")" is executed. Thus, a document object tree below node "#2", which is indicated by arc "patent DB" is extracted. As a result, an XML document "<patent DB> <patent> . . . </patent> <patent> . . . </patent> <patent> . . . </patent> </patent DB>" can be acquired, as shown in FIG. 11.

The structured document database also manages data that defines the document structure of a contents document (XML document) such as "patent" information mentioned above, i.e., a schema.

FIG. 12 shows an example of a schema which defines the document structure of an XML document. In this case, XDR (XML-Data Reduced) as one of document structure definition languages of XML will be taken as an example. Of course, other document structure definition languages such as XML-Schema and the like may be used.

The schema shown in FIG. 12 defines the document structure of "patent" information shown in FIG. 3 using XDR. As can be easily understood from FIG. 12, the schema is also an XML structured document. The schema starts from a component starting from a "Schema" tag, and includes a set of components starting from an "ElementType" tag as child components.

The schema shown in FIG. 12 includes the following definitions.

This schema describes the document structure definition of a document that starts from a "patent" tag ("ElementType name="patent"").

Child components are only components ("content="eltOnly"").

Child components include those starting from "title", "date of application", "Applicant" and "abstract" tags ("element type="title", . . . ").

Furthermore, the order of child components is uniquely determined ("order="seq"").

This schema describes the document structure definitions of "title", "applicant", "abstract", "year", "month", "day", and "date of application" in addition to the document structure definition starting from a "patent" tag. That is, it is defined that values of components starting from "title", "applicant", "abstract", "year", "month", and "day" tags are only text ("content="textOnly""). Child components of a component starting from the "date of application" tag have an order of "year", "month", and "day".

A case will be explained below wherein a schema store command for storing the schema document shown in FIG. 12 is executed for the structured document database in the state shown in FIG. 8. In this case, "setSchema("uix://root/patent DB", "<Schema> . . . </Schema>")" is executed.

""<Schema> . . . </Schema>"" in this command corresponds to the schema document shown in FIG. 12.

Upon executing this command, arc "#schema" is appended below node "#2", and a document object tree having node "#3" as a top node is appended at the end of that arc. Since the schema itself has an XML document expression, it is evolved to a tree as in storage of a contents document such as "patent" information mentioned above.

Figure 13:
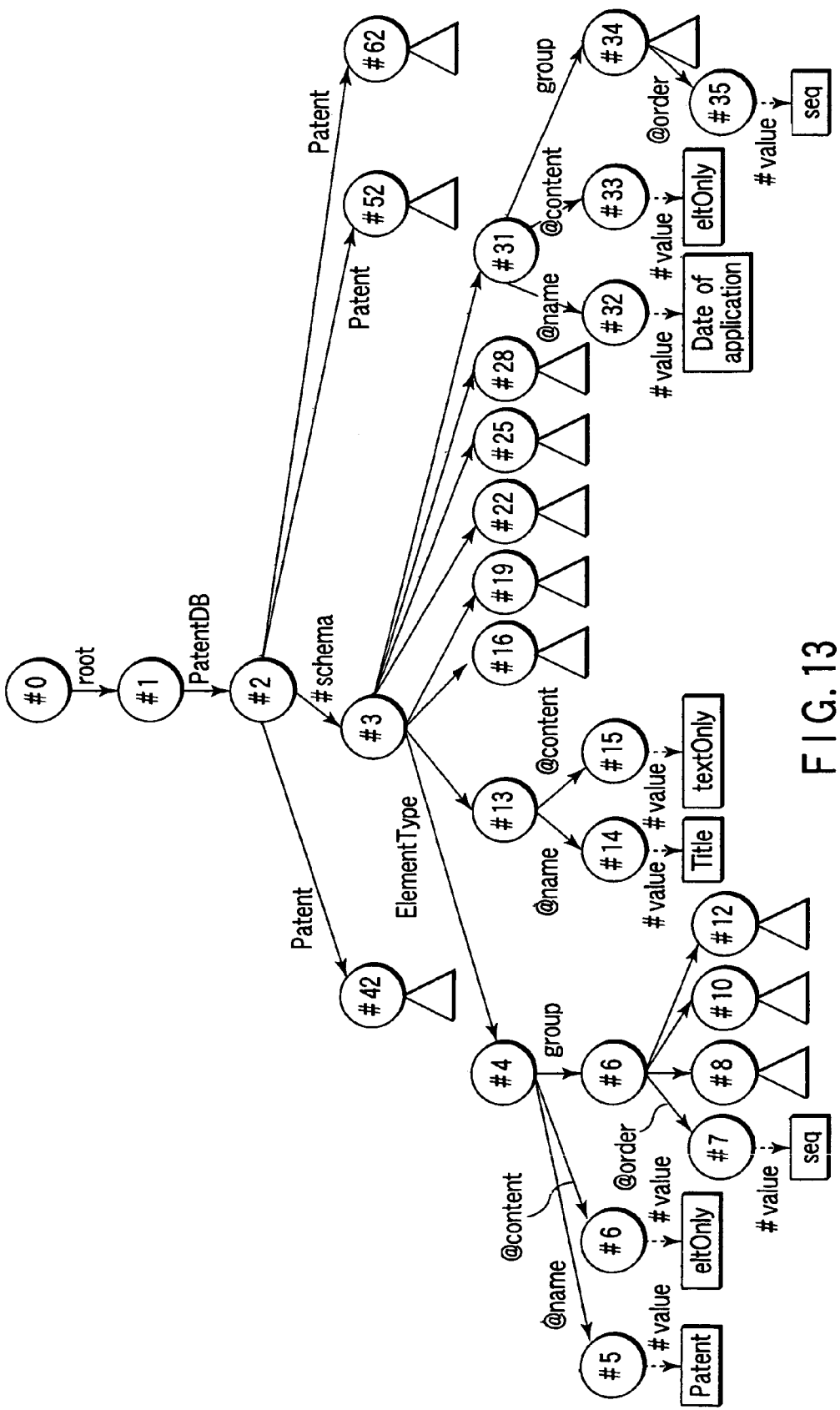
FIG. 13 shows a case wherein the schema shown in FIG. 12 is appended and stored (set) in the structured document database in the state shown in FIG. 8 by executing a schema store command.

In FIG. 13, an arc starting from "@" like "@name" corresponds to an attribute. Since tag name "#schema" starts from "#" and "@", it cannot be used as a standard tag name in the XML standard.

Since the schema document shown in FIG. 12 is stored below node "#2", the document structure of a document to be stored below node "#2" is required to match the document structure defined by the schema document shown in FIG. 12. In other words, the schema shown in FIG. 12 is set below node "#2".

Figure 14:
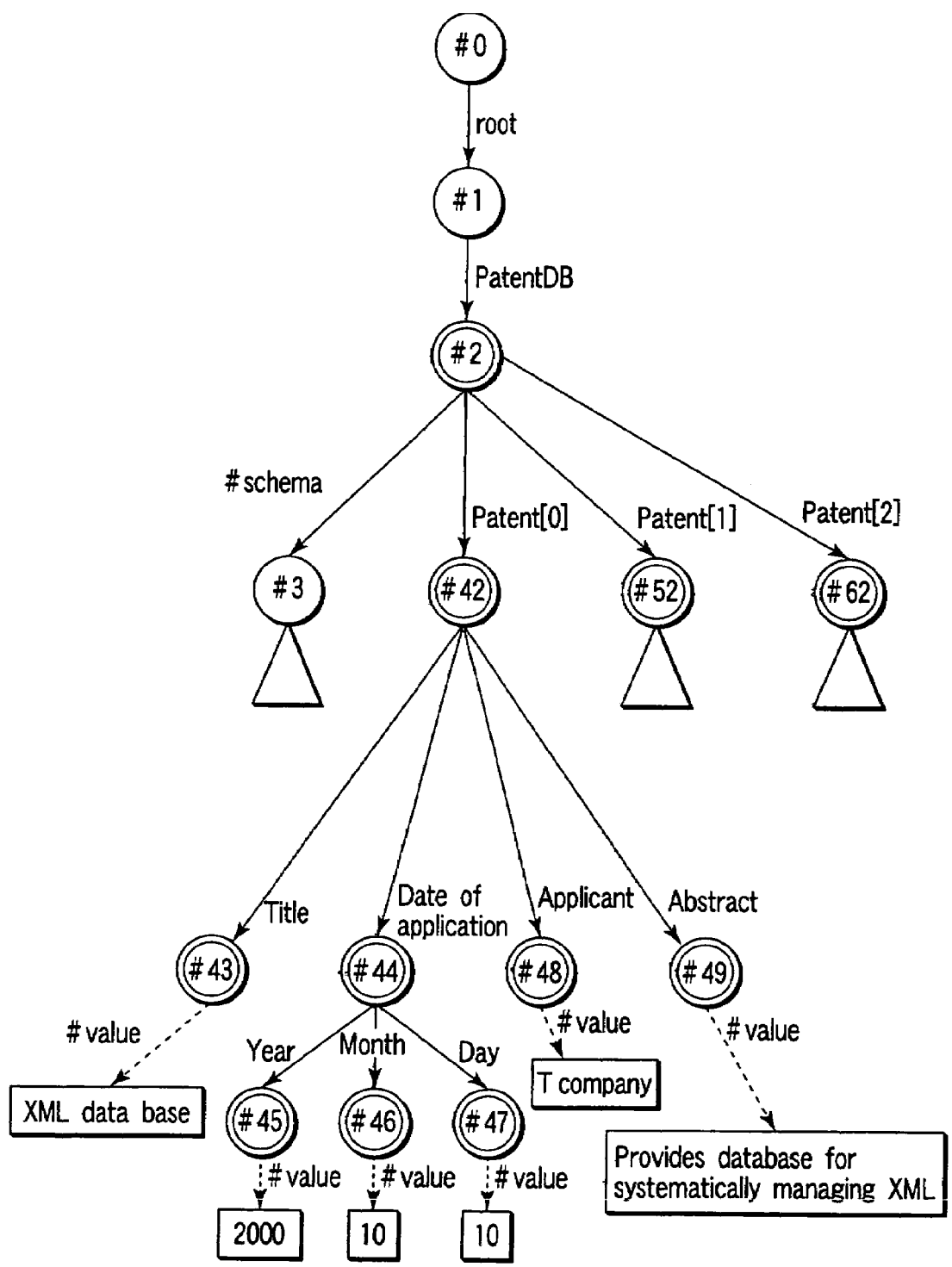
FIG. 14 shows a document object tree which is set with the schema and is also set with an attribute value indicating that the schema is present.

When the schema shown in FIG. 12 is set below node "#2", each node of the document object tree below node "#2" is set with an attribute value indicating the presence of the schema, as shown in FIG. 14.

After the schema shown in FIG. 12 is set below node "#2", when a document of "patent" information shown in FIG. 3 which matches the document structure defined by this schema is stored in the structured document database as a document object tree, as shown in FIG. 14, an attribute value indicating the presence of the schema shown in FIG. 12 is set in each document object which forms the document object tree in the document structure of this document. For example, "1" is set in an attribute value (e.g., "schema matching ON/OFF") indicating if the schema is present for each document object file which forms the document object tree. In FIG. 14, each document object (node) which matches the schema is indicated by a double circle. Each document object indicated by the double circle has the document structure definition corresponding to that document object.

Figure 15:
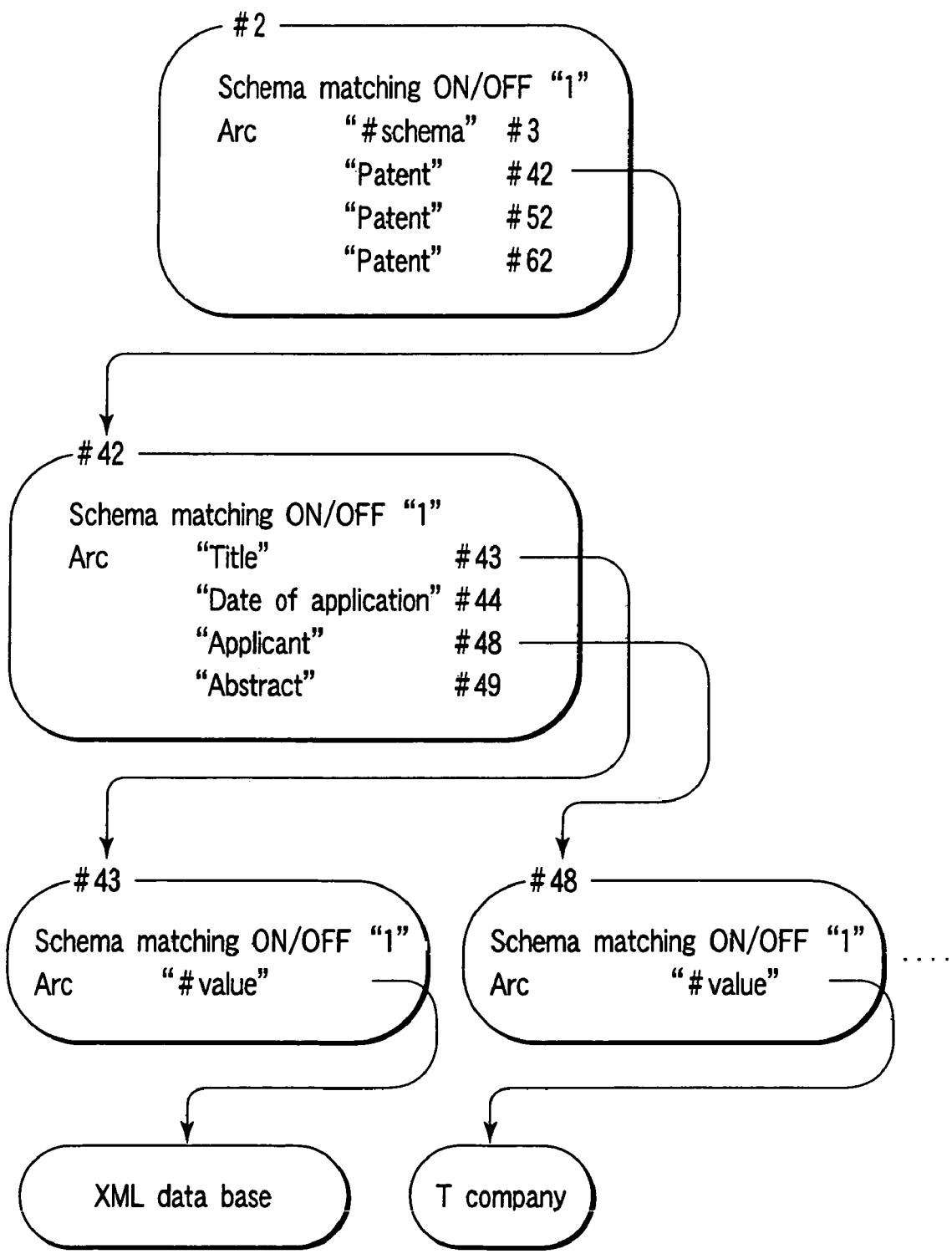
FIG. 15 shows a state wherein respective object store attribute values indicating that the schema is present.

FIG. 15 schematically shows the contents of respective document object files. For example, a document object file with object ID "#42" describes the aforementioned attribute value together with information (e.g., an arc, a pointer value to a document object as a link destination, and the like) associated with another document object linked to that document object. If there is no schema which is applied to that document object, the value "schema matching ON/OFF" is "0".

FIGS. 16 and 17 show examples of structured documents which express concept hierarchies used as needed in retrieval in the structured document management system in FIG. 1. "Concept" information shown in each of FIGS. 16 and 17 is a contents document described in XML.

An example of "concept" information shown in FIG. 16 expresses an "information model" used as one axis of classification used to classify the contents of patent documents in so-called patent research using the concept hierarchy. "Concept" information bounded by "concept" tags has a document structure with a nested structure. That is, in the example shown in FIG. 16, concept "information model" includes, as child concepts, concept "document", concept "relation", and concept "object". Also, concept "document" includes, as child concepts, concept "structured document" and concept "non-structured document". Furthermore, concept "structured document" includes, as child concepts, concept "XML" and concept "SGML".

A description example of "concept" information shown in FIG. 17 expresses axis of classification "information manipulation" different from FIG. 16 using the concept hierarchy. In the example of FIG. 17, concept "information manipulation" includes, as child concepts, concept "retrieval", concept "storage", concept "processing", and concept "distribution".

Figure 18:
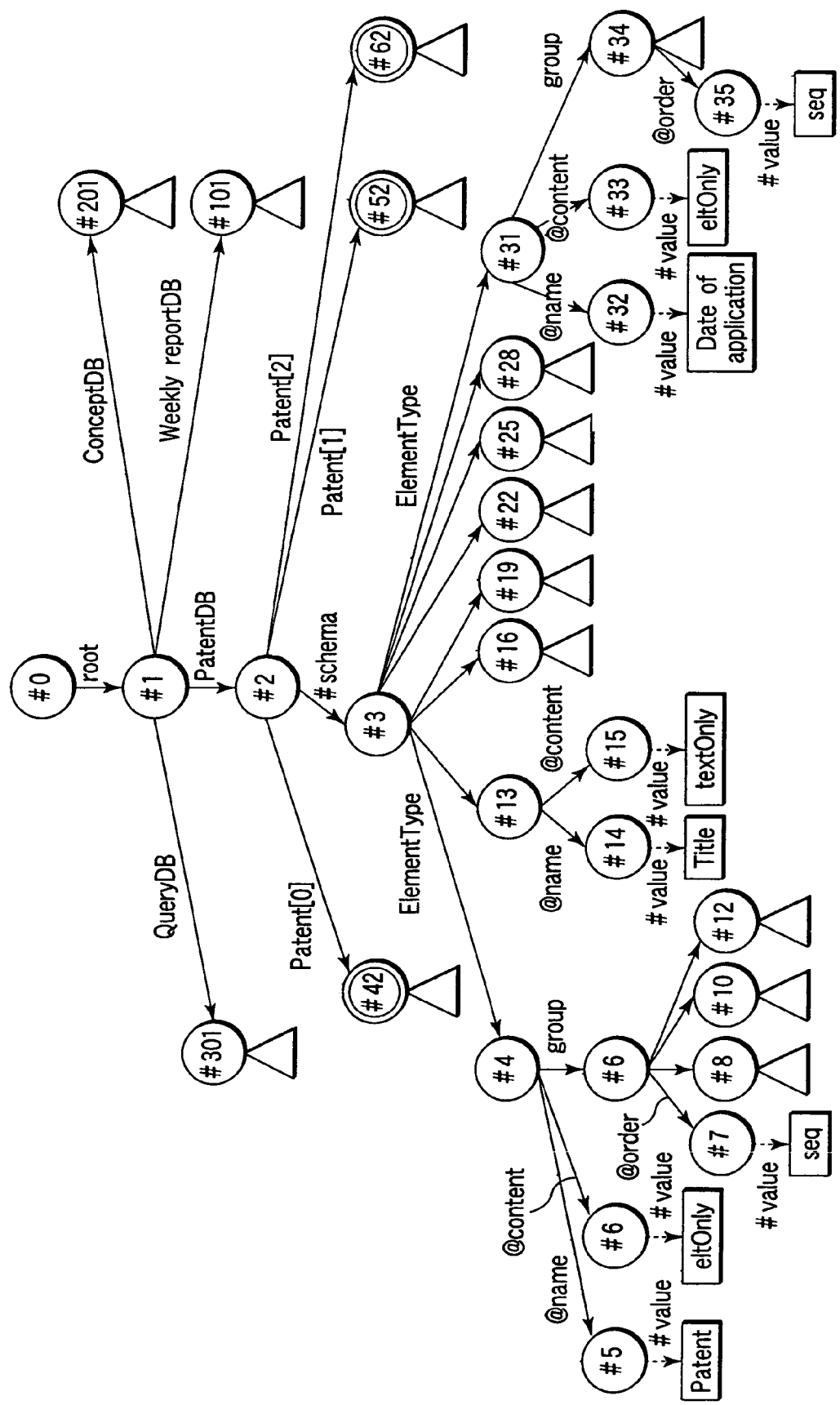
FIG. 18 shows a case wherein a document object tree of "concept" information shown in FIGS. 16 and 17 is appended to the structured document database in the state shown in FIG. 8 by executing an append command.

The "concept" information shown in FIGS. 16 and 17 can also be stored in the structured document database in the same manner as the above "patent" information. More specifically, "appendXML("uix://root", "<concept DB/>")" is executed first for the structured document database in the state shown in FIG. 8, and node "#201" and arc "concept DB" are generated, as shown in FIG. 18. In this state, when the "concept" information shown in FIG. 16 is to be stored, "appendXML("uix://root/concept DB", "<concept name> . . . </concept>")" is executed. In this command, ""<concept name> . . . </concept>"" corresponds to the "concept" information shown in FIG. 16.

Upon execution of the process of the append command, a document object tree having node "#202" as a top node is appended below node "#201", as shown in FIG. 19.

As described above, in the structured document management system shown in FIG. 1, a huge number of XML documents (contents documents, schema documents, query documents, and the like) with different document structures, which are registered on the structured document database, are handled as one tree-like giant XML document starting from the "root" tag, as shown in FIGS. 18 and 19. For this reason, since a given access means which is independent from the document structures, i.e., a pass to the giant XML document is used to access a partial XML document, XML documents can be flexibly retrieved and processed.

Since a schema is set in a portion on the structured document database, the validity indicating if the document structure of a document to be stored matches the document structure defined by that schema can be automatically checked (to be described later).

(1-1) Document Storage Process

The document storage processing operation of the structured document management system shown in FIG. 1 will be explained below with reference to the flow chart shown in FIG. 20.

Figure 20:
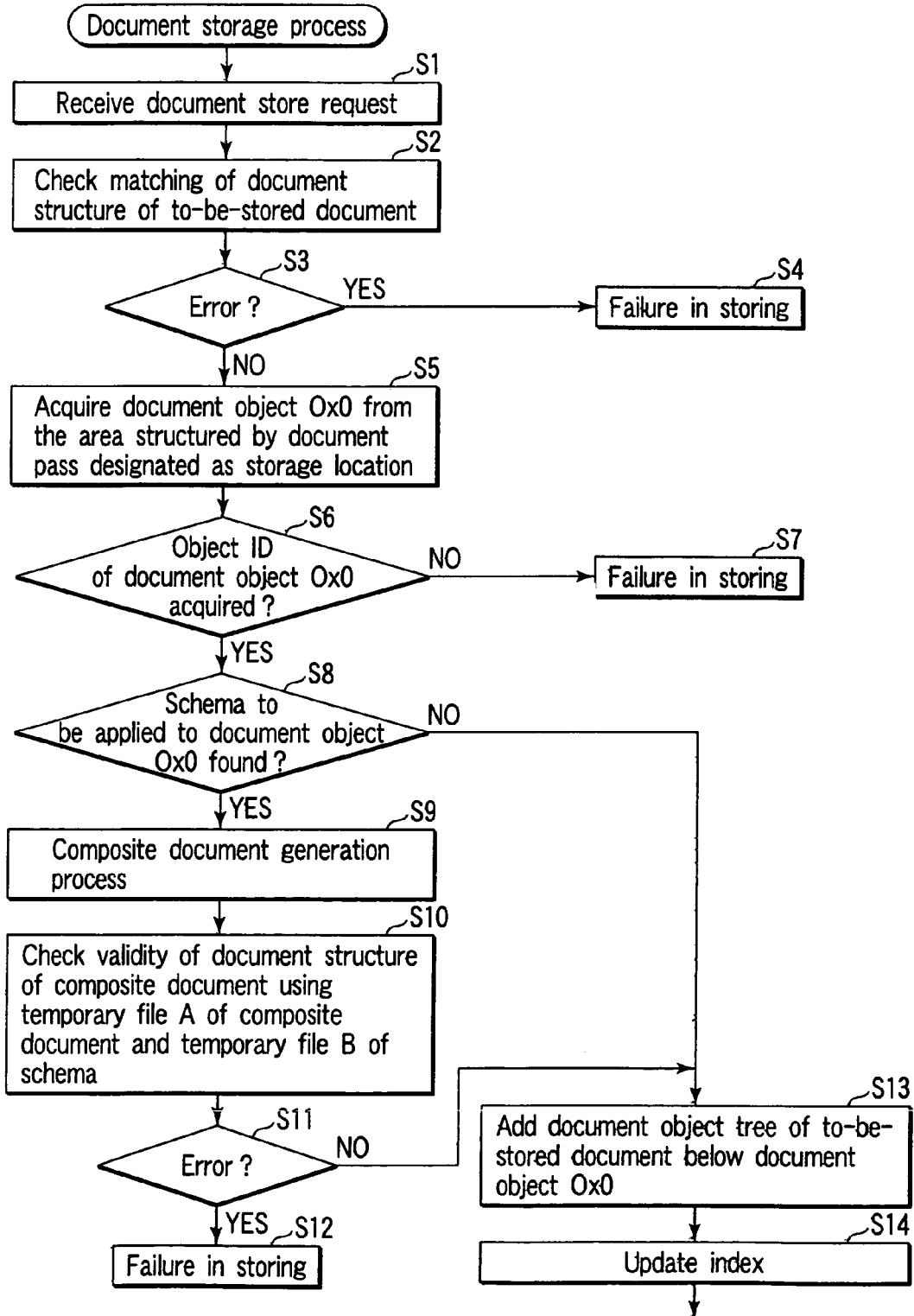
FIG. 20 is a flow chart for explaining the document storage processing operation of the structured document management system shown in FIG. 1.

When one of an insert command, append command, and schema store command is sent as a document store request from the client terminal 102 to the structured document management system 100, and is received by the request receiving device 11, the processing operation shown in FIG. 20 is executed.

Figure 31:
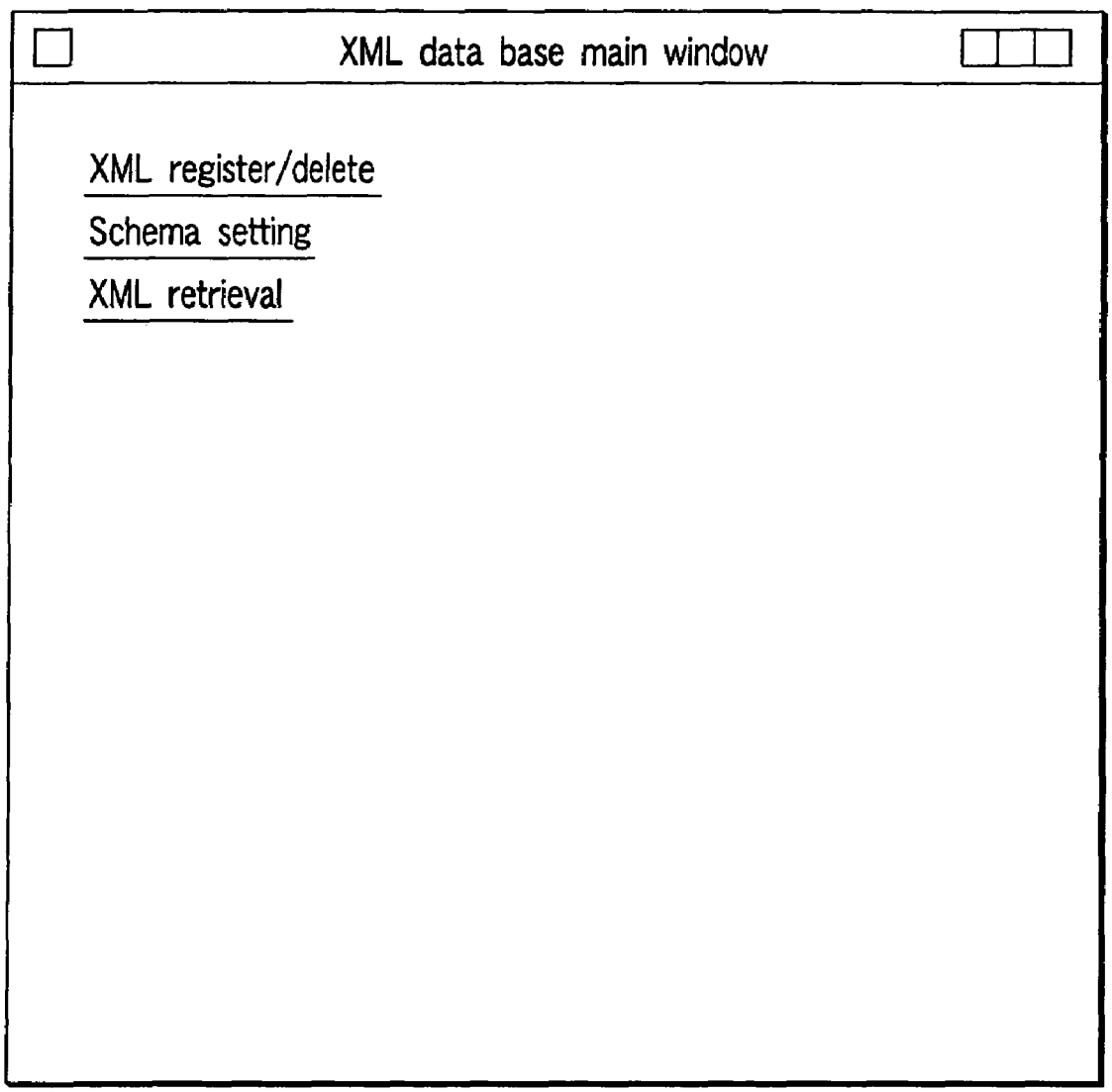
FIG. 31 shows a display example of a window as a user interface.

A display of the client terminal 102 displays a window as a user interface shown in, e.g., FIG. 31, which is provided from (e.g., the request control device 1 of) the structured document management system 100.

The window shown in FIG. 31 displays a list (menu) of manipulation items to the structured document management system 100. The manipulation items include "register/delete XML", "set schema", and "retrieve XML".

Figure 32:
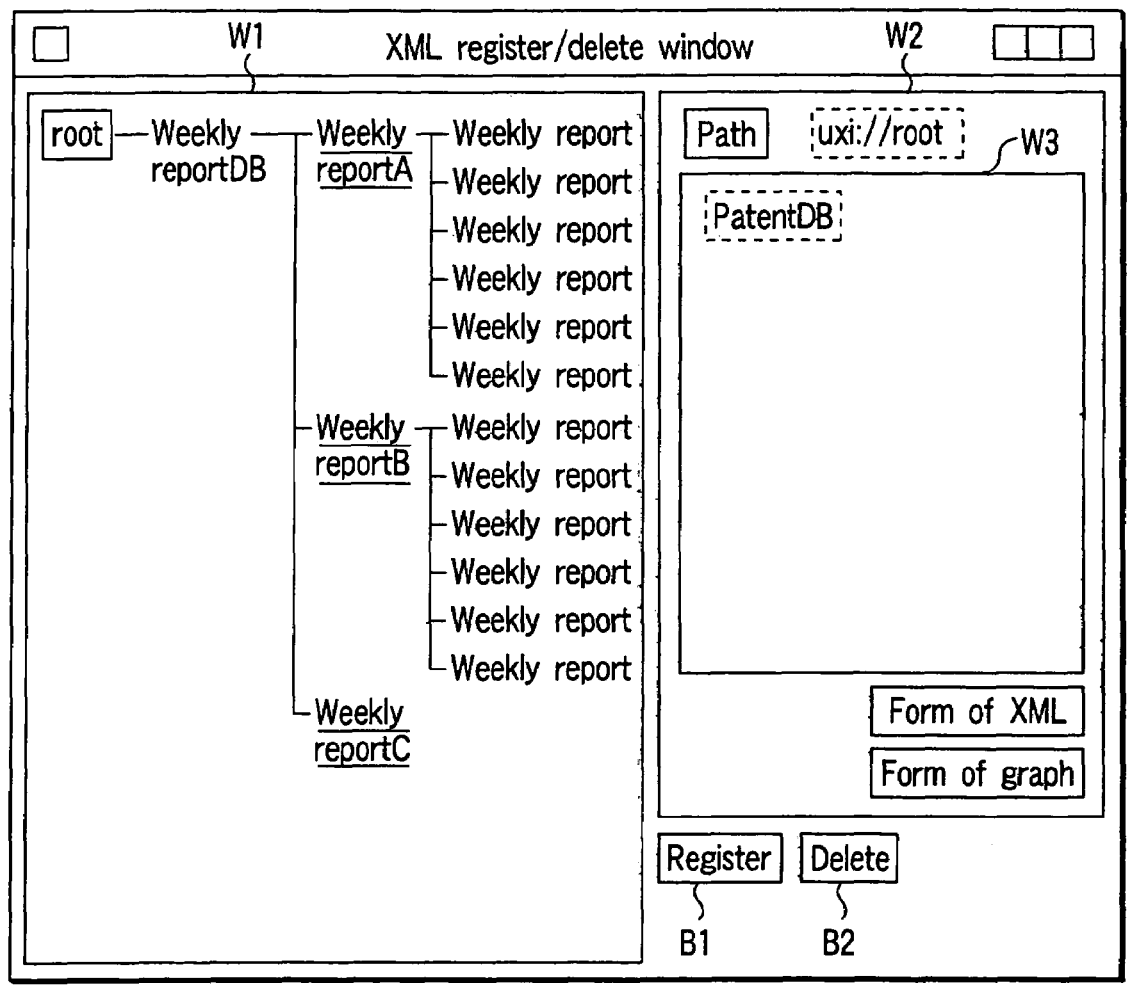
FIG. 32 shows a display example of a window as a user interface for storing/deleting a document.

When the user selects "XML register/delete" on this window using a pointing device such as a mouse or the like, a window as a user interface for storing/deleting a document, as shown in FIG. 32, is displayed.

In FIG. 32, region W1 displays component names (tag names) of the current tree structure of the structured document database in a simplified form so that the user can understand. FIG. 32 displays only component names of upper layers, but can display up to end component names. Also, region W2 is an input region of a structured document pass, and a structured document pass is input in accordance with the display contents on region W1. Region W3 is used to input a document to be stored or to display acquired documents.

Figure 33:
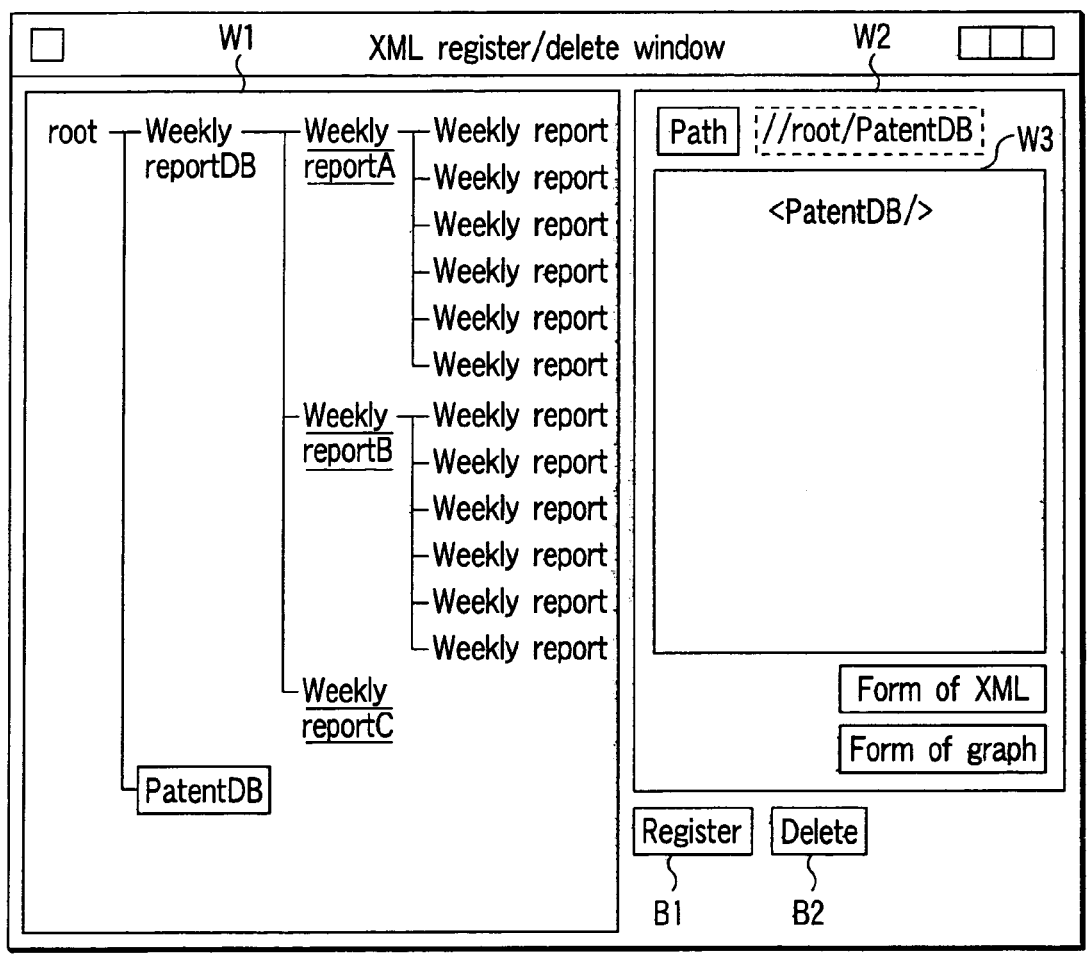
FIG. 33 shows a display example of a window as a user interface for storing/deleting a document.

When "root" which is already present in the structured document database is input as the structured document pass, the user can select "root" on region W1 using, e.g., the mouse. Then, "uix://root" is displayed on region W2 as the structured document pass input region, as shown in FIG. 32. When new component "patent DB" is to be appended, the user inputs "patent DB" on region W3; as shown in FIG. 32. When the user selects "register" button B1, the client terminal sends append command "append XML("uix://root", "<patent DB/>")" to the structured document management system. The structured document management system receives the append command, and executes a process to be described later. As a result, node "#2" and arc "patent DB" are generated, as shown in, e.g., FIG. 5(b). On region W1, "patent DB" is additionally displayed below "root", as shown in FIG. 33.

Figures 34, 35:
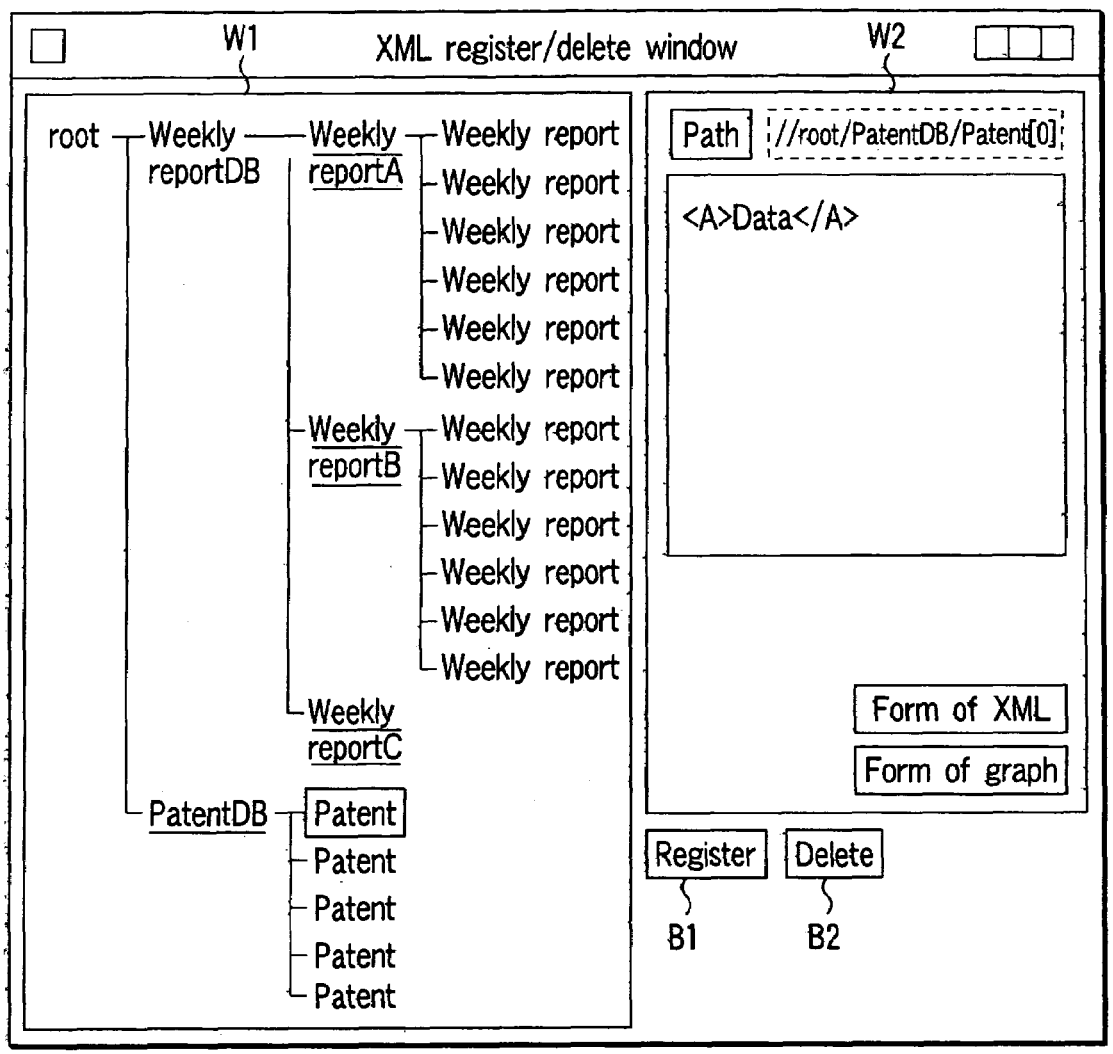
FIG. 34 shows a display example of a window as a user interface for storing/deleting a document.
FIG. 35 shows a display example of a message which is to be returned to a client when an error has occurred in validity check.

When the user inputs, e.g., document "<A> data </A>" on region W3 on the document store/delete window shown in FIG. 34 (or inputs by loading from a predetermined recording medium or the like such as a CD-ROM or the like), and selects "patent [0]" on region W1 using, e.g., the mouse, "uix://root/patent DB/patent [0]" is displayed on structured document pass input region W2. When the user selects "register" button B1, the client terminal sends append command "appendXML("uix://root", "<patent DB/>")" to the structured document management system.

A case will be exemplified below with reference to the flow chart shown in FIG. 20 wherein append command "appendXML("uix://root/patent DB/patent [0]", "<A> data </A>")" is received when the structured document database is in the state shown in FIG. 14.

Upon receiving the above append command, the request receiving device 11 passes structured document pass "uix://root/patent DB/patent [0]" and document "<A> data </A>" (to be referred to as a to-be-stored document hereinafter) as two parameters in that append command to the document storing device 21, (step S1).

The document storing device 21 passes the to-be-stored document to the document parser device 46. The document parser device 46 loads and parses the to-be-stored document, and checks matching, i.e., if the document structure of that to-be-stored document has a correct format specified by XML (step S2).

If any error is found in checking of matching (step S3), a message "document store failure" is returned to the client terminal via the document storing device 21 and result processing device 12 (step S4).

If no error is found in checking of matching, the document storing device 21 passes the structured document pass to the document-object-tree acquiring device 43. The document-object-tree acquiring device 43 specifies a physical area in the document storage 5 based on the structured document pass, thus extracting a document object tree which contains a node (document object Ox0) which is present in that area and is expressed by the structured document pass (step S5). If the structured document pass is designated correctly, since the object ID of document object Ox0 can be acquired (step S6), the flow advances to step S8 in that case.

For example, in case of the append command, since node "#42" becomes document object Ox0, "#42" is acquired as its object ID, and a document object tree containing this node "#42" (for example, a document object tree made up of all descendant nodes of node "#42", all (brother) nodes in the same layer as node "#42", and node "#2" as a parent node of node "#42") is acquired.

If no document object Ox0 corresponding to the designated structured document pass is found, an error occurs (step S6), and a message "document store failure" is returned to the client terminal via the document storing device 21 and result processing device 12 (step S7).

For example, when the structured document database is in the state shown in FIG. 18, and when the structured document pass "uix://root/other" is described as a parameter of the append command, since there is no document object corresponding to this pass, an error occurs in step S6, and the flow advances to step S7.

It is checked in step S8 if document object Ox0 includes a schema. This checking step can be done by checking the attribute value since the attribute value is described in each document object file, as described above. If the value of "schema matching ON/OFF" of document object Ox0 is "1", the flow advances to step S9.

The process in step S9 in FIG. 20 (the process of the composite document generating device 47) will be described in detail below with reference to the flow chart shown in FIG. 21.

The document storing device 21 passes the document object tree acquired in step S5 to the composite document generating device 47.

The composite document generating device 47 searches for document object Ox1 having a "Schema" tag as a child component by tracing this document object tree from document object Ox0 (step S21).

For example, in the structured document database shown in FIG. 14, since node "#2" as a parent node of node "#42" as document object Ox0 is linked to a node (node "#3") which has a "Schema" tag as a top (head) tag (it has a "Schema" tag as a child component), this node "#2" corresponds to document object Ox1. Hence, the flow advances from step S22 to step S23.

By tracing arcs from this document object Ox1 to document object Ox0 and further from document object Ox0, document object tree Ot1 which is located downstream document object Ox0 and is made up of all child nodes with a document object attribute value "1" is extracted (step S23).

For example, when the structured document pass of the parameter in the append command is designated as "uix://root/patent DB/patent [0]", document object tree Ot1 is made up of nodes "#42" to "#49" (see FIG. 14).

The flow then advances to step S25.

In step S25, a document object tree of the to-be-stored document is inserted into document object tree Ot1 as a child node of document object Ox0. As a result, new document object tree Ot2 is obtained.

This document object tree Ot2 is converted into an XML document, which is output to temporary file A (step S27).

For example, FIG. 22 shows an XML document obtained by converting document object tree Ot2 of a composite document, which is obtained by inserting the document object tree (one document object in this case) of to-be-stored document "<A> data </A>" of the parameter in append command into document object tree Ot1 made up of nodes "#42" to "#49" as a child node of node "#42". This composite document is obtained by appending data "<A> data </A>" to "patent" information which is stored so far.

The XML document shown in FIG. 22, i.e., the composite document is output to and temporarily stored in temporary file A.

On the other hand, document object tree Ot3 below the schema tag is converted into an XML document, which is output to temporary file B (step S28). That is, temporary file B temporarily stores a schema document.

For example, FIG. 23 shows an XML document obtained by converting a document object tree having node "#3" as a top node, i.e., document object tree Ot3. The XML document shown in FIG. 23 is output to and temporarily stored in temporary file B.

As shown in FIG. 22, in temporary file A ("tmp000.xml"), the to-be-stored document, i.e., "<A> data </A>" in this case, is inserted in addition to components of original "patent" information. Also, temporary file A describes link information "xmlns="x-schema:tmp001.xml"" to temporary file B ("tmp001.xml"). This description designates temporary file B to which the schema that is applied to "patent" information is output.

The description will revert to FIG. 20.

In step S10, the document storing device 21 passes temporary file A of the composite document and temporary file B of the schema to the document parser device 46 to check the validity of the document structure of the composite document. That is, the document parser device 46 loads temporary file A of the composite document and temporary file B of the schema, and checks if the document structure of the composite document matches that defined by the schema.

For example, when the validity is checked using the composite document shown in FIG. 22 and the schema shown in FIG. 23, since the composite document includes component "A" which is not defined by the schema, the composite document in FIG. 23 causes an error in validity check (step S11). In this case, a message "document store failure" is returned to the client terminal via the document storing device 21 and result processing device 12 (step S12).

For example, the display of the client terminal displays a message shown in FIG. 35.

A case will be described below with reference to FIG. 20 wherein append command "appendXML("uix://root/patent DB", "<patent> . . . </patent>")" is received when the structured document database is in the state shown in FIG. 14. As in the above case, object ID "#2" of document object Ox0 is acquired (step S5). Since this document object includes a schema (step S8), a composite document is generated in step S9.

Figure 21:
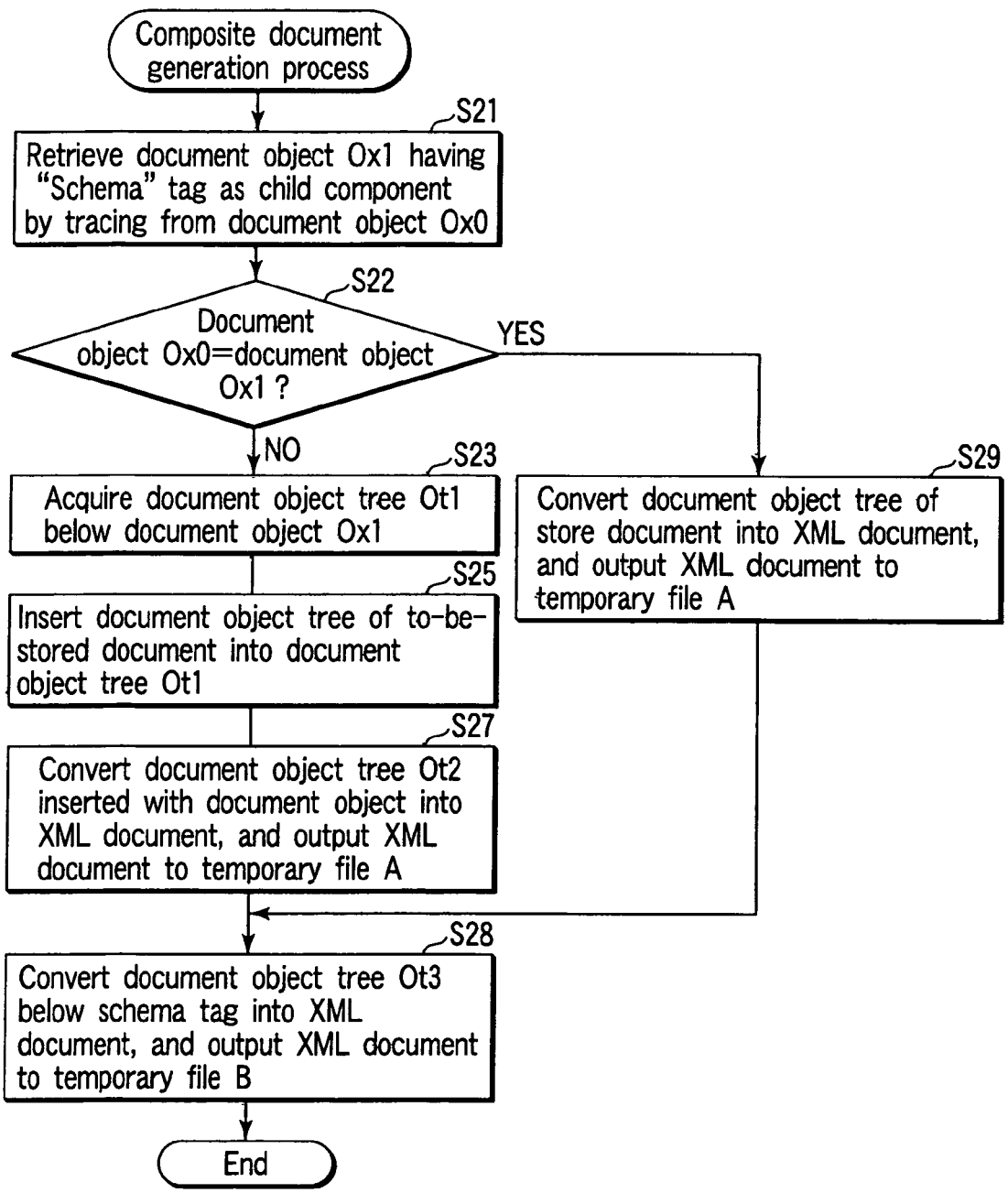
FIG. 21 is a flow chart for explaining the process in step S9 (the process of a composite document generating device) in FIG. 20.

In this case, since node "#2" itself as document object Ox0 is linked to a node having a "Schema" tag as a top (head) tag (node "#3"), this node "#2" becomes document object Ox1 (step S21 in FIG. 21). That is, since document objects Ox0 and Ox1 are the same (step S22), the flow advances to step S29, and the document object tree of the to-be-stored document "<patent> . . . </patent>" is converted into an XML document and is output to temporary file A (step S29).

For example, as shown in FIG. 24, "patent" information as the to-be-stored document, i.e., "<patent> . . . </patent>" in this case, is output to temporary file A ("tmp000.xml"). Also, temporary file A describes link information "xmls="x-schema:tmp001.xml"" to temporary file B ("tmp001.xml").

The flow then advances to step S28. As shown in FIG. 25, the XML document obtained by converting the document object tree of the schema, which has node "#3" as a top node, is output to temporary file B.

When the validity between the composite document shown in FIG. 24 and the schema shown in FIG. 25 is checked in step S10 in FIG. 20, the document structure of the composite document matches that defined by the schema. In this case, the flow advances from step S11 to step S13.

In step S13, the document object tree of the to-be-stored document is appended below document object Ox0. That is, the document storing device 21 assigns object IDs to respective document objects (files) which form the document object tree of the to-be-stored document, and document object Ox0 is linked to the head document object of the document object tree of the to-be-stored document. The document-object-tree storing device 31 stores document objects (files) which form the document object tree of the to-be-stored document in the document storage 5.

The flow then advances to step S14 to update the indices in the index storage 6.

If it is determined in step S8 that document object Ox0 has an attribute value "0", validity checking of the document structure of the composite document using the schema is skipped, and the flow jumps to step S13. Then, the document object tree of the to-be-stored document is appended below document object Ox0 (step S13), and the indices in the index storage 6 are updated accordingly (step S14).

(1-2) Document Acquiring Process

The document acquiring processing operation of the structured document management system shown in FIG. 1 will be described below with reference to the flow chart shown in FIG. 26.

Figure 26:
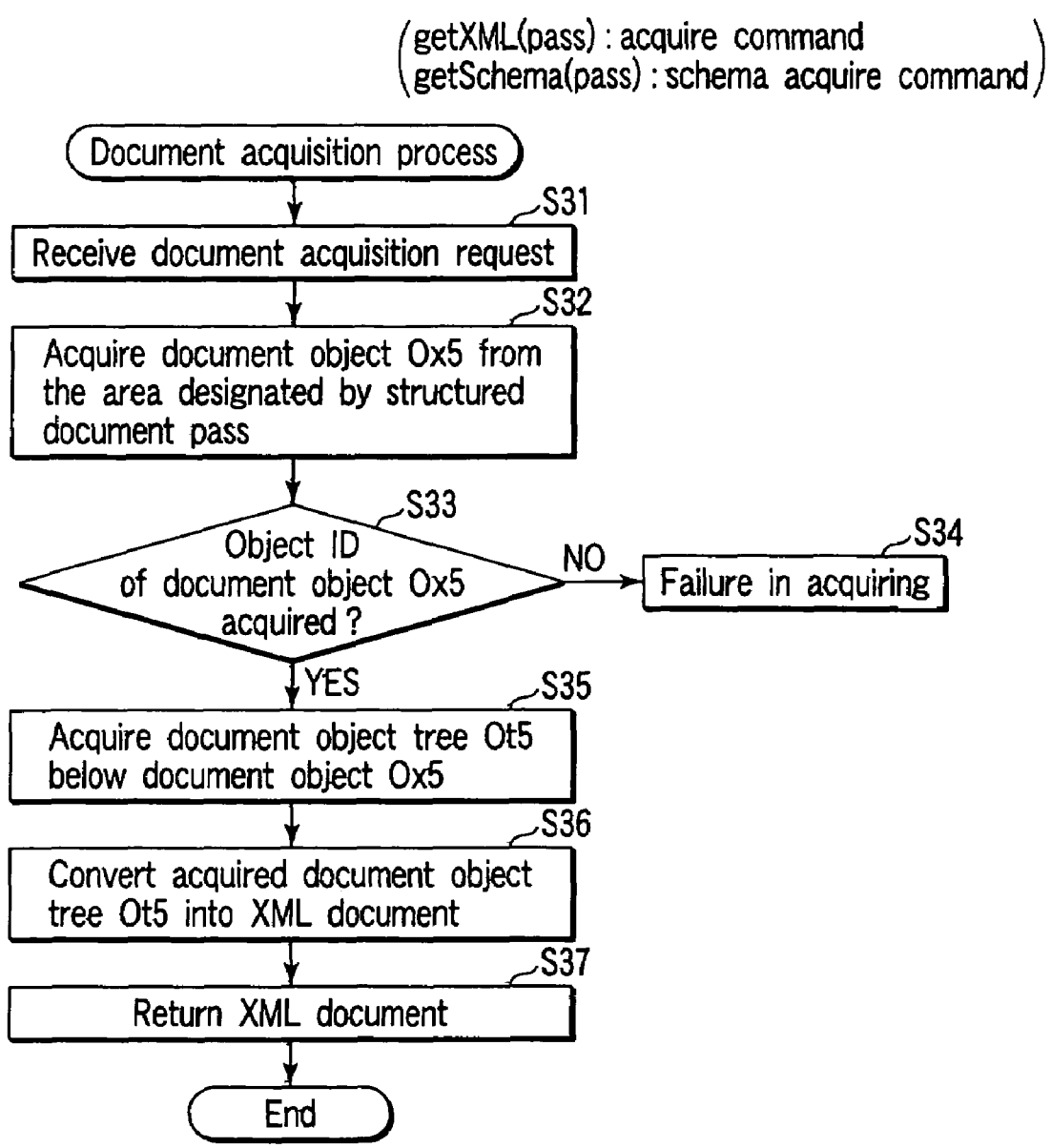
FIG. 26 is a flow chart for explaining a document acquiring processing operation of the structured document management system shown in FIG. 1.

When one of an acquire command and schema acquire command is sent as a document acquire request from the client terminal 102 to the structured document management system 100, and is received by the request receiving device 11, the processing operation shown in FIG. 26 is executed.

Figure 36:
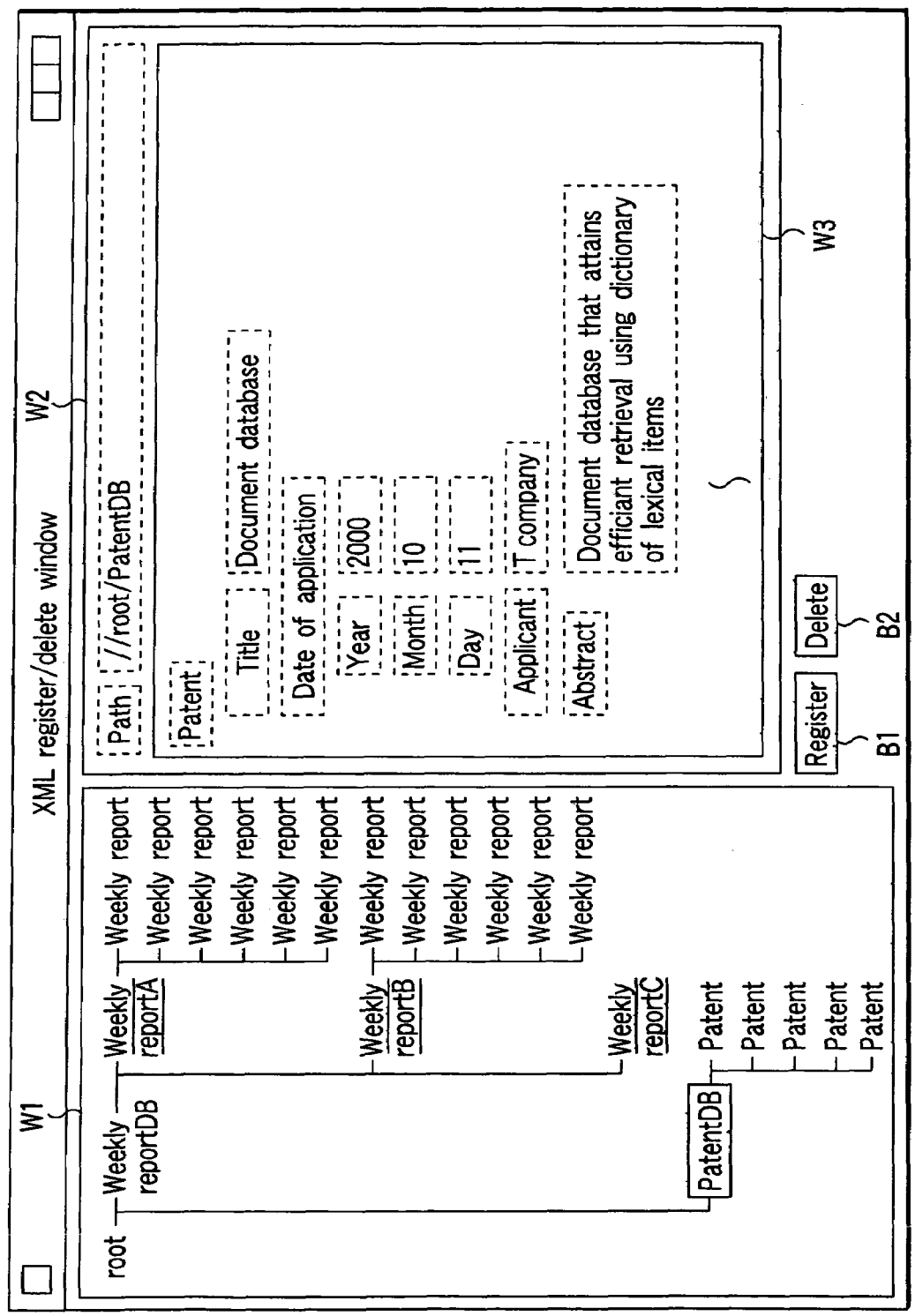
FIG. 36 shows a display example of a window as a user interface for storing/deleting a document, and is a view for explaining a document acquiring operation.

For example, when the user selects "patent DB" of region W1 on the document store/delete window shown in FIG. 36 using, e.g., the mouse, "uix://root/patent DB" is displayed on structured document pass input region W2, and acquire command "getXML("uix://root/patent DB")" is sent to the structured document management system.

A case will be exemplified below wherein acquire command "getXML("uix://root/patent DB")" is received when the structured document database is in the state shown in FIG. 8.

Upon receiving the acquire command, the request receiving device 11 passes structured document pass "uix://root/patent DB" as a parameter in the acquire command to the document acquiring device 22 (step S31).

The document acquiring device 22 passes the structured document pass to the document-object-tree acquiring device 43. The document-object-tree acquiring device 43 specifies a physical area in the document storage 5 based on the structured document pass to extract a node (document object Ox5) which is present in that area and is designated by the structured document pass (step S32). If the structured document pass is correctly designated, since the object ID of document object Ox5 can be acquired (step S33), the flow advances to step S35 in such case.

For example, in case of the above acquire command, since node "#2" corresponds to document object Ox5, "#2" is acquired as its object ID, and document object tree Ot5 (node "#2", nodes "#42" to "#49", nodes below node "#52", and nodes below node "#62") below node "#2" is acquired (step S35).

If no document object Ox5 corresponding to the designated structured document pass is found in step S32, an error occurs (step S33), and a message "document acquire failure" is returned to the client terminal via the document acquiring device 22 and result processing device 12 (step S34).

Document object tree Ot5 acquired in step S35 is converted into an XML document by the document-object-tree converting device 44. For example, in case of the above acquire command, the acquired XML document includes that of three pieces of "patent" information, as shown in FIG. 11.

The document acquiring device 22 returns the XML document shown in FIG. 11 to the client terminal together with a predetermined style sheet (e.g., XSL (eXtensible Style Language) via the result processing device 12 (step S37).

The client terminal 102 converts the XML document shown in FIG. 11 into HTML data using the style sheet, and displays the converted data on region W2, as shown in, e.g., FIG. 36.

Using XSL, an XML document can be converted into various formats. That is, an XML document can be converted into that having another document structure, or an HTML page can be generated from the XML document.

(1-3) Document Deleting Process

The document deleting processing operation of the structured document management system shown in FIG. 1 will be described below with reference to the flow chart shown in FIG. 27.

Figure 27:
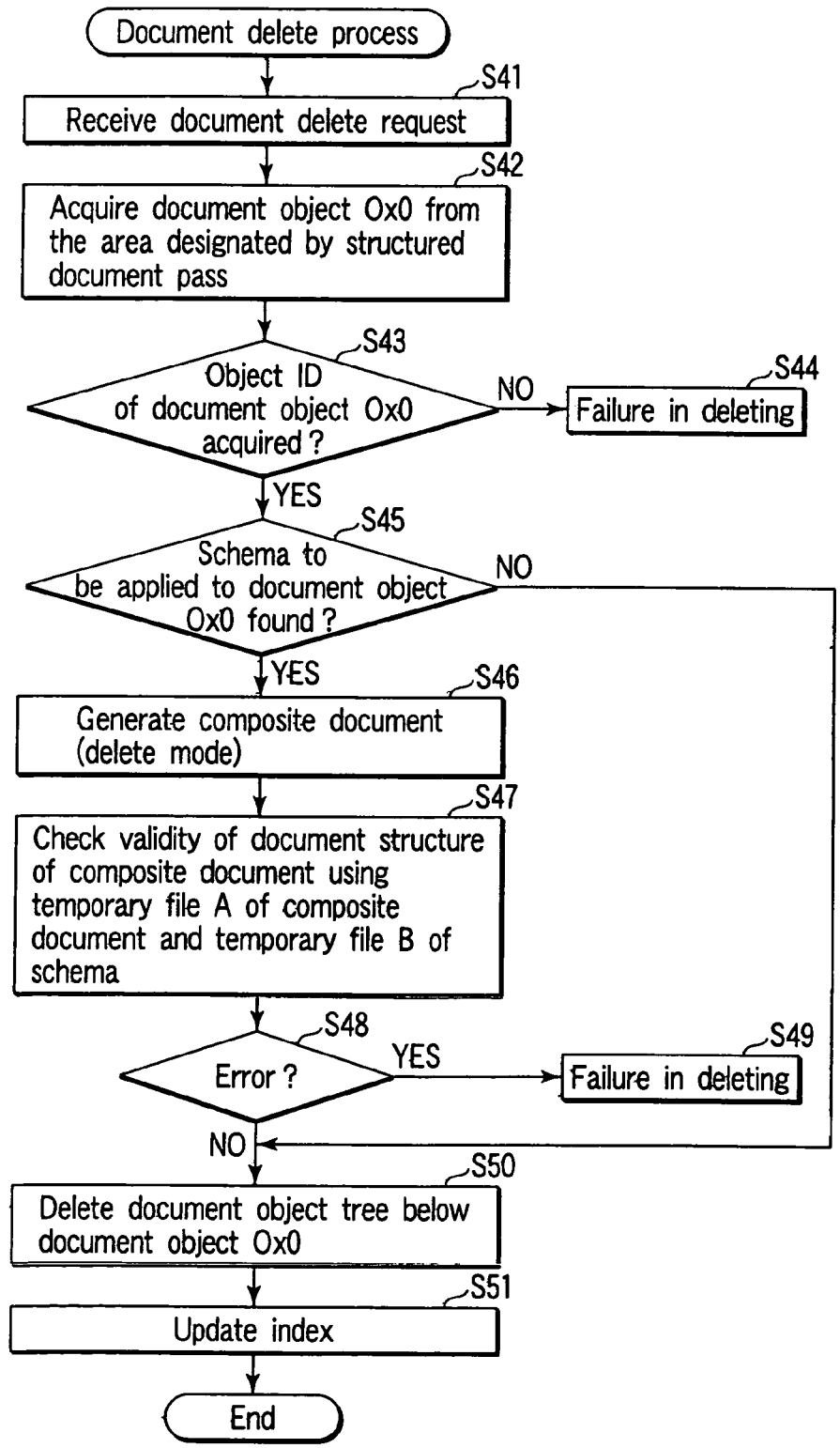
FIG. 27 is a flow chart for explaining a document deleting processing operation of the structured document management system shown in FIG. 1.

When a delete command is sent as a document delete request from the client terminal 102 to the structured document management system 100, and is received by the request receiving device 11, the processing operation shown in FIG. 27 is executed.

For example, when the user selects "patent DB" of region W1 on the document store/delete window shown in FIG. 36 using, e.g., the mouse, "uix://root/patent DB" is displayed on structured document pass input region W2. Furthermore, when the user selects "delete" button B2, delete command "removeXML("uix://root/patent DB")" is sent to the structured document management system 100.

A case will be exemplified below wherein delete command "removeXML("uix://root/patent DB/patent [0]/date of application")" is received when the structured document database is in the state shown in FIG. 14.

Upon receiving the delete command, the request receiving device 11 passes structured document pass "uix://root/patent DB/patent [0]/date of application" as a parameter in the delete command to the document deleting device 23.

The document deleting device 23 passes the structured document pass to the document-object-tree acquiring device 43. The document-object-tree acquiring device 43 specifies a physical area in the document storage 5 based on the structured document pass, thus extracting a document object tree which contains a node (document object Ox0) which is present in that area and is expressed by the structured document pass (step S42). If the structured document pass is designated correctly, since the object ID of document object Ox0 can be acquired (step S43), the flow advances to step S45 in that case.

For example, in case of the above delete command, since node "#44" corresponds to document object Ox0, "#44" is acquired as its object ID. Furthermore, a document object tree containing node "#44" (for example, a document object tree made up of all descendant nodes of node "#44", all (brother) nodes in the same layer as node "#44", node "#42" as a parent node of node "#44", and node "#2" as its parent node) is acquired.

If no document object Ox0 corresponding to the designated structured document pass is found, an error occurs (step S43), and a message "document delete failure" is returned to the client terminal via the document storing device 21 and result processing device 12 (step S44).

It is checked in step S45 if document object Ox0 includes a schema. This checking step can be done by checking the attribute value since the attribute value is described in each document object file, as described above. If the attribute value of document object Ox0 is "1", the flow advances to step S46.

The process in step S46 in FIG. 27 (the process of the composite document generating device 47 (for a delete command)) will be described in detail below with reference to the flow chart shown in FIG. 28.

Note that the same reference numerals in FIG. 28 denote the same steps as in FIG. 21.

The document storing device 21 passes the document object tree acquired in step S42 to the composite document generating device 47.

The composite document generating device 47 searches for document object Ox1 having a "Schema" tag as a child component by tracing this document object tree from document object Ox0 (step S21).

For example, in the structured document database shown in FIG. 14, since node "#2" as a parent node of node "#42" as document object Ox0 is linked to a node (node "#3") which has a "Schema" tag as a top (head) tag (it has a "Schema" tag as a child component), this node "#2" corresponds to document object Ox1.

By tracing arcs from this document object Ox1 to document object Ox0 and further from document object Ox0, document object tree Ot1 which is located downstream document object Ox0 and is made up of all child nodes with a document object attribute value "1" is extracted (step S23).

For example, when the structured document pass of the parameter in the delete command is designated as "uix://root/patent DB/patent [0]/date of application", document object tree Ot1 is made up of nodes "#42" to "#49" (see FIG. 14).

The flow then advances to step S26, and a document object tree below document object Ox0 is deleted from document object tree Ot1. As a result, new document object tree Ot2 is obtained.

This document object tree Ot2 is converted into an XML document, which is output to temporary file A (step S27).

For example, FIG. 29 shows an XML document obtained by converting document object tree Ot2 of a composite document, which is obtained by deleting the document object tree below node "#44" designated by structured document pass "uix://root/patent DB/patent [0]/date of application" of the parameter in the delete command from document object tree Ot1 made up of nodes "#42" to "#49". This composite document is obtained by deleting data "<date of application></date of application>" from "patent" information which is stored so far.

The XML document shown in FIG. 29, i.e., the composite document is output to and temporarily stored in temporary file A.

On the other hand, document object tree Ot3 below the schema tag is converted into an XML document, which is output to temporary file B (step S28). That is, temporary file B temporarily stores a schema document.

For example, FIG. 30 shows an XML document obtained by converting a document object tree having node "#3" as a top node, i.e., document object tree Ot3. The XML document shown in FIG. 30 is output to and temporarily stored in temporary file B.

The description will revert to FIG. 27.

In step S47, the document deleting device 21 supplies temporary file A of the composite document and temporary file B of the schema to the document parser device 46 to make it check the validity of the document structure of the composite document as in the document storage process.

For example, when the validity is checked using the composite document shown in FIG. 29 and the schema shown in FIG. 30, since the composite document does not include any component "date of application" which is defined by the schema, the composite document in FIG. 29 causes an error in validity check (step S48). In this case, a message "document delete failure" is returned to the client terminal via the document storing device 21 and result processing device 12 (step S49).

When delete command "removeXML("uix://root/patent DB/patent [0]")" is processed according to FIG. 27 while the structured document database is in the state shown in FIG. 14, the composite document shown in FIG. 24 is output to temporary file A in step S27 in FIG. 28. Temporary file B is the same as that shown in FIG. 30.

At this time, when the validity is checked using the composite document shown in FIG. 24 and the schema shown in FIG. 30, since the document structure of the composite document matches that defined by the schema, the flow advances from step S48 to step S50.

In step S50, a document object tree below document object Ox0 is deleted. That is, the document-object-tree deleting device 42 deletes document objects (files) which form the document object tree below document object Ox0 from the document storage 5. For example, files of document objects below node "#42" are deleted from node "#2".

The flow then advances to step S51 to update the indices in the index storage 6. Also, "patent [0]" disappears from region W1 on the display window shown in FIG. 36 of the client terminal 102.

If it is determined in step S45 that document object Ox0 has an attribute value "0", validity checking of the document structure of the composite document using the schema is skipped, and the flow jumps to step S50. Then, the document object tree below document object Ox0 is deleted (step S50), and the indices of the index storage 6 are updated accordingly (step S51).

(1-4) Setting of Schema, Document Storage Using Schema

Figure 37:
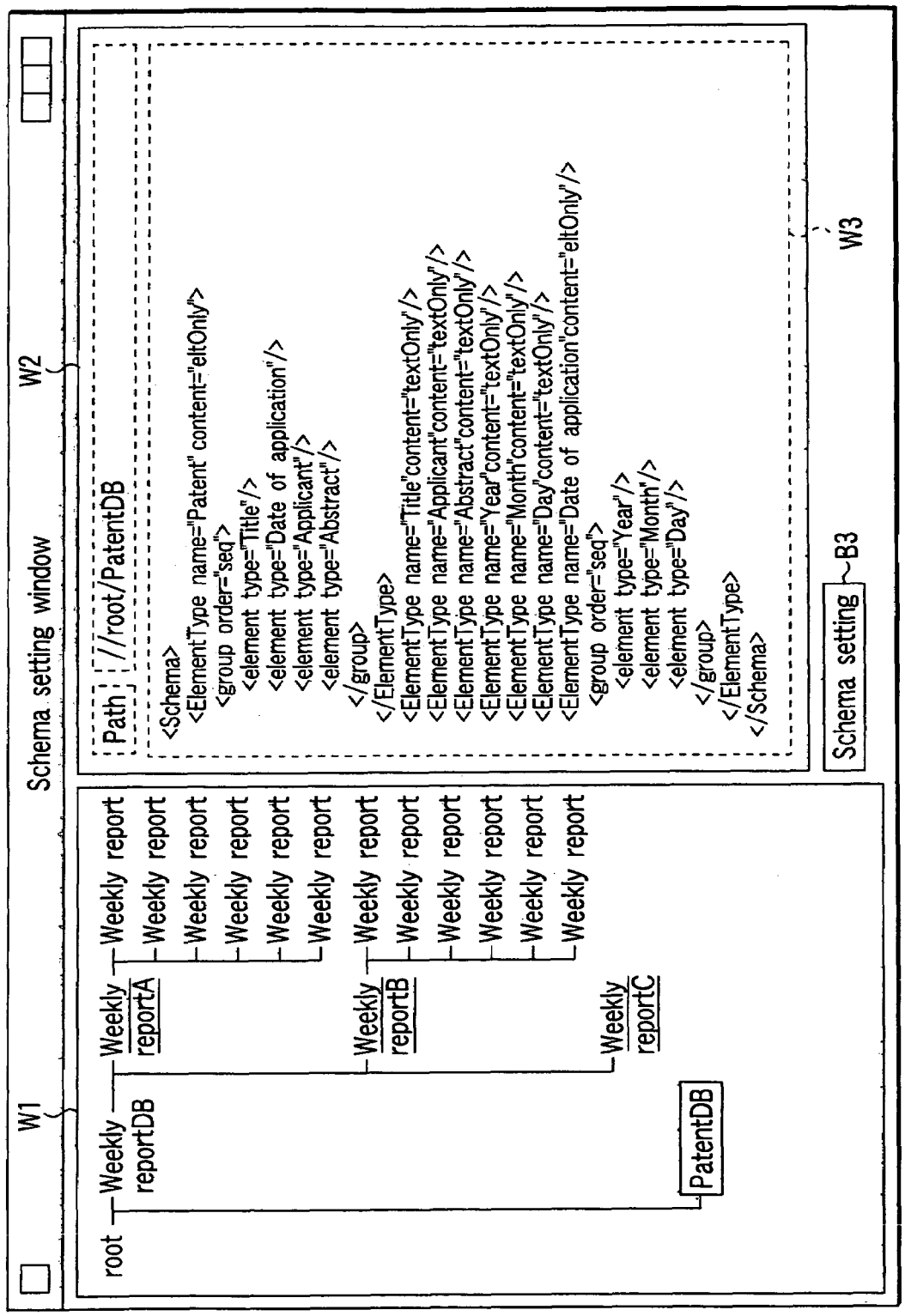
FIG. 37 shows a display example of a window as a user interface for setting a schema, and is a view for explaining a schema setting operation.

When the user selects "Schema setting" on the window shown in FIG. 31 using a pointing device such as a mouse or the like, a window as a user interface for setting a schema is displayed, as shown in FIG. 37.

When the user inputs a schema of "patent" information shown in, e.g., FIG. 12 on region W3, and wants to set the input schema for nodes below "patent DB", the user selects "patent DB" on region W1 by clicking it using the mouse or the like ("uix://root/patent DB" is displayed on region W2), and then selects "schema setting" button B3. Then, schema store command "setSchema ("uix://root/patent DB", "<Schema> . . . </Schema>")" is sent to the structured document management system 100. The processing of this command is the same as the aforementioned document storing processing operation (see FIG. 20).

A case will be explained below wherein "patent" information is input using the schema already set for the nodes below "patent DB" upon storing "patent" information below "uix://root/patent DB". The schema is acquired first. For example, when the user selects "schema" from region W1 on the document store/delete window shown in, e.g., FIG. 38 using the mouse or the like, "uix://root/patent DB/#Schema" is displayed on document pass input region W2, and schema acquire command "getXML("uix://root/patent DB/#Schema")" is sent to the structured document management system.

The processing of this command is the same as the aforementioned document acquiring process (see FIG. 26). An XML document returned from the structured document management system is displayed on region W3 of the window shown in FIG. 38.

Figure 38:
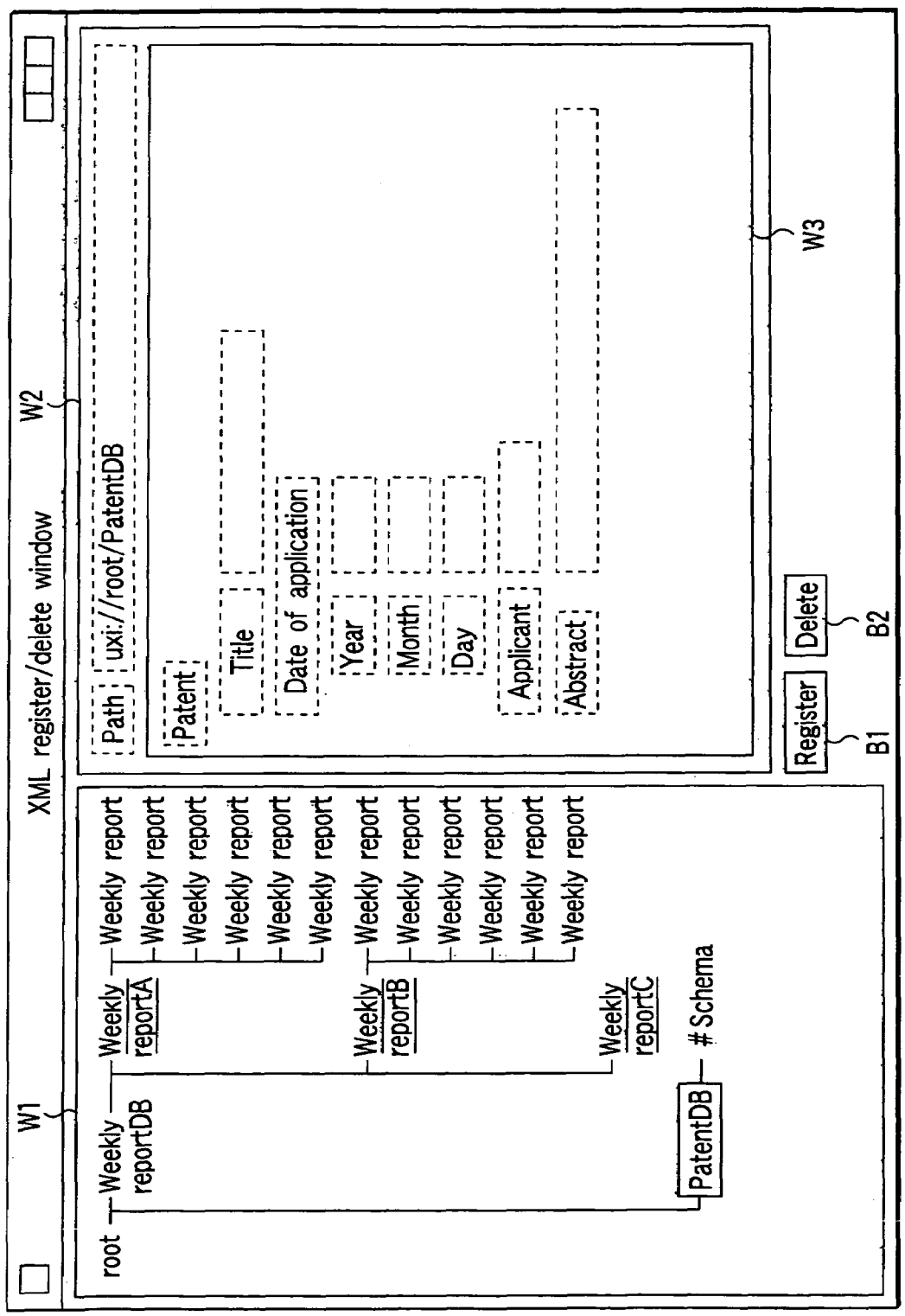
FIG. 38 shows a display example of a window as a user interface for acquiring a schema, i.e., a display example of the acquired schema.

As shown in FIG. 38, region W3 displays data input fields of "patent" information set for respective components. The user can input data according to this display. For example, data input fields "title", "year", and the like are hierarchically laid out and displayed. When the user inputs data on these data input fields, he or she can easily generate a to-be-stored document with the document structure defined by the schema.

When the user selects "patent DE" on region W1 as a storage destination of "patent" information input on region W3 using the mouse or the like, "uix://root/patent DB" is displayed as the structured document pass on region W3. When the user then selects "register" button B1, append command "appendXML("uix://root/patent DB", "<patent> . . . </patent>")" is sent to the structured document management system.

In this case, since the to-be-stored document is input in advance according to the schema, no error occurs in validity check in step S10 in FIG. 20.

(2) Retrieval Function

A retrieval-system command in the structured document management system shown in FIG. 1 includes: query(q1).

The "query" is a command which executes query q1 in ( ) as a parameter, and acquires an XML document as a result of the query (to be referred to as a retrieval command hereinafter).

The query is a structured XML document, which describes the retrieval location, retrieval condition, information extraction portion, and the like using a language in a format similar to SQL (Structured Query Language). The query document is also stored in the structured document database and managed by the structured document management system.

A component starting from a "kf:from" tag describes designation of a retrieval location, and correspondence between the value of a document element and variable, a component starting from a "kf:where" tag describes a condition associated with a variable, and a component starting from a "kf:select" tag describes an output format of a retrieval result.

Retrieval includes plain retrieval and conceptual retrieval. Plain retrieval retrieves and extracts information which satisfies the retrieval condition designated in a query, and conceptual retrieval retrieves and extracts information which satisfies the retrieval condition using concept information designated in a query.

FIG. 40 shows an example of a query for plain retrieval. The query shown in FIG. 40 means a retrieval request "to list "title" of documents ("patent" information) having component "abstract" with contents (values) like "PC" and like "1999"" in documents of "patent" information stored below a node indicated by arc "patent DB" in the structured document database in the state shown in, e.g., FIG. 14.

By a description of a component starting from a "kf:from" tag, values of document components "title", "year", and "abstract" are substituted in variables "$t", "$y", and "$s".

By a description of a component starting from a "kf: where" tag, comparison of variable "$y"="1999" is made. Component "MyLike" is a function for detecting variable "$s" with a value similar to "PC" using variables "$s" and "PC" as arguments.

By a description of a component starting from a "kf:from" tag, variable "$t" is used as an output value.

Note that a "kf:start" tag is ambiguous expression of a structure. For example, "<patent><kf:star><year>" means "a component which is present somewhere as a child component of a component with tag name "patent" and has tag name "year"".

FIG. 41 shows the retrieval result using the query of simple retrieval shown in FIG. 40. This retrieval result is also an XML document.

FIG. 42 shows an example of a query for conceptual retrieval. The query shown in FIG. 42 is a retrieval request to search documents of "patent" information stored below a node designated by arc "patent DB" using "concept" information to the structured document database in the state shown in, e.g., FIGS. 18 and 19. Note that child concept components of the concept component "peripheral device" include concepts "SCSI", "memory", "HDD", and the like. Although not shown in FIG. 18, components of "patent" information include a component starting from a "keyword" tag.

That is, the query shown in FIG. 42 means a retrieval request "to list "title" of documents ("patent" information) having one of concepts below concept "peripheral device" as values of component "keyword"".

By a description of a component starting from a "kf:from" tag in the query shown in FIG. 42, values of the components "title" and "keyword" of "patent" information are substituted in variables "$t" and "$k". Also, values ("SCSI", "memory", "HD", and the like) of child concept components of a concept component "peripheral device" substituted in variable "$x".

By a description of a component starting from a "kf:where" tag in the query shown in FIG. 42, comparison of "$k"="peripheral device" or "$k"="$x" is made.

The document retrieval processing operation of the structured document management system shown in FIG. 1 will be described below with reference to the flow chart shown in FIG. 43.

Figure 44:
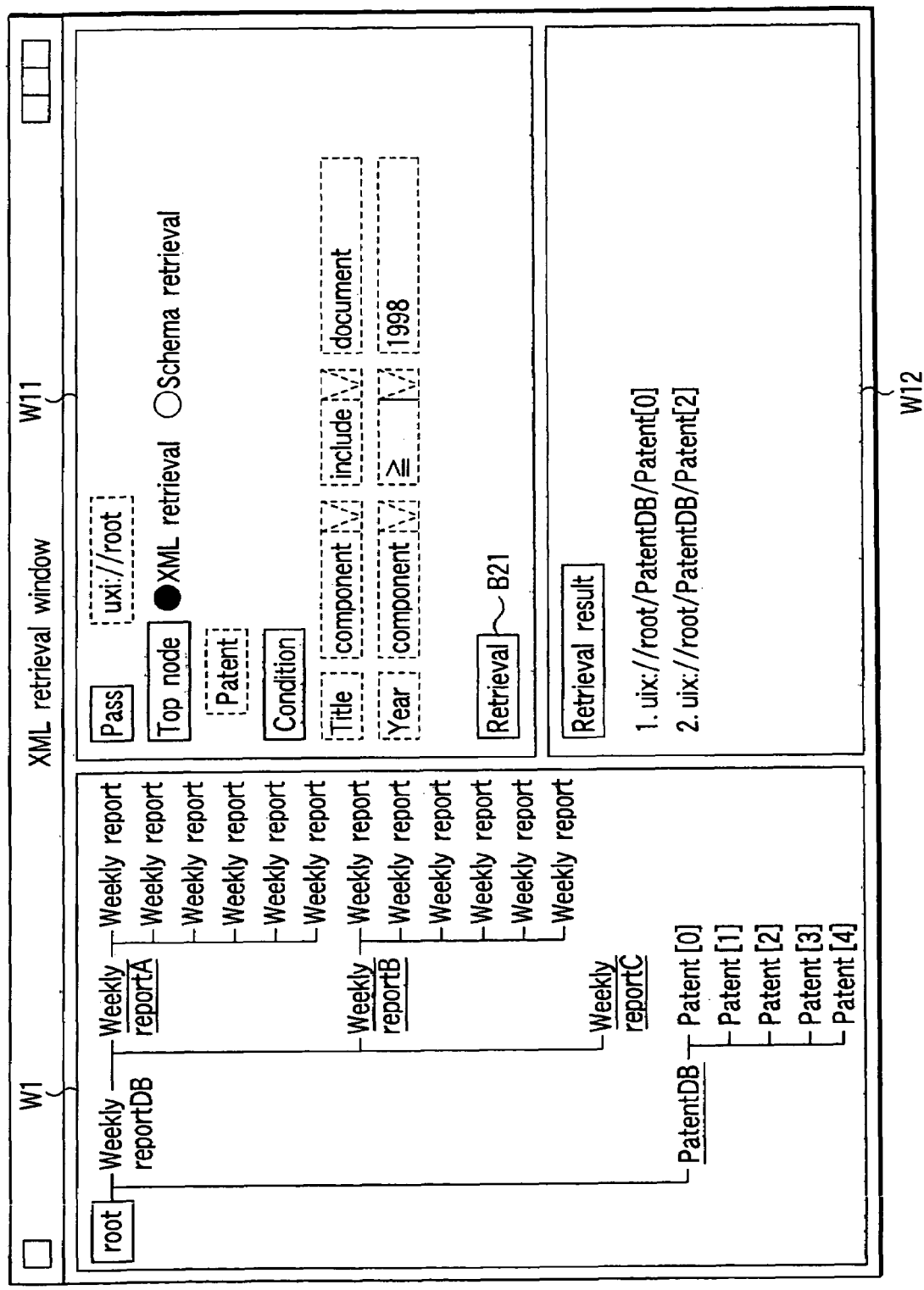
FIG. 44 shows a display example of a window as a user interface for retrieving documents.

When the user selects "XML retrieval" on the window shown in FIG. 31, a window as a user interface used to make document retrieval shown in FIG. 44 is displayed.

On the retrieval window shown in FIG. 44, region W1 displays component names (tag names) of the current tree structure of the structured document database in a simplified form so that the user can understand, as in the above description.

Region W11 is a region for inputting a retrieval range (retrieval range on the tree structure), retrieval condition, and the like. Region W12 displays a retrieval result.

For example, in case of a retrieval request "to retrieve documents in which a "title" component (includes or has) a value including a character string "document" and which was generated after "1998" from documents including "patent DB" as head tags below "uix://root"", the user selects "root" from region W1 using the mouse or the like, thereby inputting the structured document pass as a retrieval range. Then, the user inputs "patent DB" as a top node (in this case, the user may select "patent DB" from region W1 to input the top node). Then, the user inputs, as a retrieval condition, "value of component "title" includes character string "document"" and "value of component "year" is equal to or larger than "1998"" on a predetermined data input region.

After that, when the user selects "retrieval" button B21, for example, a query shown in FIG. 45 is sent to the structured document management system together with an append command for storing that query in the structured document database. The query storage location is determined in advance, and the system side automatically sets parameters of this append command. For example, when the structured document database is in the state shown in FIG. 18, the structured document pass as a parameter indicating the storage location of the query is "uix://root/query DB". Also, the other parameter of the append command is the query document itself.

Upon receiving the query (step S101 shown in FIG. 43), the request receiving device 11 passes that query to the retrieval request processing device 3. Also, the request receiving device 11 passes the parameters of the append command for storing that query document to the document storing device 21. This append command is processed in the same manner as described above, and the query is stored in the document storage 5 (step S102).

For example, in case of the query shown in FIG. 42, the query is evolved, as shown in FIG. 46, and is linked below node "#301" designated by structured document pass "uix://root/query DB".

On the other hand, the retrieval request processing device 3 accesses the index storage 6 and document storage 5 via the data access device 4 to acquire a set of documents which match the retrieval request, extracts information requested in the query, and outputs the extracted information via the result processing device 12.

For example, in case of the above query, this process is efficient to narrow down documents to be retrieved to those that match the condition "title" component includes a value including character string "document" first. Hence, object IDs of nodes (document objects) linked to the text including the character string "document" are obtained using the lexical index shown in FIG. 10. A document object tree is traced upstream by one node from each of the found nodes, and if tag name "title" is reached, the tree is traced further upstream. If tag name "patent" is reached, document object tree Ot11 below that node is extracted.

From a plurality of extracted document object trees Ot11, document object trees Ot12 in which the value of component "year" is equal to or larger than "1998" are extracted.

These document object trees Ot12 correspond to documents that match the retrieval condition of the query. Furthermore, according to the request contents of the query, a structured document pass to the top node of each document object tree Ot12 is obtained (step S103).

Note that the retrieval process is not limited to the aforementioned method, and various other efficient retrieval methods using index information are available.

The retrieval request processing device 3 combines results obtained in step S102 to generate an XML document as a retrieval result (step S104).

For example, the XML document as the retrieval result is expressed by:

```
<out>
<result>
uix://root/patent DB/patent [0]
</result>
<result>
uix://root/patent DB/patent [2]
</result>
</out>
```

The retrieval request processing device 3 returns the XML document to the client terminal together with a style sheet via the result processing device 12 (step S105).

The client terminal converts the XML document shown in FIG. 11 into HTML data using the style sheet, and displays that data on region W12, as shown in, e.g., FIG. 44.

Likewise, a schema can be retrieved.

Figure 47:
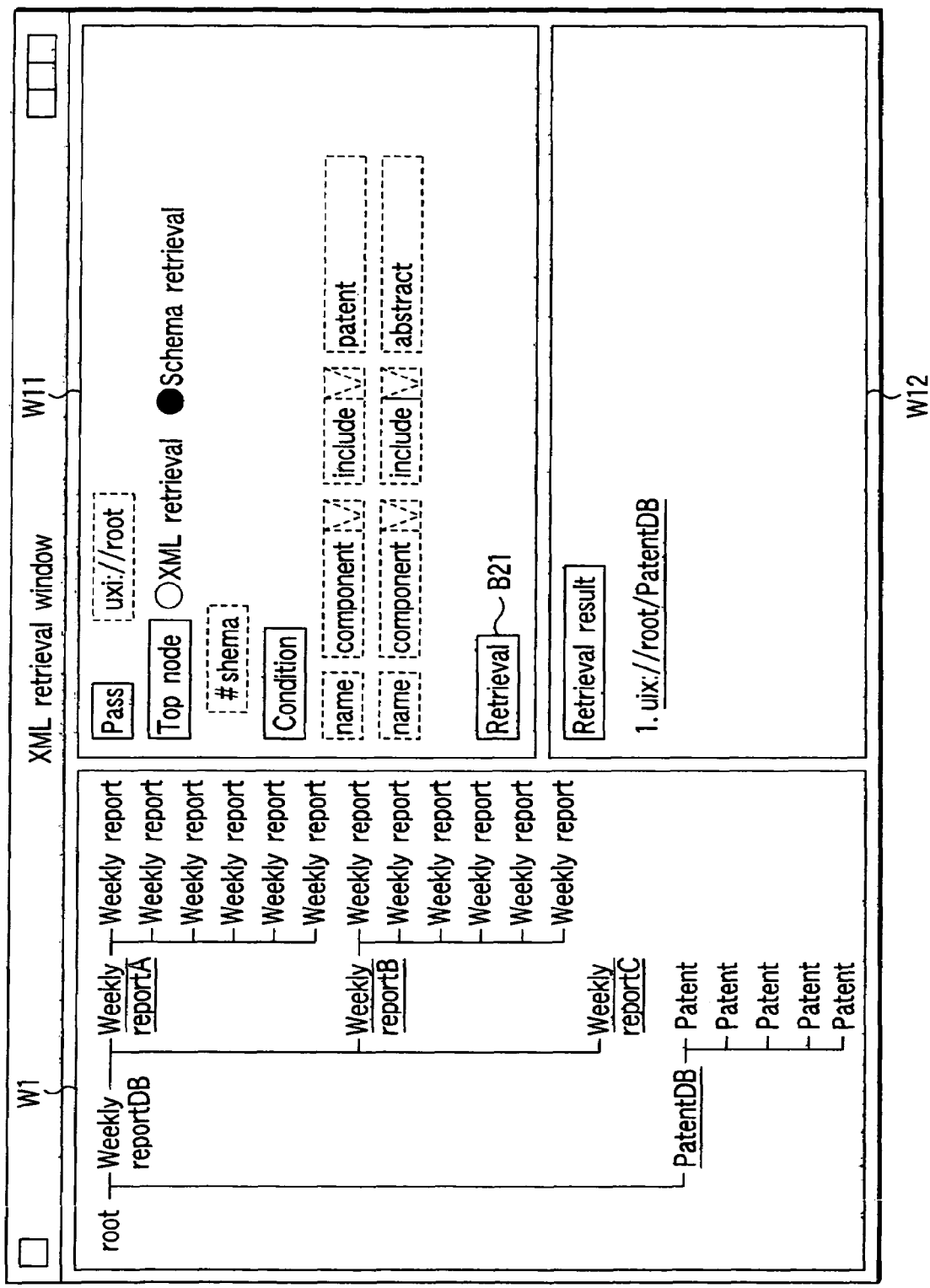
FIG. 47 shows a display example of a window as a user interface for retrieving documents, and is a view for explaining a schema retrieval processing operation.

For example, in case of retrieval request "to retrieve a schema having tag names "patent" and "abstract" from documents having "schema" as head tags below "uix://root"", the user selects "root" as a retrieval range from region W1 using the mouse or the like, and inputs the structured document pass, as shown in FIG. 47. Also, the user can input, as a retrieval condition, "name of component (component name) includes character string "patent"" and "name of component (component name) includes character string "abstract"" on the predetermined data input region.

After that, when the user selects "retrieval" button B21, a query (see FIG. 48) which describes the retrieval request is sent to the structured document management system together with an append command for storing that query in the structured document-database.

In case of the above query, for example, documents which match the condition and have "#schema" as head tag" are retrieved. For this purpose, the object IDs of nodes (document objects) linked to component "#schema" are obtained using the structure index shown in FIG. 9. Arcs of a document object tree are traced downstream from each of the found nodes, and if components having component names "patent" and "abstract" are reached, document object tree Ot21 having "#schema" as a head tag is extracted. This document object tree Ot21 corresponds to a document that matches the query as shown in FIG. 48. Furthermore, according to the request contents of the query shown in FIG. 48, the structured document pass to the top node of each document object tree Ot21 is obtained.

If a plurality of document object trees Ot21 are found, the retrieval request processing device 3 adds up the structured document passes to their top nodes to generate an XML document as a retrieval result, and returns that XML document to the client terminal as a request source together with a style sheet via the result processing device 12.

The client terminal converts the XML document received as the retrieval result into HTML data using the style sheet, and displays that data on region W12, as shown in, e.g., FIG. 47.

When the user selects one schema in the retrieval result and instructs to display it at the client terminal, data input fields of "patent" information set for respective components are displayed on region W3 of the document store/delete window shown in, e.g., FIG. 38.

By inputting data on these data input fields, the user can easily generate a to-be-stored document with the document structure defined by the schema.

For example, when the user selects "patent DB" on region W1 as a storage destination of "patent" information input on region. W3 of FIG. 38 using the mouse or the like, structured document pass "uix://root/patent DB" is displayed on region W2. After that, when the user selects "register" button B1, append command "appendXML("uix://root/patent DB", "<patent> . . . </patent>")" is sent to the structured document management system.

In this case, since the to-be-stored document is input in advance according to the schema, no error occurs in validity check in step S10 in FIG. 20.

Likewise, a query can be retrieved. By retrieving a query, an existing query obtained as the retrieval result can be modified and re-used (re-use of query).

The query is retrieved in the same manner as the aforementioned retrieval process of structured documents, and a retrieval range corresponds to a partial document object tree on the structured document database where queries are stored.

A case will be explained below wherein a query which includes a character string "patent DB" in a component starting from a "kf:from" tag is retrieved from the structured document database in the state shown in, e.g., FIG. 18. FIG. 49 shows a query which describes such retrieval request.

The query shown in FIG. 49 means "to retrieve a query which includes "patent DB" in a component starting from a "kf:from" tag from those present below node "#301" designated by "uix://root/query DB", and to list contents (a document of a document object tree below a component having tag name "query") of that query".

Note that document object trees below components having tag name "query" of queries in which a component starting from a "kf:from" tag includes "patent DB" is substituted in variable "$elt" in accordance with the contents of a "kf:as" component.

When the retrieval request processing device 3 processes this query, the object IDs of nodes (document objects) linked to component "kf:from" are obtained using the structure index shown in FIG. 9, in the same manner as described above. Arcs of a document object tree are traced downstream from each of the found nodes, and if tag name "patent DB" is reached, arcs are further tracked upstream. If tag name "query" is reached, document object tree Ot31 having "query" as a head tag is extracted. This document object tree Ot31 corresponds to a document that matches the contents of the query as shown in FIG. 49.

If a plurality of document object trees Ot31 are retrieved, they are combined to integrate an XML document, which is returned to the client terminal together with a style sheet.

When the user selects one query in the retrieval result and instructs to display it at the client terminal, the contents of the retrieval request described in that query are displayed while data are input to respective data input fields on region W11 of the retrieval window shown in, e.g., FIG. 44.

Region W11 of the retrieval window in FIG. 44 displays a query "to retrieve documents in which character string "document" is included in the value of "title" component and which are generated after "1998" from documents having "patent DB" as head tags below "uix://root"".

From this state, when the user changes "document" in the retrieval condition to "XML" and selects "retrieval" button B21, a query "to retrieve documents in which character string "XML" is included in the value of "title" component and which are generated after "1998" from documents having "patent DB" as head tags below "uix://root"" is sent to the structured document management system.

As described above, the structured document management system shown in FIG. 1 handles a huge number of XML documents (contents documents, schema documents, query documents, and the like) having different document structures, which are registered on the structured document database) as one tree-like giant XML document starting from the "root" tag, as shown in FIGS. 18 and 19. Therefore, documents that match a retrieval condition can be easily retrieved from a huge number of documents having different document structures and various schemas.

Also, since a query used in retrieval is also a structured document, when the query is stored as a log in the structured document database, an application that re-uses old queries can be easily formed.

(3) Application Example

An application example of the conceptual retrieval to patent research will be explained below.

Figure 50:
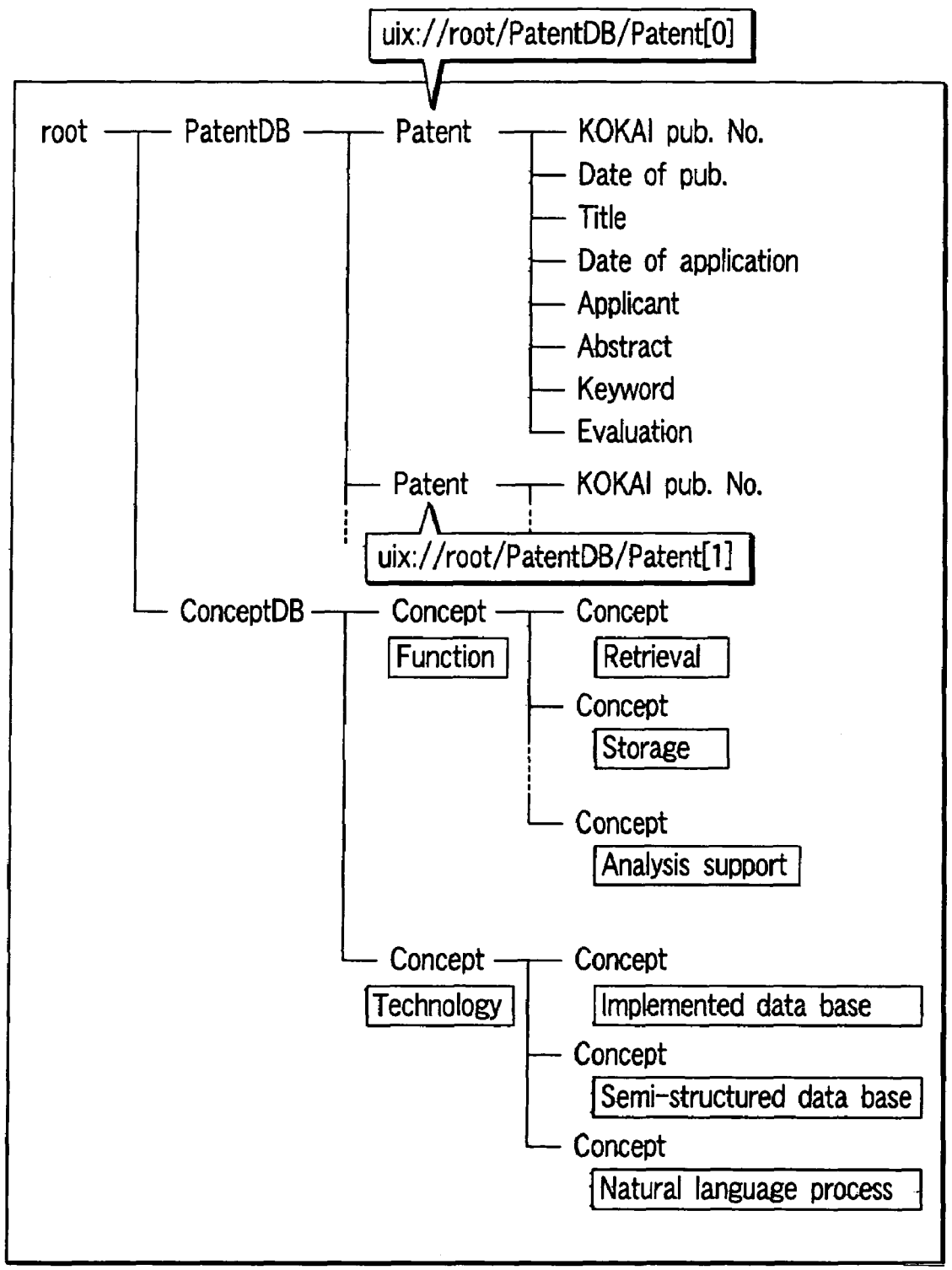
FIG. 50 shows an example of a structured document database in patent research.

FIG. 50 shows an example of a structured document database in patent research, which stores "concept" information in addition to "patent" information.

The most important operations in patent research are to acquire associated "patent" information, to analyze "patent" information from various viewpoints, and to generate a map (patent map) associated with patents, as shown in FIG. 54. In order to generate the patent map shown in FIG. 54, in a conventional method, arbitrary items to be set on the columns and rows of the table corresponding to the patent map are determined in advance, retrieval that uses arbitrary items set on the columns and rows as a retrieval condition is made sequentially. This process requires very high cost. However, when the structured document management system is used, cost required for this process can be greatly reduced.

Note that the map is used to classify and arrange retrieval results, which are obtained using arbitrary items set on the y-axis and x-axis as a retrieval condition, using the x- and y-axes as axes of classification.

When the user of the client terminal wants to generate the patent map shown in FIG. 54 using the structured document management system, he or she inputs the pass of "patent" information as an analysis range and components serving as axes (e.g., x- and y-axes) of analysis on regions W21 and W22 on a retrieval window shown in FIG. 51 with reference to the current tree structure (FIG. 50) displayed on a display device of the client terminal. The components serving as the axes of analysis may be selected from either components of "patent" information or those of "concept" information in the structured document database.

For example, in FIG. 51, the user inputs components "function" and "technology" of "concept" information as the x- and y-axes.

After that, when the user selects "execute" button B31, a query shown in FIG. 52 is sent from the client terminal to the structured document management system shown in FIG. 1.

The query shown in FIG. 52 is a retrieval request that means: "to retrieve "patent" information in which values of components "keyword", "abstract", and the like include one of child components of concept "function" and one of child components of concept "technology" which are stored below node indicated by arc "concept DB", from documents of "patent" information stored below a node indicated by arc "patent DB", and to list sets of child components of "function" and "technology" and "KOKAI pub. No." corresponding to "patent" information as a retrieval result".

As shown in FIG. 50, concept "function" includes child components "retrieval", "store", . . . , "analysis support", and concept "technology" includes child components "implemented database", "semi-structured database", "natural language process".

Upon receiving the query, the retrieval request processing device 3 of the structured document management system obtains the object IDs of nodes (document objects) linked to text including one of child components (character strings) of concept "function" using the lexical index shown in FIG. 10. A document object tree is traced upstream for each of the obtained object IDs, and if tag "patent" is reached, a document object tree below that node is further traced downstream. At this time, if a tag name linked to text including one of child components (character strings) of concept "technology" is reached, that document object tree and a character string (component value) linked to a "KOKAI pub. No." tag in that document object tree are extracted.

Sets of child components of "function" and "technology", and "KOKAI pub. No." of the extracted "patent" information are combined to generate an XML document as a retrieval result, as shown in FIG. 53, and that XML document is returned to the client terminal as a request source together with a predetermined style sheet.

Upon receiving the XML document, the display of the client terminal displays the patent map in the form of a table, as shown in FIG. 54.

In this manner, by only designating desired concepts as items to be set on the "x-axis" and "y-axis", a plurality of pieces of information stored in the structured document database can be easily integrated and classified on the basis of the concepts designated as "axes", and can be displayed as a map. That is, a plurality of pieces of information stored in the structured document database can be easily integrated and classified from various viewpoints using "concept" information.

(Similar Object Retrieval)

An embodiment of the present invention will be described below with reference to the accompanying drawings. Note that terms of "tag" and "tag name" can be used as synonyms for "component" and "component name" respectively, in this embodiment.

FIG. 55 shows an example of the arrangement of a structured document management system according to this embodiment. Note that the same reference numerals in FIG. 55 denote the same parts as in FIG. 1, and only different devices will be explained. More specifically, in FIG. 55, the retrieval request processing device 3 has a similar object retrieval device 201, which executes processes with reference to a semantic network stored in a semantic network storage 200, the lexical index and structure index stored in the index storage 6, and the document stage 5.

FIG. 56 shows an example of the arrangement of the similar object retrieval device 201, which comprises a query analyzing device 203, condition processing device 204, and output processing device 205.

The query analyzing device 203 receives a query as a retrieval request from the user, which is received by the request receiving device 11, analyzes the input query, and generates a query condition graph and query output template.

The query condition graph is obtained by evolving, in the form of a graph, the retrieval condition of an object to be retrieved (desired structured document) described in the input query, i.e., condition associated with the name of a component (component name)

condition between components condition associated with the value of a component, and the like.

The query output template is obtained by evolving, in the form of a graph, the output format of the retrieval result described in the input query, i.e., component to be extracted and output structure pattern of a component to be output, and the like.

The query analyzing device 203 outputs the query condition graph and query output template.

The condition processing device 204 receives the query condition graph, and generates a combination of various data stored in the structured document database in consideration of the retrieval condition generated in the query. A table that describes such combination is called a bind table.

The output processing device 205 receives a final bind table finally generated by the condition processing device 204, and the query output template.

The output processing device 205 generates XML data of structured documents as a retrieval result on the basis of the final bind table. In this case, retrieved structured documents are sorted in descending order of similarity, and are output in the XML format.

In case of plain retrieval, the retrieval result is a set of structured documents. However, in case of complex retrieval or conceptual retrieval, only partial components of retrieved structured documents are extracted. In this case as well, components are sorted in descending order of similarity, and are output in the XML format.

Figure 57:
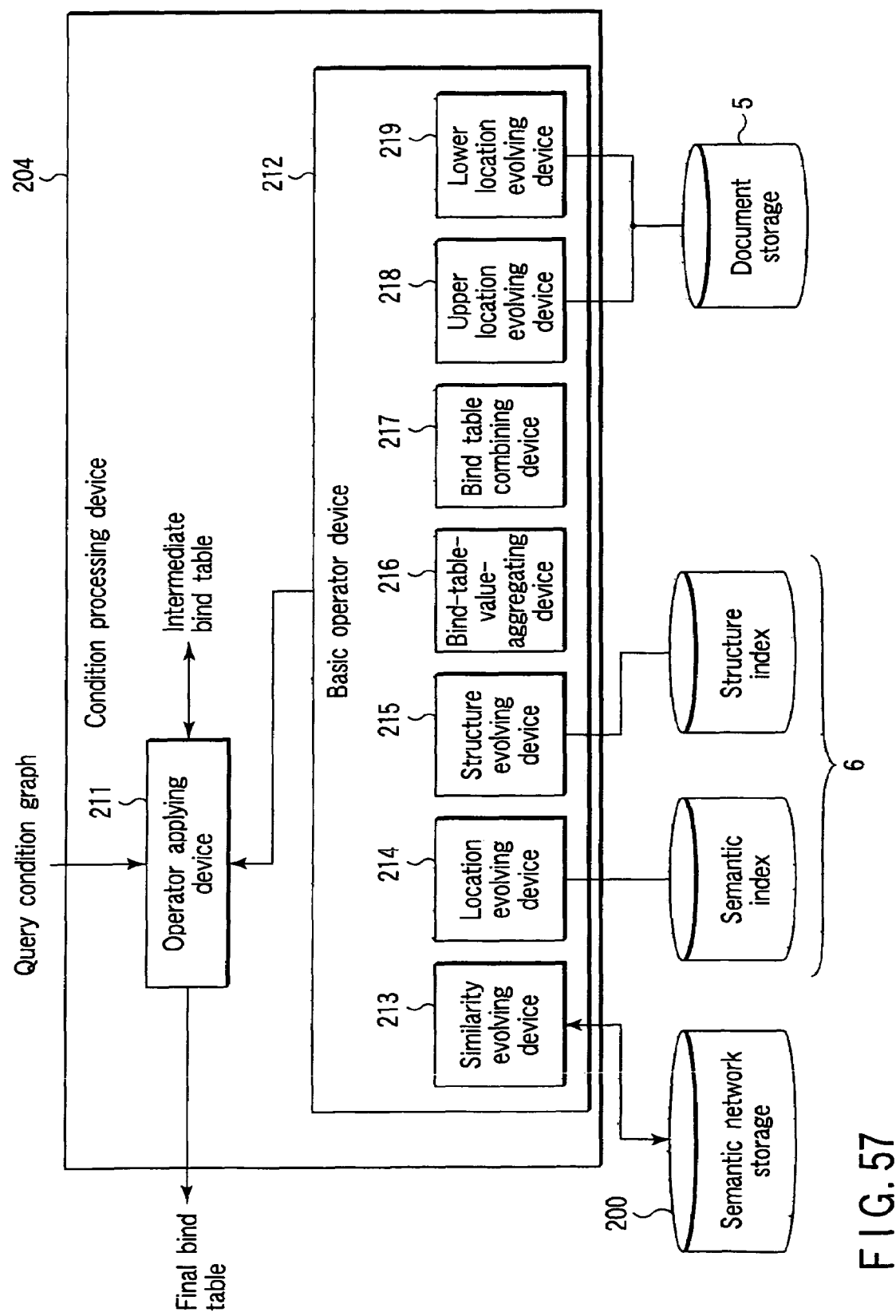
FIG. 57 is a block diagram showing an example of the arrangement of a condition processing device.

FIG. 57 shows an example of the arrangement of the condition processing device 204. An operator applying device 211 receives the query condition graph, and repetitively applies a basic operator as much as possible to sequentially generate intermediate bind tables.

For example, the basic operators are functions each inputs/outputs a bind table, and each of devices 213 to 219 in a basic operator device 212 in FIG. 57 execute processes corresponding to the each function.

A similarity evolving device 213 detects lexical items similar to an input lexical item, and outputs a list of these lexical items as a bind table together with a similarity (lexical weight). Such process is called similarity evolving in this embodiment.

A location evolving device 214 detects storage locations (more specifically, object IDs assigned to respective nodes of a hierarchical tree of the structured document database) in the structured document database of lexical items (those as values of components) listed in an (input) bind table using the lexical index stored in the index storage 6. Then, the device 214 generates a new bind table based on the detection result. Such process is called location evolving in this embodiment.

A structure evolving device 215 detects storage locations (more specifically, object IDs assigned to respective nodes of a hierarchical tree of the structured document database) in the structured document database of component names (tag names) listed in an (input) bind table using the structure index stored in the index storage 6. The device 215 then generates a new bind table based on the detection result. Such process is called structure evolving in this embodiment.

A bind-table-value-aggregating device 216 aggregates a plurality of identical records (identical values in respective columns) in one input bind table into one record if such records are found, and generates a new bind table.

A bind table combining device 217 combines (joins) columns in two input bind tables to generate one new bind table.

An upper location evolving device 218 traces from a component present at a given location (more specifically, e.g., a node) in an upstream direction where a root ("root") is present, generates a combination up to ancestor components including a parent of that component, and generates a new bind table. Such process is called upper location evolving in this embodiment.

A lower location evolving device 219 traces from a component present at a given location (more specifically, e.g., a node) in a downstream direction, generates a combination up to descendant components including children of that component, and generates a new bind table. Such process is called lower location evolving in this embodiment.

Figure 58:
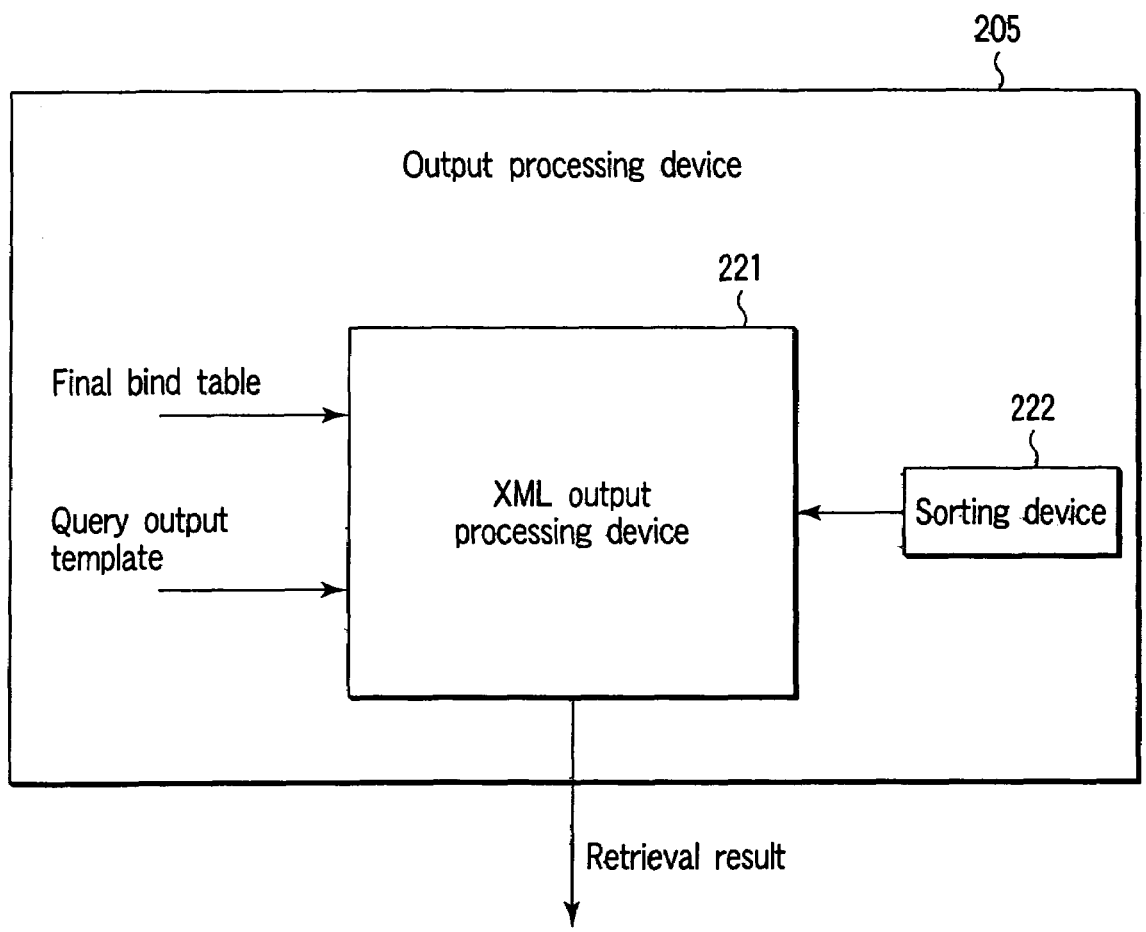
FIG. 58 is a block diagram showing an example of the arrangement of an output processing device.

FIG. 58 shows an example of the arrangement of the output processing device 205. A sorting device 222 receives the query output template and final bind table as inputs, and makes similarity calculations to sort data, and an XML output processing device 221 generates a retrieval result as data in the XML format in that sort order.

FIG. 59 illustrates a semantic network stored in the semantic network storage 200. The semantic network expresses a similarity relationship among lexical items (words) using a graph. Lexical items having a similarity relationship are coupled via an arc, and a similarity value between these lexical items is given to that arc, thus forming a network among lexical items. For example, assume that lexical items "structured document", "XML", and the like are available. From the semantic network shown in FIG. 59, the similarity value between "structured document" and "XML" is "0.8". Note that the similarity value assumes a value ranging from "0" to "1". Also, the similarity value between two lexical items, which is given to an arc, is called an arc weight.

FIG. 60 illustrates the storage state of structured documents in the structured document database of the document storage 5 in FIG. 55.

As described above, when fragmentary XML documents are registered in the structured document database, they can be referred to partial documents of a giant XML document. The root tag of that giant XML document is </root>. In FIG. 60, "article" information, "patent" information, and "literature" information are stored as document object trees which respectively have nodes "#10", "#20", and "#30" as head nodes, and these nodes is connected to node "#1" which has the root tag. Furthermore, node "#1" is linked to nodes "#40" and "#50" which respectively have "PPP" and "RRR" tags as head tags. From node "#40", "PAPER" information is stored as a document object tree which has node "#41" as a head node. Also, from node "#50", "article" information is stored as a document object tree which has node "#51" as a head node.

FIGS. 61 to 63 respectively show XML expressions of "article" information, "patent" information, and "literature" information stored below "#1". Also, FIGS. 64 and 65 respectively show XML expressions of "PAPER" information stored below node "#40" and "article" information stored below node "#50".

The following explanation will be given based on the structured document database shown in FIG. 60.

FIG. 66 shows an example of a query used in similar object retrieval according to this embodiment. The query shown in FIG. 66 has contents "to retrieve and list titles and summaries of articles which include "XML" and "GML" in a text as a value of "title" component. Unlike a (normal) query described above, in the retrieval condition in the query shown in FIG. 66, (1) lexical items (corresponding to component names, component value, and the like) designated in the retrieval condition are extensibly interpreted (relaxed) up to a similar object range, and (2) a document structure designated in the retrieval condition is extensibly interpreted (relaxed) up to a similar object range. For this purpose (to inform the system side of similar object retrieval), the query shown in FIG. 66 uses descriptors unique to similar object retrieval so as to broaden the retrieval condition to a similar object range.

For example, component <fksim:select> of the query of similar object retrieval is a descriptor for sorting and outputting retrieval results based on values of similarity.

A <kfsim:from> tag is a descriptor used to broaden the retrieval condition to a range of a similar document structure (components (component names thereof) and locations they appear). For example, the query shown in FIG. 66 includes a description for retrieving structured documents each having a document structure similar to that of structured documents existing below <0article> node and including "title" and "summary" components as child components of component "article", from a range below the designated structured document pass ("uix://root" in case of the query in FIG. 66).

A <kfsim:cmp> tag is used to broaden the retrieval condition to a similar object range of a lexical item. For example, the query shown in FIG. 66 describes that variable "$t" in which the component value of the structured document is substituted, includes a lexical item (or lexical items) ("XML" and "SGML" in this case) designated by "param2" and lexical items similar to these lexical items.

Using these descriptors unique to similar object retrieval, the query shown in FIG. 66 is interpreted by the query analyzing device 203 to have contents "to retrieve "article" components (structured documents) or components (structured documents) each similar to "article" component (structured document), in which "XML" or "SGML", or a lexical item similar to "XML" or "SGML" is included in a value of "title" component or a component similar to "title" component, or a component included in "title" component or the component similar to "title" component, and to list values of "title" component or a component similar to "title" component and "summary" component or a component similar to "summary" component included in the retrieved structured documents".

For example, when the query of similar object retrieval shown in FIG. 66, which is sent from the client terminal 102, is received by the request receiving device 11 of the structured document management system in FIG. 55, that query of similar object retrieval is sent to the similar object retrieval device 201 of the retrieval request processing device 3.

The query analyzing device 203 of the similar object retrieval device 201 generates a query condition graph shown in FIG. 67 and a query output template (also called a query output graph) shown in FIG. 68 on the basis of the query of similar object retrieval shown in FIG. 66.

Parts A1 to A6 of the query condition graph shown in FIG. 67 will be explained below.

A1: This part assigns components (component group) with an "article" tag and a tag name similar to this tag name below (included in) the "root" tag, to variable "$1". "SIMTAG" broadens the retrieval condition to a similar object range of the tag name "article".

A2: This part assigns components (component group) with a "title" tag and a tag name similar to this tag name below (included in) the components with the "article" tag and the tag name similar to that tag name, to variable "$2". "SIMTAG" broadens the retrieval condition to a similar object range of the tag name "title".

A3: This part assigns components with a "summary" tag and a tag name similar to this tag name below (included in) the components with the "article" tag and the tag name similar to that tag name, to variable "$3". "SIMTAG" broadens the retrieval condition to a similar object range of the tag name "summary".

A4: This part assigns the values of the components with the "title" tag and the tag name similar to this tag name, to variable "$t". Also, this part assigns the values of components included in the components with the "title" tag and the tag name similar to this tag name, to variable "$t".

A5: This part assigns the values of the components with the "summary" tag and the tag name similar to this tag name, to variable "$a". Also, this part assigns the values of components included in the components with the "summary" tag and the tag name similar to this tag name, to variable "$a".

A6: The value of component substituted in variable "$t" includes "XML", "SGML", and lexical items (words) similar to these lexical items (words). "SIMCMP" broadens the retrieval condition to a similar object range of lexical items "XML" and "SGML".

In this manner, the query condition graph represents document structures which are made up of components, lexical items, and the like designated by the retrieval condition in the query, and serve as the retrieval range of similar object retrieval based on that retrieval condition.

In FIG. 67, variables corresponding to components and their values are bounded by circles. Variables corresponding to parent and child components which have an inclusive relationship on the document structure, and variables corresponding to components and their values are connected via hexagonal connection symbols. Since variables are connected via connection symbols, the condition on the document structure designated by the retrieval condition in the query is relaxed like "a component after the connection symbol can be present in any of components included in a component before the connection symbol".

For example, in the query of similar object retrieval in FIG. 66, a structure in which "title" and "summary" are present as child components of component "article" is designated by the contents below the <kfsim:from>tag. When the condition of the designated document structure in the query shown in FIG. 66 is relaxed, a condition "component "title" and component "summary" are present as any one of components subordinate to (in lower layer than) a component "article"" is obtained. When this relaxed document structure is expressed by the query condition graph, variable "$1" corresponding to the "article" tag and the tag similar to this tag, and variable "$2"corresponding to the "title" tag and the tag similar to this tag are connected via the connection symbol, and variable "$1" and variable "$3" corresponding to the "summary" tag and the tag similar to this tag are connected via the connection symbol.

The query output template expresses the document structure (pattern) of an XML document output as a retrieval result.

FIG. 68 shows an example of the query output template generated based on the query shown in FIG. 66 by the query analyzing device 203. The query output template shown in FIG. 68 expresses that: (a) the value of component with tag name "TITLE" is substituted for the value of variable "$t"; (b) the value of a component with tag name "ABST" is substituted for the value of variable "$a"; (c) a component with tag name "PAPER" is made up of a component with tag name "TITLE" and a component with tag name "ABST"; and (d) a document structure below node "Repeat" is repeated (in correspondence with the number of retrieved structured documents).

Figure 69:
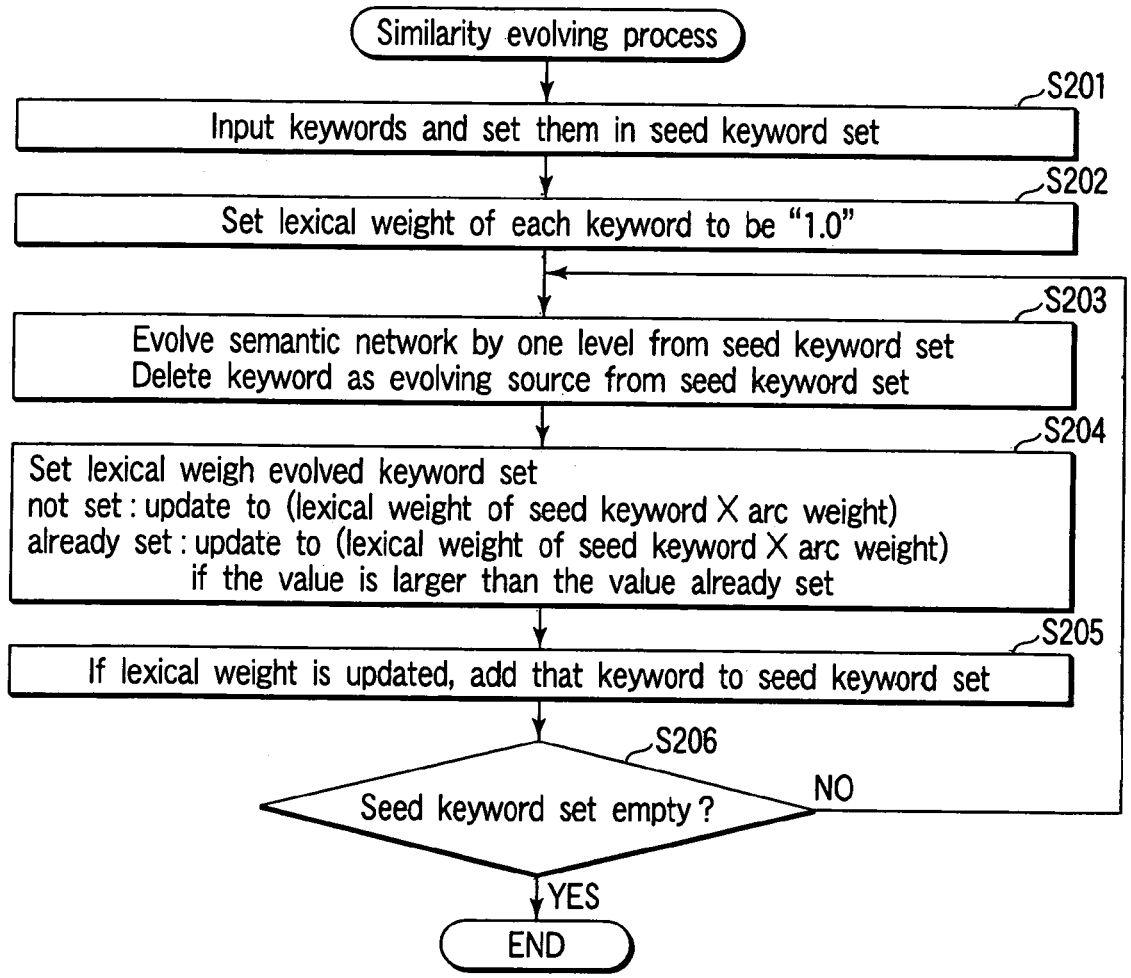
FIG. 69 is a flow chart for explaining a similarity evolving process.

The processing operation of the similarity evolving device 213 will be described below with reference to the flow chart shown in FIG. 69. Note that keywords correspond to component names (tag names) and words included in their values designated as the retrieval condition in the query of similar object retrieval. For example, the keywords include "article", "title", "summary", and "XML, SGML".

(Step S201) Keywords are input and are set as a seed keyword set. For example, "XML, SGML" are input.

Figure 70:
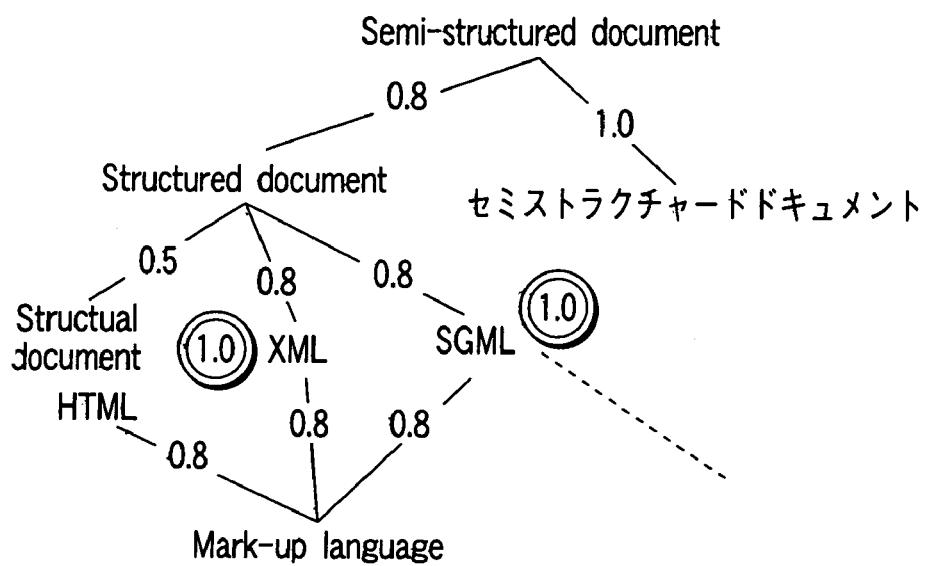
FIG. 70 is a view for explaining an example of the similarity evolving process, i.e., a method of obtaining lexical items similar to that designated in the retrieval condition and its similarity (lexical weight) while searching the semantic network.

(Step S202) The lexical weight of keywords in the seed keyword set is set to be "1.0". For example, the lexical weights of "XML" and "SGML" are respectively set to be "1.0" (see FIG. 70).

Figure 71:
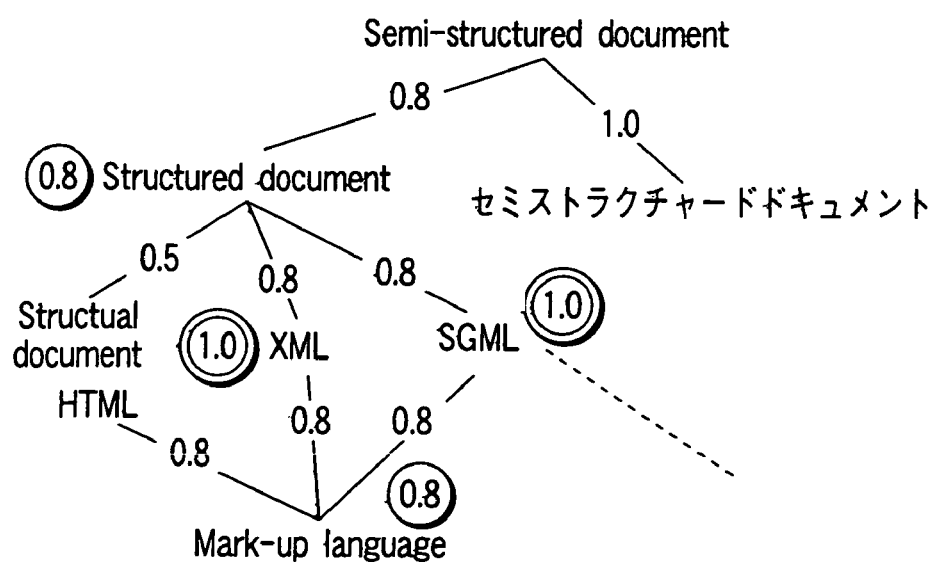
FIG. 71 is a view for explaining an example of the similarity evolving process, i.e., a method of obtaining a lexical item similar to that designated in the retrieval condition and its similarity (lexical weight) while searching the semantic network.

(Step S203) The semantic network is evolved by one level from the seed keyword set. A keyword as an evolving source is deleted from the seed keyword set. For example, "structured document", "mark-up language", and the like are obtained, as shown in FIG. 71.

(Step S204) Lexical weights are set for respective keywords of the evolved keyword set. If the lexical weight of an evolved keyword is not set, the lexical weight of that keyword is set by (lexical weight of seed keyword)×(arc weight); if it is already set, a larger one of (lexical weight of seed keyword)×(arc weight) and the set lexical weight is set to update the lexical weight of that keyword. For example, "structured document" and "markup language" correspond to the former case, and are set to have "0.8" (see FIG. 71).

(Step S205) If the lexical weight is set or updated, that keyword is added to the seed keyword set. For example, "structured document" and "mark-up language" are set as a new seed keyword set.

(Step S206) The processes in steps S203 to S205 are repeated until the seed keyword set becomes empty. For example, since the new seed keyword set is "structured document, mark-up language" in this case, the flow returns to step S203.

Figure 72:
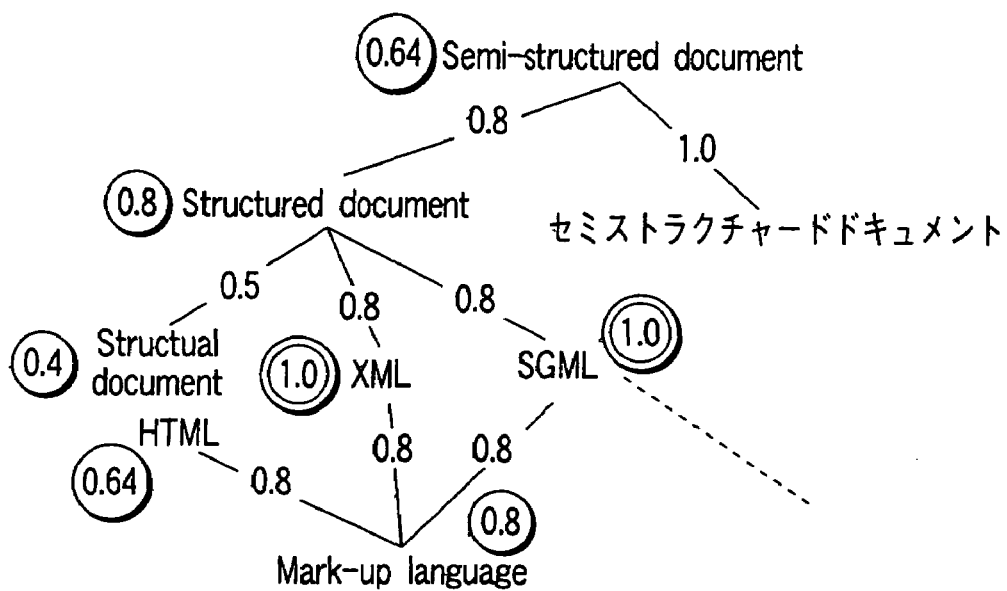
FIG. 72 is a view for explaining an example of the similarity evolving process, i.e., a method of obtaining a lexical item similar to that designated in the retrieval condition and its similarity (lexical weight) while searching the semantic network.
Figure 73:
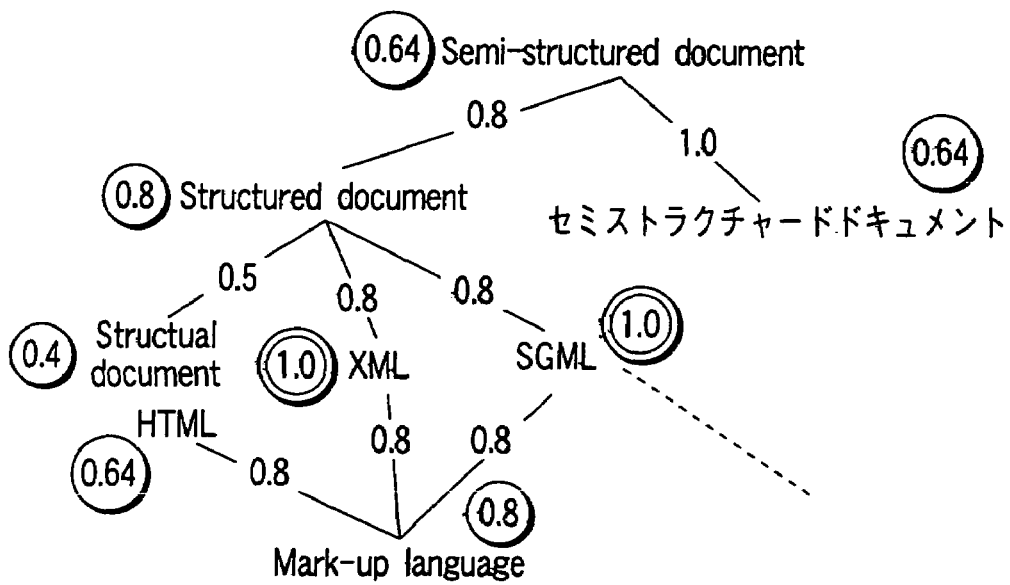
FIG. 73 is a view for explaining an example of the similarity evolving process, i.e., a method of obtaining a lexical item similar to that designated in the retrieval condition and its similarity (lexical weight) while searching the semantic network.

By repeating steps S203 to S205 to the new keyword set "structured document, markup language", "HTML" (lexical weight=0.8×0.8=0.64), "structured document" (lexical weight=0.8×0.5=0.4), and "semi-structured document" (lexical weight=0.8×0.8=0.64) are obtained as new similar words, as shown in FIG. 72. Furthermore, by repeating steps S203 to S205 using these keywords as a new seed keyword set, "セミストラクチャードドキュメント" (lexical weight=0.64×1.0=0.64) is obtained as a new similar word, as shown in FIG. 73.

Figure 74A:
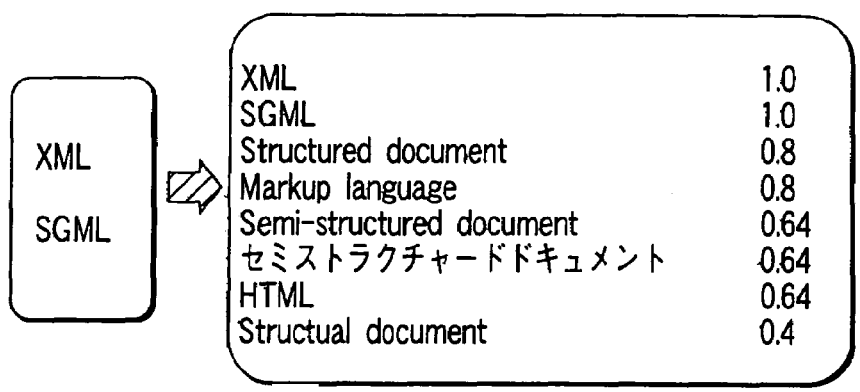
FIGS. 74A–74D show lexical items similar to that (including a component name) designated in the retrieval condition and its lexical weight, which are obtained by executing the similarity evolving process for the lexical item designated in the retrieval condition.

In this way, by repeating steps S203 to S205 several times, lexical items similar to "XML, SGML" can be obtained together with their lexical weights, as shown in FIG. 74A.

Figure 74B:
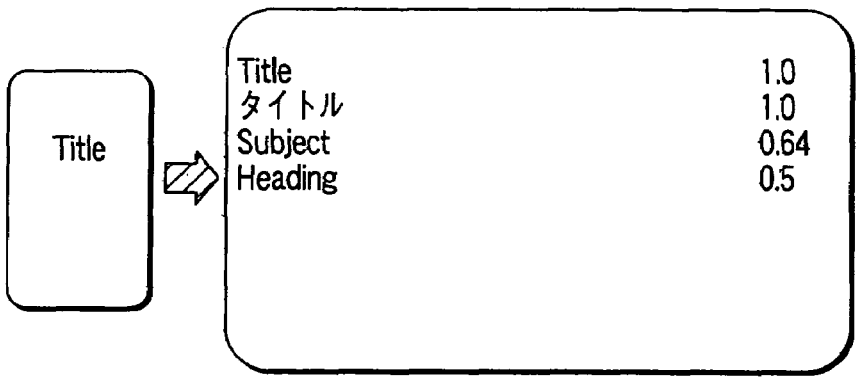
Figure 74C:
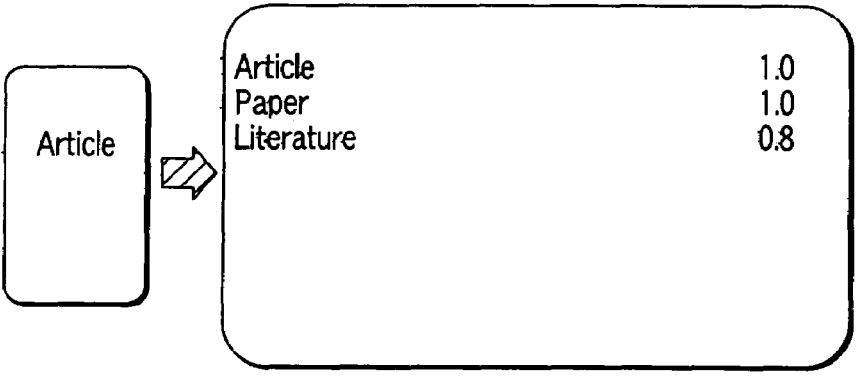
Figure 74D:
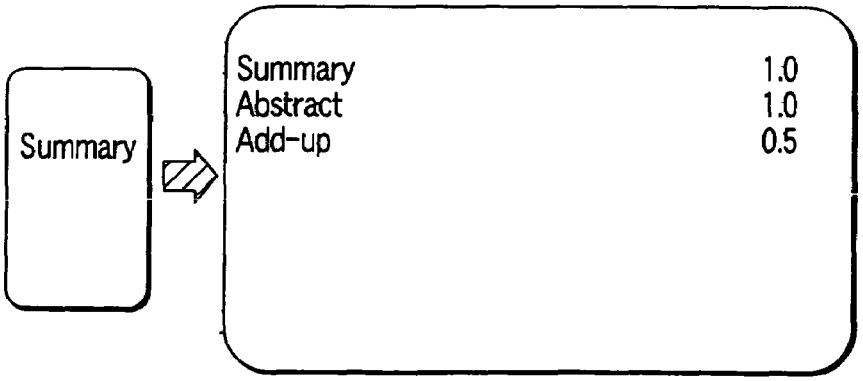

FIGS. 74B to 74D respectively show lexical items and their lexical weights similarly obtained for "title", "article", and "summary" as component names.

A similarity value associated with the structure will be explained below with reference to FIG. 75.

Figure 75:
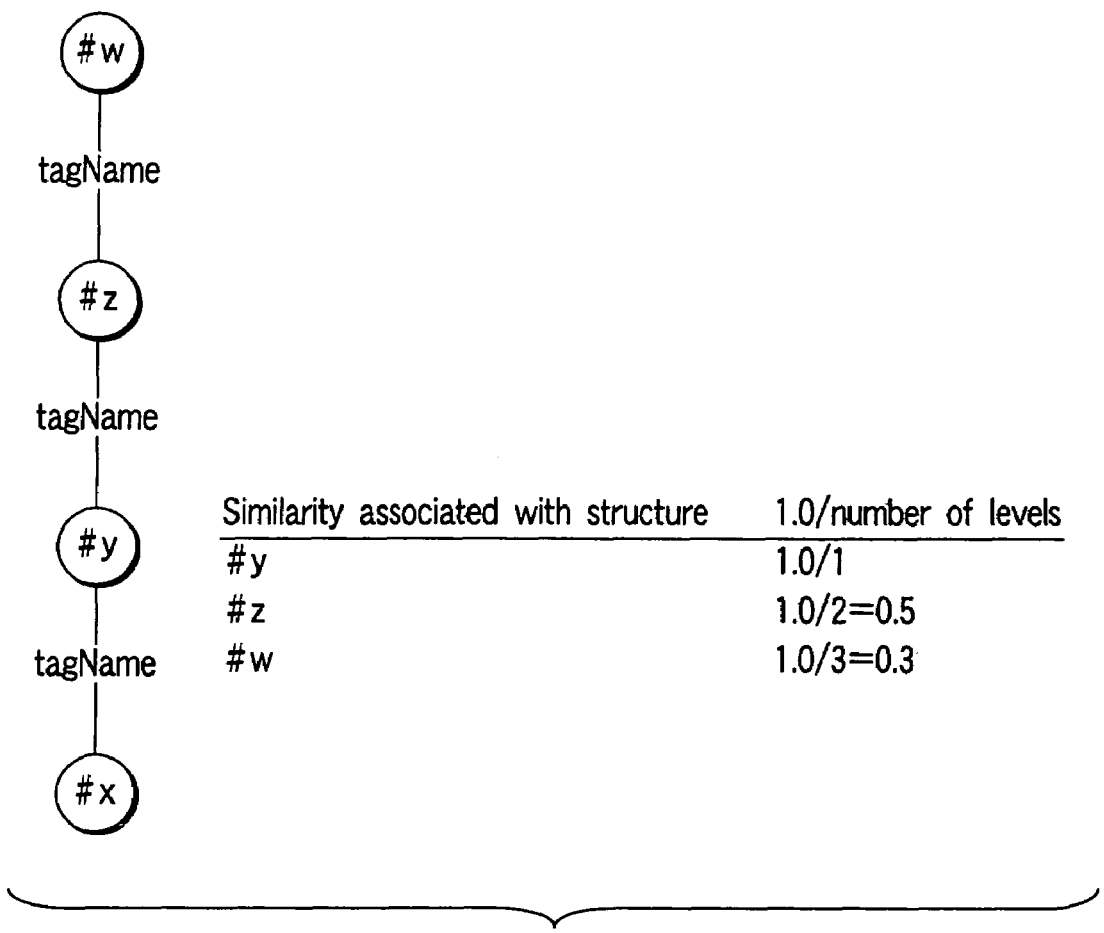
FIG. 75 is a view for explaining a similarity value associated with a structure.

In FIG. 75, a component one level higher than component "#x" is "#y" which is a parent component of "#x", a component one level higher than component "#y is "#z" which is a parent component of "#y", a component one level higher than component "#z" is "#w" which is a parent component of "#z". If a component one level higher than component "#x" is designated in the retrieval condition, a similarity value associated with the structure for components {#y, #z, #w} will be examined below. In this case, component "#y" one level higher than component "#x", which matches the retrieval condition, is given the highest similarity. Hence, the similarity value associated with the structure is defined by:

similarity value associated with structure=1.0/the number of levels (difference between the designated level and the level where each component is present). That is, the similarity value associated with the structure of component "#y" is "1.0/1", the similarity value associated with the structure of component "#z" is "1.0/2=0.5", and the similarity value associated with the structure of component "#w" is "1.0/3=0.3". The similarity "1.0" is highest.

The operator applying device 211 executes the following process based on the query condition graph. That is, the operator applying device 211 repetitively executes applicable basic operators to the input query condition graph.

(1) As for a lexical item, if it is possible to broaden the retrieval condition to its similar object range, the similarity evolving device 213 executes similarity evolving.

(2) As for a tag name, if it is possible to broaden the retrieval condition to its similar object range, the similarity evolving device 213 executes similarity evolving.

(3) If it is possible to evolve the location of a lexical item, the location evolving device 214 executes location evolving.

(4) As for a structure, if it is possible to broaden the retrieval condition to its similar object range, the structure evolving device 215 executes structure evolving.

(5) Upon searching an upstream component, the upper location evolving device 218 executes upper location evolving.

(6) Upon searching a downstream component, the lower location evolving device 219 executes lower location evolving.

(7) If a plurality of (e.g., two) intermediate bind tables have columns of an identical variable, the bind table combining device 217 combines the plurality of (e.g., two) intermediate bind tables.

(8) If a column of one variable in one bind table includes identical values (e.g., nodes), the bind-table-value-aggregating device 216 aggregates bind table values.

By-repetitively executing one of (1) to (8), one bind table, i.e., a final bind table is finally generated. The final bind table undergoes a final similarity calculation.

Figure 76:
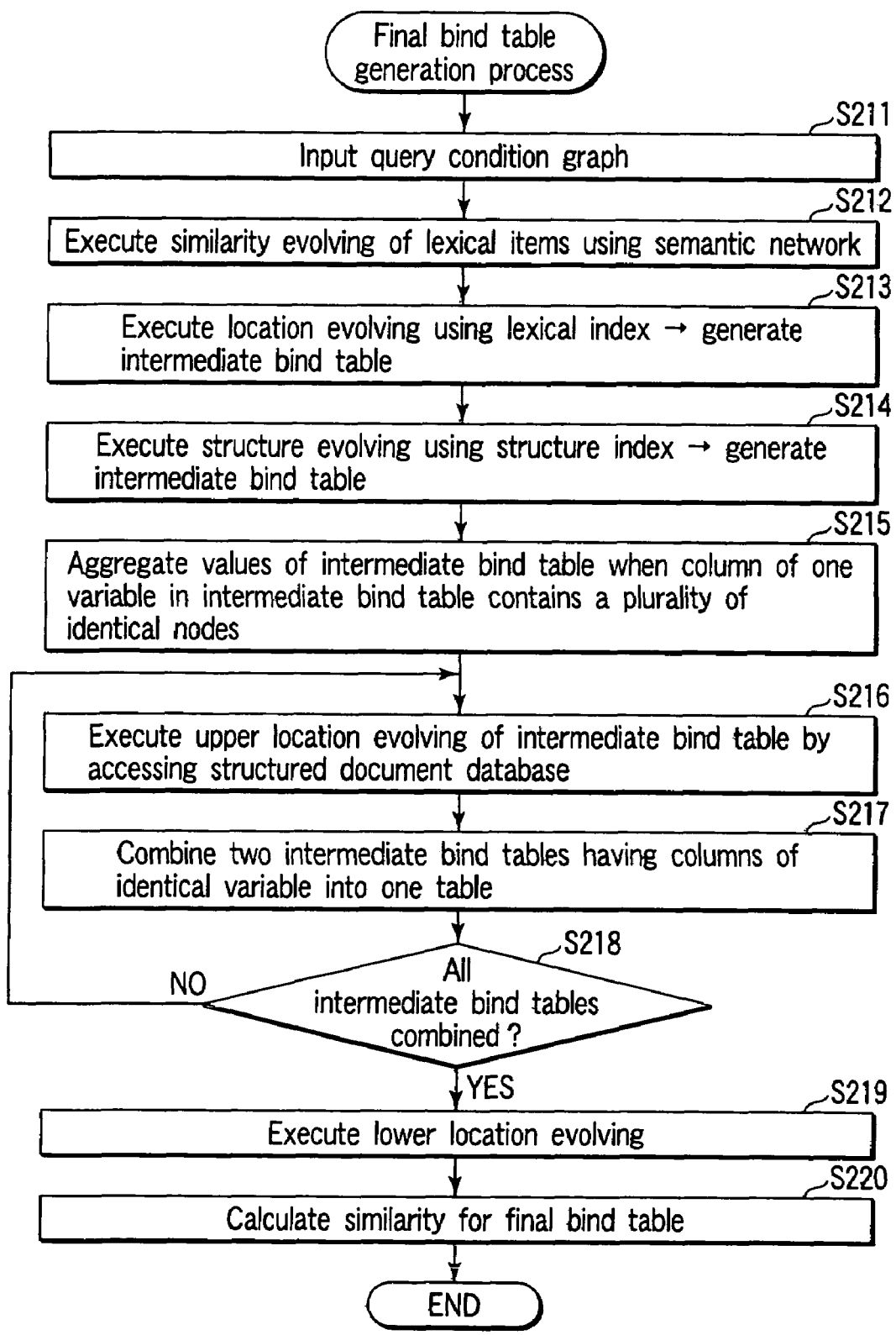
FIG. 76 are flow charts for explaining the processing operation of an operator applying device.

The processing operation of the operator applying device 211 will be described in more detail below with reference to the flow charts shown in FIGS. 76, taking the query of similar object retrieval shown in FIG. 66 as an example.

Figure 77:
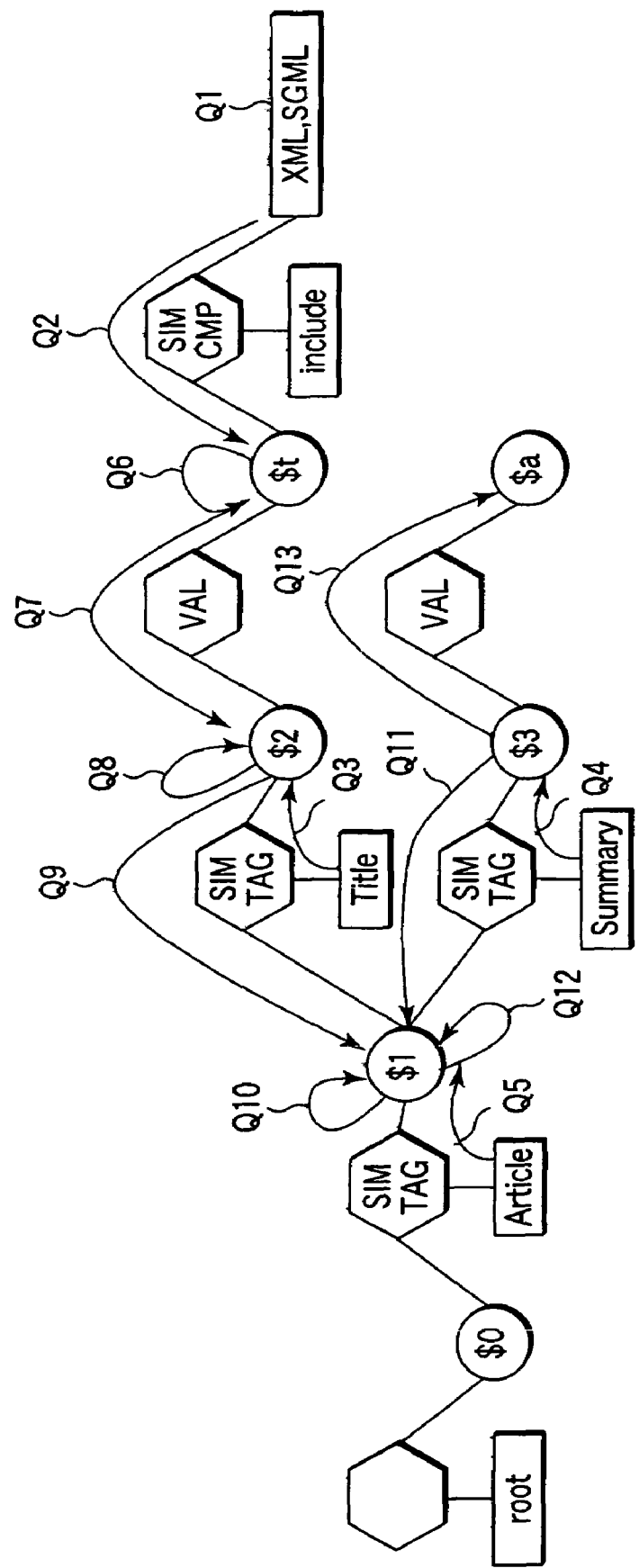
FIG. 77 is a view for explaining the processing sequence for a query condition graph.

FIG. 77 shows the processing sequence (steps Q1 to Q12) for the query condition graph. The following description will be made also with reference to FIG. 77 as needed.

If the query condition graph shown in FIG. 67 is input to the operator applying device 211 (step S211), lexical items (words) similar to those corresponding to component names (tag names) and component values designated in the retrieval condition are detected using the semantic network. More specifically, similarity evolving of lexical items is executed (step S212, step Q1 in FIG. 77). FIG. 78 shows the result of similarity evolving.

As shown in FIG. 78, lexical items ("XML", "SGML" and lexical items similar to "XML, SGML") and their lexical weights, and lexical items ("title", "article", and "summary" and lexical items (tag names) similar to tag names "title", "article", and "summary") and their lexical weights are obtained. In this case, a pair of a lexical item and its lexical weight forms one record.

In each table shown in FIG. 78, a column corresponds to one bind table.

Then, location evolving is done for lexical items similar to "XML, SGML" and their lexical weights using the lexical index (step S213).

Since the structured document database exemplified in this embodiment has a simple structure, as shown in FIG. 60, nodes where lexical items and tag names are present can be easily detected from only the structure of the database shown in FIG. 60 without referring to the lexical index. Hence, an explanation will be given with reference to FIG. 60.

Upon searching the lexical index, components where lexical item "XML" is present correspond to nodes with object IDs "#13", "#14", . . . , "#55". Hence, pairs of these nodes and similarity values are listed. As for other lexical items, pairs of nodes where these lexical items are present and the similarity values are listed, thus generating intermediate bind table B1 shown in FIG. 79. Intermediate bind table B1 lists candidates of variable "$t" in the query condition graph (step Q2 in FIG. 77).

The query of similar object retrieval shown in FIG. 66 designates components "title", "summary", "article", and the like.

For these components, structure evolving is done using the structure index (step S214).

As can be seen from a result of similarity evolving for "title" (see FIG. 78), nodes of components having tag name "title" and tag names similar to "title" are "#13", "#22", "#31", . . . , "#45". Hence, pairs of these nodes and similarity values are listed to generate intermediate bind table B2 shown in FIG. 80. Such process for generating the intermediate bind table is structure evolving. Intermediate bind table B3 lists candidates of variable "$2" in the query condition graph (step Q3 in FIG. 77).

As can be seen from a result of similarity evolving for "summary" (see FIG. 78), nodes of components having tag name "summary" and tag names similar to "summary" are "#14", "#46", "#58", and "#32". Hence, pairs of these nodes and similarity values are listed to generate intermediate bind table B3 shown in FIG. 81. Intermediate bind table B3 lists candidates of variable "$3" in the query condition graph (step Q4 in FIG. 77).

As can be seen from a result of similarity evolving for "article" (see FIG. 78), nodes of components having tag name "article" and tag names similar to "article" are "#10", "#51", "#41", and "#30". Hence, pairs of these nodes and similarity values are listed to generate intermediate bind table B4 shown in FIG. 82. Intermediate bind table B4 lists candidates of variable "$1" in the query condition graph (step Q5 in FIG. 77).

Figure 83:
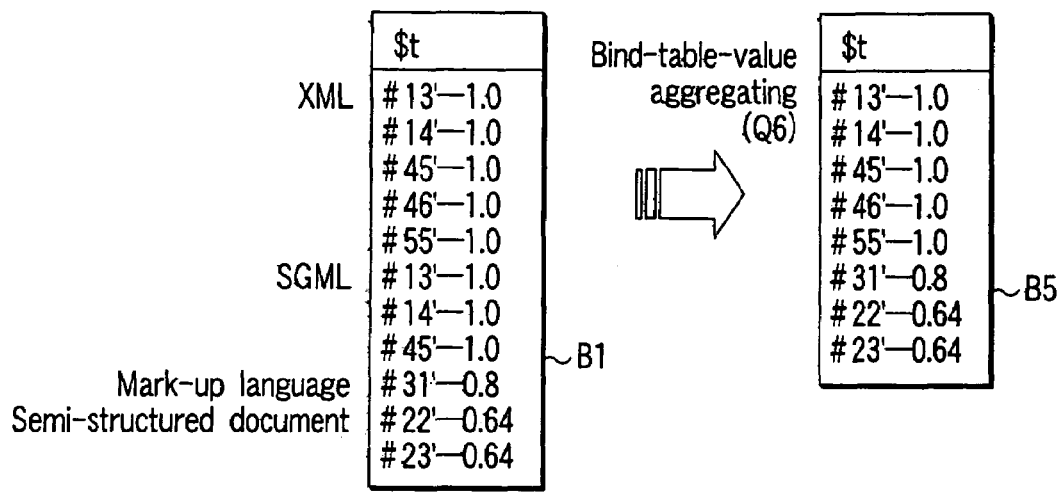
FIG. 83 is a view for explaining a bind table value aggregating process for intermediate bind table B1.

After the above processes, upon scanning intermediate bind table B1 shown in FIG. 79, a column of variable "$t" includes a plurality of records of identical nodes (e.g., "#13" and "#45"). Hence, the bind-table-value-aggregating device 216 aggregates the values of intermediate bind table B1 to generate new intermediate bind table B5, as shown in FIG. 83 (step S215, step Q6 in FIG. 77).

That is, if a plurality of records of an identical node are found, similarity values are re-calculated to aggregate them into one record. In the similarity calculation in this case, the maximum value of similarity values of respective records is selected.

Then, upper location evolving is done for intermediate bind table B5 corresponding to variable "$t" (step S216).

Figure 84:
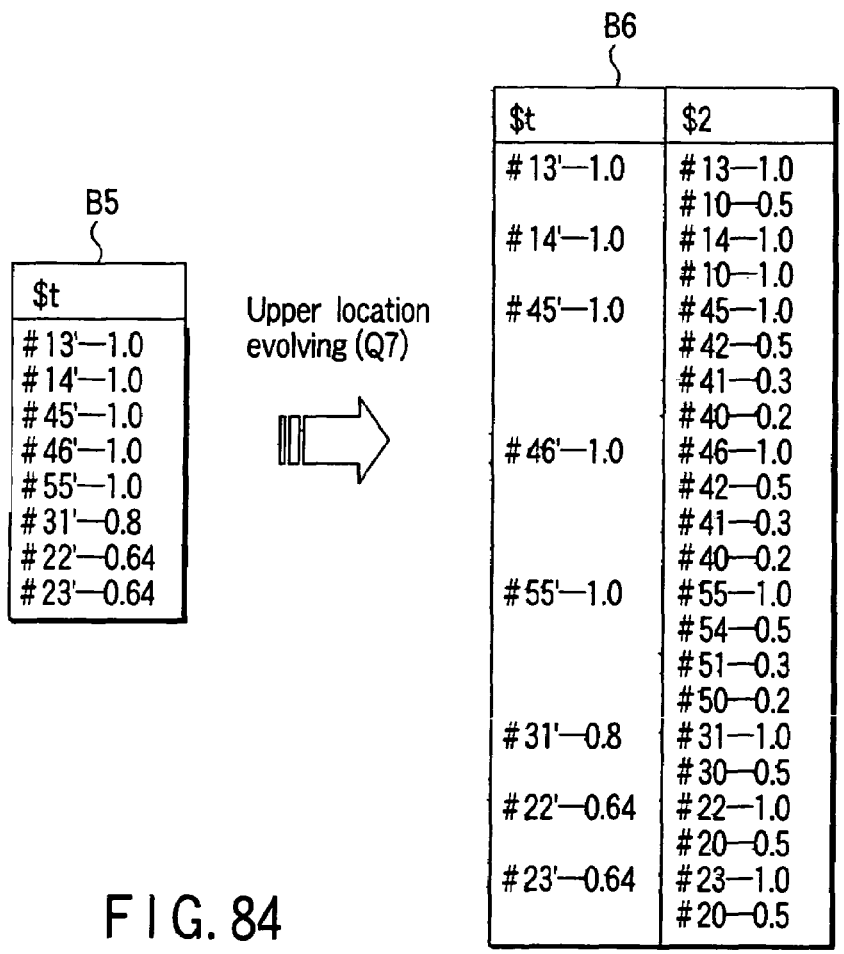
FIG. 84 is a view for explaining an upper location evolving process for intermediate bind table B5.

The upper location evolving device 218 traces from the node position of each record in the structured document database to its parent node and further to its parent node with reference to records in intermediate bind table B5, thus acquiring those nodes. The device 218 sets these acquired nodes as candidates of variable "$2" in the query condition graph, and generates new intermediate bind table B6, as shown in FIG. 84 (step Q7 in FIG. 77).

For example, as for a record of node "#13'" in bind table B5, "#10" as its parent node (a parent node one level higher than node "#13") is obtained from its node position "#13" in the structured document database. Furthermore, if a parent node of node "#10"(a parent node two levels higher than node "#13") is present, the object ID of that parent node is also acquired. Note that "root" node "#1" is excluded.

For example, in case of a record of node "#45'" in bind table B5, "#42" as its parent node (a parent node one level higher than node "#45"), "#41" as a parent node of node "#42" (a parent node two levels higher than node "#45"), and "#40" as a parent node of node "#41" (a parent node three levels higher than node "#45") are obtained from its node position "#45" in the structured document database. Since a parent node of node "#40" is "#1", no more nodes are acquired.

Upon executing upper and lower location evolving processes, the aforementioned similarity value associated with the structure (see FIG. 75) is used as that for each obtained node.

As can be seen from the query in FIG. 66, since variable "$t" is defined as values of a component having the "title" tag in the retrieval condition (corresponding to A4 in FIG. 67), the similarity value associated with the structure is applied. As a result, if a node corresponding to variable "$2" is equal to that corresponding to variable "$t", the node corresponding to variable "$t" is given "1.0/1=1.0" as the similarity value associated with the structure; if the node corresponding to variable "$2" is a parent node one level higher than the node corresponding to variable "$t", the node corresponding to variable "$t" is given "1.0/2=0.5"; if the node corresponding to variable "$2" is a parent node two levels higher than the node corresponding to variable "$t", the node corresponding to variable "$t" is given "1.0/3=0.3", . . . .

In this node, for each record in bind table B5, a parent node one level higher than the corresponding node, a parent node two levels higher than that node, a parent node three levels higher than that node, . . . are obtained in turn, and pairs of these nodes and similarity values associated with the structure are recorded. A column of variable "$2" in intermediate bind table B6 lists candidates of variable "$2" in the query condition graph (step Q7 in FIG. 77).

Upon generation of intermediate bind table B6, since this intermediate bind table B6 and intermediate bind table B2 have columns of identical variable "$2", the bind table combining device 217 combines these two intermediate bind tables into one table (step S217).

As shown in FIG. 85, combining operations are made for common columns of variable "$2". This operation is nearly the same as combining (JOIN) operation of a normal database, except that similarity values are multiplied.

For example, of records in intermediate bind table B6, the similarity values are recalculated (similarity values corresponding to identical nodes in the columns of variable "$2" of both the intermediate bind tables are multiplied with each other). And by extracting identical nodes in the columns of variable "$2" of both the intermediate bind tables, new intermediate bind table B7 is generated (step Q8 in FIG. 77).

Intermediate bind table B7 then undergoes upper location evolving, to generate new intermediate bind table B8 (see FIG. 86) by adding a column which lists nodes that become candidates of variable "$1" in the query condition graph (step S216, step Q9 in FIG. 77).

The similarity values associated with the structure of nodes listed as candidates of variable "$1" will be briefly explained below.

As can be seen from the query in FIG. 66, a component having the "title" tag is designated as a child component one level lower than a component having the "article" tag in the retrieval condition (corresponding to A2 in FIG. 67). Therefore, the similarity value associated with the structure is applied, and if a node corresponding to variable "$2" is a parent node one level higher than the node corresponding to variable "$1", the node corresponding to variable sz"$1" is given "1.0/1=1.0"; if the node corresponding to variable "$2" is a parent node two levels higher than the node corresponding to variable "$1", the node corresponding to variable "$1" is given "1.0/2=0.5", . . . .

Figure 86:
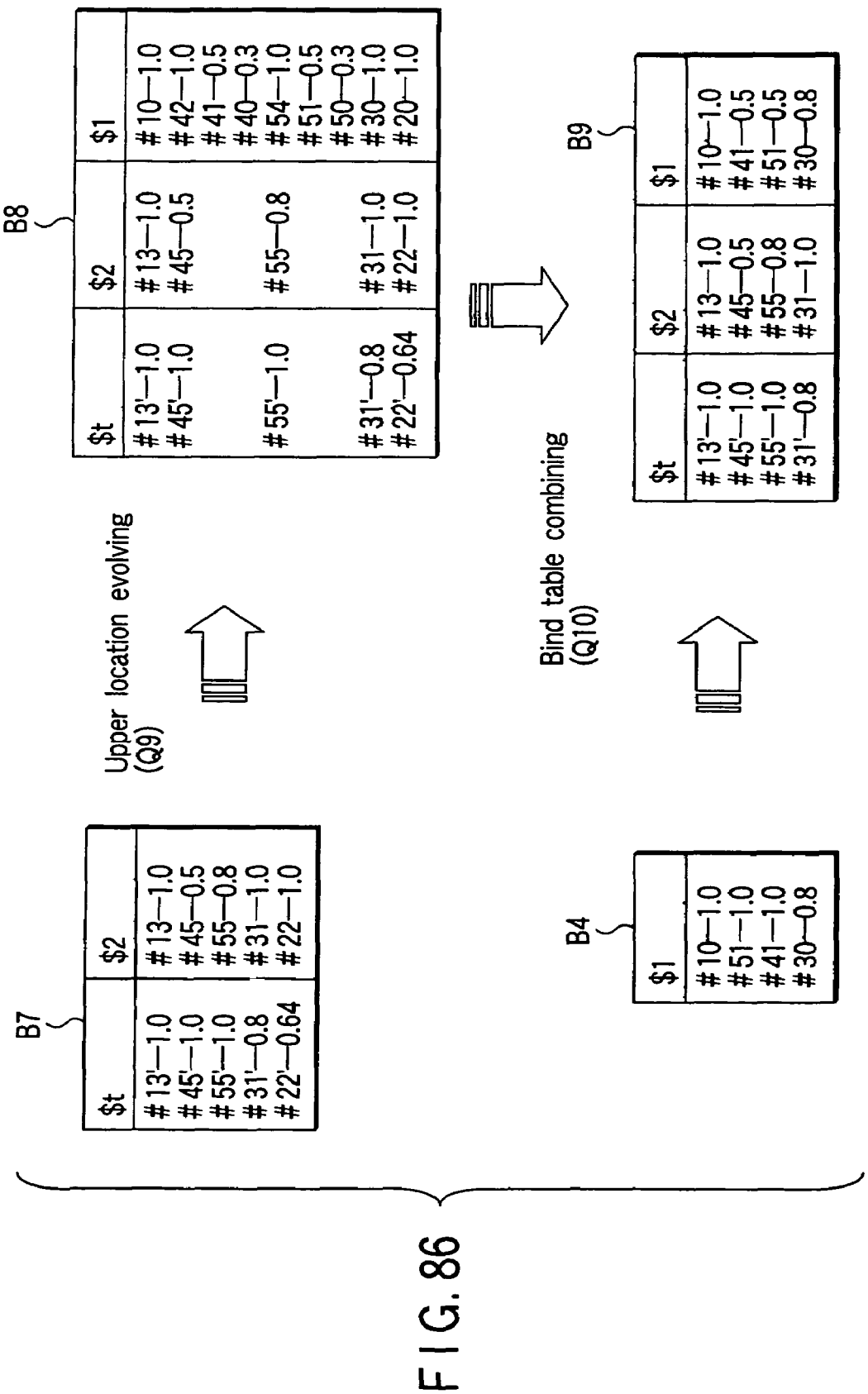
FIG. 86 is a view for explaining a process for executing an upper location evolving process for intermediate bind table B7, and generating intermediate bind table B9 by combining that table with intermediate bind table B4.

Upon generation of intermediate bind table B8, this intermediate bind table B8 and intermediate bind table B4 have columns of identical variable "$1". Hence, the bind table combining device 217 combines these two intermediate bind tables into one table to generate new intermediate bind table B9, as shown in. FIG. 86 (step S217, step Q10 in FIG. 77).

On the other hand, as can be seen from the query condition graph in FIG. 77, a condition for upstream components is designated for variable "$3". Hence, intermediate bind table B3 having the column of variable "$3" undergoes upper location evolving (step S216). As a result, as shown in FIG. 87, new intermediate bind table B10 having a column of variable "$1" is generated (step Q11 in FIG. 77).

Upon generation of intermediate bind table B10, this intermediate bind table B10 and intermediate bind table B9 have columns of identical variable "$1". Hence, the bind table combining device 217 combines these two intermediate bind tables into one table to generate new intermediate bind table B11, as shown in FIG. 87 (step S217, step Q12 in FIG. 77).

Figure 88:
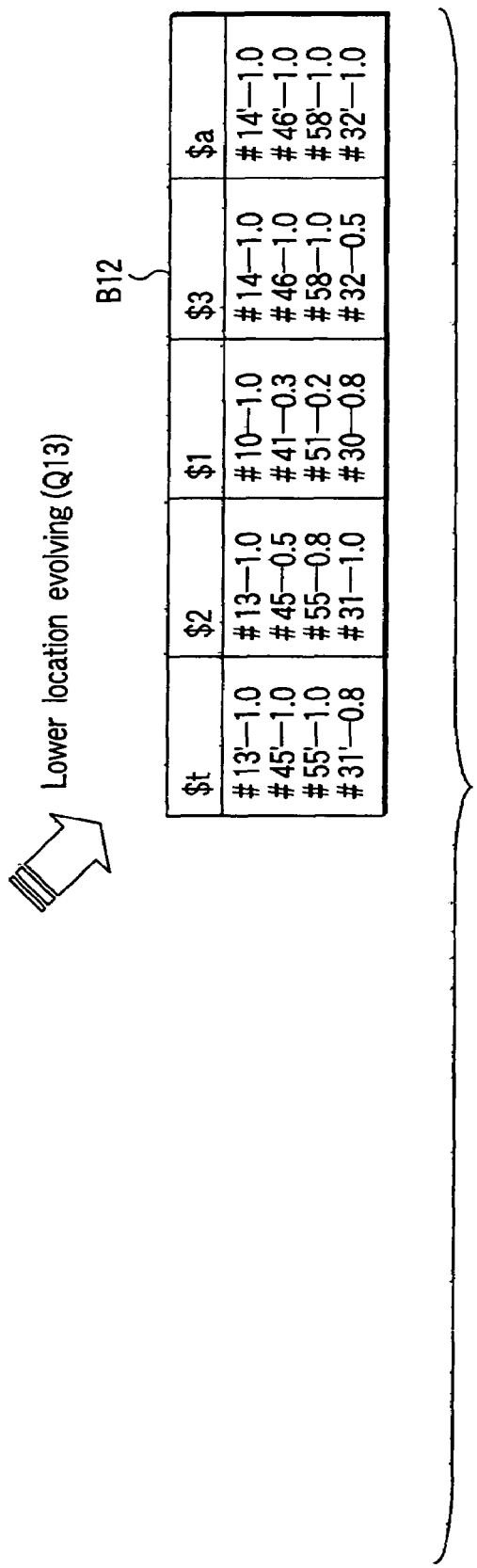
FIG. 88 is a view for explaining a lower location evolving process for intermediate bind table B11.

With this process, all the intermediate bind tables are combined into one table (step S218). In order to add a column of variable "$a" present in the query condition graph in FIG. 77 to intermediate bind table B11, intermediate bind table B11 undergoes lower location evolving by the lower location evolving device 219 (step S219), as shown in FIG. 88.

The lower location evolving device 219 traces downstream from a node position of each record of the structured document database to its child node and further to its child node with reference to the values (object IDs of nodes) in the column of variable "$3" of respective records in intermediate bind table B11, thus acquiring corresponding nodes. The device 219 sets these acquired nodes as candidates of variable "$a" in the query condition graph, and generates new intermediate bind table B12, as shown in FIG. 88 (step Q13 in FIG. 77).

For example, for a record of node "#14"' in bind table B11, only the corresponding node position "#14" in the structured document database is obtained (there is no child node one level lower than node "#14").

As can be seen from the query in FIG. 66, since variable "$a" is defined as a value of a component having the "summary" tag in the retrieval condition (corresponding to A5 in FIG. 67), the similarity value associated with the structure is applied. Then, if a node corresponding to variable "$a" is equal to a node corresponding to variable "$3", the node corresponding to variable "$a" is given "1.0/1=1.0" as the similarity value associated with the structure; if the node corresponding to variable "$a" is a child node one level lower than the node corresponding to variable "$3", the node corresponding to variable "$a" is given "1.0/2=0.5", . . . .

Therefore, node "#14" listed as a candidate of variable "$a" is set with "1.0/1" as the similarity value associated with the structure.

Since columns of all variables are combined in new intermediate bind table B12, no more basic operators can be applied. Therefore, intermediate bind table B12 is output as a final bind table.

The final bind table records combinations of pairs of locations and similarity values of all the variables, and one row of the final bind table corresponds to one structured document. Of nodes which form a document object tree of a structured document, only nodes corresponding to respective variables are listed in one row of the final bind table.

Finally, the final bind table undergoes a final similarity calculation (step S220). As shown in FIG. 89, similarity value "$sim" is calculated by multiplying the similarity values of all columns corresponding to respective variables in the final bind table for respective structured documents. The calculated value is rounded off to one decimal place for the sake of simplicity.

The final bind table, which includes final similarity values, as shown in, e.g., FIG. 89, is passed from the operator applying device 211 to the output processing device 205.

The XML output processing device 221 of the output processing device 205 generates an XML document of a retrieval result shown in FIG. 90 based on the final bind table using the query output graph shown in FIG. 68.

That is, a template below node "Repeat" in the query output graph is repetitively applied to four records in the final bind table. In this case, since the number of records is four, the template is repetitively applied four times.

In the XML document of the retrieval result shown in FIG. 90, similarity value "$sim" in the final bind table is displayed using attribute "score".

For example, a record in the first row in FIG. 89 corresponds to an XML document of "article" information shown in FIG. 61. According to the query output graph, only node "#13" corresponding to variable "$t" and node "#14" corresponding to variable "$a" of those which form a document object tree of this "article" information are extracted. The values of components having tag names "title" and "summary", which correspond to these nodes (#13, #14), are respectively set as values of components having tag names "TITLE" and "ABST", and these components are set as child components of a component having tag name "PAPER".

The sorting device 222 sorts the above four records using similarity values "$sim". In this case, as show in FIG. 90 <PAPER score="1.0"> as the first record is retrieved as a structured document having the highest similarity in lexical and structural terms. Other records are nearly the same.

Another calculation method of similarity value "$sim" for the final bind table will be explained. In the above description, the similarity values of all columns in one record are multiplied with each other to obtain a similarity value for each record (corresponding to one structured document). Alternatively, the minimum value of the similarity values of all columns in one record may be used as the similarity value of that record.

Also, the similarity value associated with the structure may be calculated by "1/(the number of levels+1)" in place of "1/the number of levels" described with reference to FIG. 75. In this way, a similarity value associated with a lexical item becomes stronger than that associated with the structure, and the retrieval result changes, as shown in FIG. 91.

In the retrieval result shown in FIG. 91, the second and fourth XML data (structured document) positions in the retrieval result shown in FIG. 90 replace each other.

As described above, according to the above embodiment, the query condition graph and query output template are generated from the query of similar object retrieval. The query condition graph schematizes a retrieval condition obtained by relaxing that contained in the query to a similar object range of lexical items (as component names and component values) designated in the retrieval condition and locations they are present in the document structure (logical structure). The retrieval request processing device 3 retrieves structured documents based on this query condition graph. That is, in the retrieval request processing device 3, (a) structured documents which include components designated by the retrieval condition or components similar to those components, and lexical items (words) designated by the retrieval condition or lexical items (words) similar to those lexical items are retrieved from structured documents stored in the structured document database (similarity evolving, location evolving, structure evolving). (b) From the retrieved structured documents, structured documents in which the locations of the lexical items (words) and components are those designated by the retrieval condition or those similar to the designated locations are retrieved (upper location evolving, lower location evolving, bind-table combing).

In this way, by adding only the semantic network used to search for similar words of component names (tag names) and lexical items designated by the query, structured documents which include not only components and lexical items within a similar object range of those designated by the retrieval condition but also have similar locations of components and lexical items on the document structure can be easily retrieved.

Also, only partial components of the retrieved structured documents can be extracted based on the query output graph, and can be output as a retrieval result.

The query as shown in FIG. 66 is a query including a retrieval condition including first desired words (e.g. XML, SGML), one first desired component (e.g. component "title") including a value in which the desired words are included, and one second desired component (e.g. component "article") including the first desired component.

According to the embodiment described above, when the retrieval condition described in the query as shown in FIG. 66, is inputted in the similar object retrieval device 201, first of all, (a) a plurality of second desired words each being similar to the first desired words are detected by the similarity evolving. (b) A plurality of third desired components each being similar to the first desired component are detected in the hierarchical structure, by the similarity evolving and structure evolving. (c) A plurality of fourth desired components each being similar to the second desired component are detected in the hierarchical structure, by the similarity evolving and structure evolving. (d) A plurality of first components each including a value in which at least one of the first desired words and the second desired words is included, from the structured-document-database by the location evolving and the bind table value-aggregating. (e) A plurality of second components each corresponding to one of the first desired component and the third desired components and including or corresponding to one of the first components are detected from the structured-document-database, by upper location evolving and the bind table combing. (f) A plurality of third components each corresponding to one of the second desired component and the fourth desired components and including or corresponding to one of the second components are detected from the structured-document-database by upper location evolving and the bind table combing. Then, (g) a plurality of desired structured documents each including one of the third components can be extracted from the structured-document-database. Each document structure of the retrieved desired structured documents is equal/similar to that designated in the retrieval condition and words included in each of the retrieved desired structured documents and the components in which the words included are equal/similar to those designated in the retrieval condition.

Another embodiment in the case that the retrieval condition further includes a third desired component that is included in the second desired component and includes a value in which the desired words is included will be described below briefly. That is, when a retrieval condition including one first desired word, a first desired component, a second desired component, and a third desired component, each of the first and second desired components including a value in which the first desired word is included, the third desired component including both the first and the second components, is inputted (in the similar object retrieval device 201), first of all, as mentioned above, (a) a plurality of second desired words each being similar to the first desired word are acquired by the similarity evolving. (b) A plurality of fourth desired components each being similar to the first desired component are detected in the hierarchical structure by the similarity evolving and structure evolving. (c) A plurality of sixth desired components each being similar to the third desired component are detected in the hierarchical structure by the similarity evolving and structure evolving. (d) A plurality of first component each including a value in which at least one of the first desired word and the second desired words is included are detected by the location evolving and bind table value-aggregating. (e) A plurality of second component each corresponding to one of the first desired component and the fourth desired components and including or corresponding to the first component are detected by the upper location evolving and the bind table combing. (f) A plurality of third component each corresponding to one of the second desired component and the fifth desired components and including or corresponding to the second component are detected by the upper location evolving and the bind table combing. (g) A plurality of fourth components each corresponding to one of the third desired component and the sixth desired components and including or corresponding to one of the second components and one of the third components are detected by the upper location evolving and the bind table combing. Then, (h) a plurality of desired structured documents each including one of the fourth components can be extracted from the structured-document-database.

Note that the method of the present invention described in the embodiments of the present invention can be distributed by storing the method as a program that can be executed by a computer in a recording medium such as a magnetic disk (floppy disk, hard disk, or the like), optical disk (CD-ROM, DVD, or the like), semiconductor memory, or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the method comprising:
inputting at least a retrieval condition including at least one first desired word, and at least one first desired component including a value in which the first desired word is included;
detecting a plurality of second desired components each being similar to the first desired component, in the hierarchical structure;
detecting a plurality of first components each including a value in which the first desired word is included, from the structured-document-database;
detecting a plurality of second components each corresponding to one of the first desired component and the second desired components and including or corresponding to one of the first components, from the structured-document-database; and
extracting a plurality of desired structured documents each including one of the second components, from the structured-document-database.

2. A method for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the method comprising:
inputting at least a retrieval condition including at least one first desired word, and at least one first desired component including a value in which the first desired word is included;
acquiring a plurality of second desired words each being similar to the first desired word;
detecting a plurality of first components each including a value in which at least one of the first desired word and the second desired words is included, from the structured-document-database;
detecting a plurality of second components each corresponding to the first desired component and including or corresponding to one of the first components, from the structured-document-database; and
extracting a plurality of desired structured documents each including one of the second components, from the structured-document-database.

3. A method for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the method comprising:
inputting at least a retrieval condition including at least one first desired word, at least one first desired component including a value in which the first desired word is included, and at least one second desired component including the first desired component;
detecting a plurality of third desired components each being similar to the first desired component, in the hierarchical structure;
detecting a plurality of fourth desired components each being similar to the second desired component, in the hierarchical structure;
detecting a plurality of first components each including a value in which the first desired word is included, from the structured-document-database;
detecting a plurality of second components each corresponding to one of the first desired component and the third desired components and including or corresponding to one of the first components, from the structured-document-database;
detecting a plurality of third components each corresponding to one of the second desired component and the fourth desired components and including or corresponding to one of the second components, from the structured-document-database; and
extracting a plurality of desired structured documents each including one of the third components, from the structured-document-database.

4. A method for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the method comprising:
inputting at least a retrieval condition including at least one first desired word, at least one first desired component including a value in which the first desired word is included, and at least one second desired component including the first desired component;
acquiring a plurality of second desired words each being similar to the first desired word;
detecting a plurality of first components each including a value in which at least one of the first desired word and the second desired words is included, from the structured-document-database;
detecting a plurality of second components each corresponding to the first desired component and including or corresponding to one of the first components, from the structured-document-database;
detecting a plurality of third components each corresponding to the second desired component and including or corresponding to one of the second components, from the structured-document-database; and
extracting a plurality of desired structured documents each including one of the third components, from the structured-document-database.

5. A method for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the method comprising:
inputting at least one retrieval condition including at least one first desired word, a first desired component, a second desired component, and a third desired component, each of the first and second desired components including a value in which the first desired word is included, the third desired component including both the first and the second components;

detecting a plurality of fourth desired components each being similar to the first desired component, in the hierarchical structure;
detecting a plurality of fifth desired components each being similar to the second desired component, in the hierarchical structure;
detecting a plurality of sixth desired components each being similar to the third desired component, in the hierarchical structure;
detecting a plurality of first components each including a value in which the first desired word is included, from the structured-document-database;
detecting a plurality of second components each corresponding to one of the first desired component and the fourth desired components and including or corresponding to one of the first components, from the structured-document-database;
detecting a plurality of third components each corresponding to one of the second desired component and the fifth desired components and including or corresponding to one of the first components, from the structured-document-database;
detecting a plurality of fourth components each corresponding to one of the third desired component and the sixth desired components and including or corresponding to one of the second components and one of the third components, from the structured-document-database; and
extracting a plurality of desired structured documents each including one of the fourth components, from the structured-document-database.

6. A method for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the method comprising:
inputting at least one retrieval condition including at least one first desired word, a first desired component, a second desired component, and a third desired component, each of the first and second desired components including a value in which the first desired word is included, the third desired component including both the first and the second components;
acquiring a plurality of second desired words each being similar to the first desired word;
detecting a plurality of first components each including a value in which at least one of the first desired word and the second desired words is included, from the structured-document-database;
detecting a plurality of second components each corresponding to the first desired component and including or corresponding to one of the first components, from the structured-document-database;
detecting a plurality of third components each corresponding to the second desired component and including or corresponding to one of the first components, from the structured-document-database;
detecting a plurality of fourth components each corresponding to the third desired component and including or corresponding to one of the second components and one of the third components, from the structured-document-database; and
extracting a plurality of desired structured documents each including one of the fourth components, from the structured-document-database.

7. An apparatus for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the apparatus comprising:
a processor; and
a memory;
wherein the processor executes instructions in the memory to:
input at least one retrieval condition including at least one first desired word, and at least one first desired component including a value in which the first desired word is included;
detect a plurality of second desired components each being similar to the first desired component, in the hierarchical structure;
retrieve a plurality of first structured documents each including at least one first component including a value in which the first desired word is included, from the structured-document-database; and
retrieve a plurality of second structured documents each including a second component corresponding to one of the first desired component and the second desired components and including or corresponding to the first component, from the first structured documents.

8. An apparatus for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the apparatus comprising:
a processor; and
a memory;
wherein the processor executes instructions in the memory to:
input at least one retrieval condition including at least one first desired word, and at least one first desired component including a value in which the first desired word is included;
acquire a plurality of second desired words each being similar to the first desired word;
retrieve a plurality of first structured documents each including at least one first component including a value in which at least one of the first desired word and the second desired words is included, from the structured-document-database; and
retrieve a plurality of second structured documents each including a second component corresponding to the first desired component and including or corresponding to the first component, from the first structured documents.

9. An apparatus for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the apparatus comprising:
- a processor; and
- a memory;
- wherein the processor executes instructions in the memory to:
  - input at least a retrieval condition including at least one first desired word, at least one first desired component including a value in which the first desired word is included, and at least one second desired component including the first desired component;
  - detect a plurality of third desired components each being similar to the first desired component, in the hierarchical structure;
  - detect a plurality of fourth desired components each being similar to the second desired component, in the hierarchical structure;
  - detect a plurality of first components each including a value in which the first desired word is included, from the structured-document-database;
  - detect a plurality of second components each corresponding to one of the first desired component and the third desired components and including or corresponding to one of the first components, from the structured-document-database;
  - detect a plurality of third components each corresponding to one of the second desired component and the fourth desired components and including or corresponding to one of the second components, from the structured-document-database; and
  - extract a plurality of desired structured documents each including one of the third components, from the structured-document-database.

10. An apparatus for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the apparatus comprising:
- a processor; and
- a memory;
- wherein the processor executes instructions in the memory to:
  - input at least a retrieval condition including at least one first desired word, at least one first desired component including a value in which the first desired word is included, and at least one second desired component including the first desired component;
  - acquire a plurality of second desired words each being similar to the first desired word; p2 detect a plurality of first components each including a value in which at least one of the first desired word and the second desired words is included, from the structured-document-database;
  - detect a plurality of second components each corresponding to the first desired component and including or corresponding to one of the first components, from the structured-document-database;
  - detect a plurality of third components each corresponding to the second desired component and including or corresponding to one of the second components, from the structured-document-database; and
  - extract a plurality of desired structured documents each including one of the third components, from the structured-document-database.

11. An apparatus for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the apparatus comprising:
- a processor; and
- a memory;
- wherein the processor executes instructions in the memory to:
  - input at least one retrieval condition including at least one first desired word, a first desired component, a second desired component, and a third desired component, each of the first and second desired components including a value in which the first desired word is included, the third desired component including both the first and the second components;
  - detect a plurality of fourth desired components each being similar to the first desired component, in the hierarchical structure;
  - detect a plurality of fifth desired components each being similar to the second desired component, in the hierarchical structure;
  - detect a plurality of sixth desired components each being similar to the third desired component, in the hierarchical structure;
  - detect a plurality of first components each including a value in which the first desired word is included, from the structured-document-database;
  - detect a plurality of second component each corresponding to one of the first desired component and the fourth desired components, and including or corresponding to one of the first components, from the structured-document-database;
  - detect a plurality of third components each corresponding to one of the second desired component and the fifth desired components, and including or corresponding to one of the first components, from the structured-document-database;
  - detect a plurality of fourth components each corresponding to one of the third desired component and the sixth desired components, and including or corresponding to one of the second components and one of the third components, from the structured-document-database; and
  - extract a plurality of desired structured documents each including one of the fourth components, from the structured-document-database.

12. An apparatus for retrieving structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the apparatus comprising:

a processor; and a memory;

wherein the processor executes instructions in the memory to:

input at least one retrieval condition including at least one first desired word, a first desired component, a second desired component, and a third desired component, each of the first and second desired components including a value in which the first desired word is included, the third desired component including both the first and the second components;

acquire a plurality of second desired words each being similar to the first desired word;

detect a plurality of first components each including a value in which at least one of the first desired word and the second desired words is included, from the structured-document-database;

detect a plurality of second components each corresponding to the first desired component, and including or corresponding to one of the first components, from the structured-document-database;

detect a plurality of third components each corresponding to the second desired component, and including or corresponding to one of the first components, from the structured-document-database;

detect a plurality of fourth components each corresponding to the third desired component, and including or corresponding to one of the second components and one of the third components, from the structured-document-database; and extract a plurality of desired structured documents each including one of the fourth components, from the structured-document-database.

13. A computer program stored on a computer readable medium, to instruct a computer to retrieve structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the computer program comprising:

first program instruction means for instructing a computer processor to receive at least one retrieval condition including at least one first desired word, and at least one first desired component including a value in which the first desired word is included;

second program instruction means for instructing a computer processor to detect a plurality of second desired components each being similar to the first desired component, in the hierarchical structure;

third program instruction means for instructing a computer processor to retrieve a plurality of first structured documents each including at least one first component including a value in which the first desired word is included, from the structured-document-database; and fourth program instruction means for instructing a computer processor to retrieve a plurality of second structured documents each including a second component corresponding to one of the first desired component and the second desired components and including or corresponding to the first component, from the first structured documents.

14. A computer program stored on a computer readable medium, to instruct a computer to retrieve structured documents from a structured-documents-database having a hierarchical structure and storing a plurality of structured documents each having a document structure and a plurality of data items, each of the document structures being constructed by a plurality of components, each of the component constructing the hierarchical structure, and each of the data items being stored in the structured-documents-database as a value included in one of the components, the computer program comprising:

first program instruction means for instructing a computer processor to receive at least one retrieval condition including at least one first desired word, and at least one first desired component including a value in which the first desired word is included;

second program instruction means for instructing a computer processor to acquire a plurality of second desired words each being similar to the first desired word;

third program instruction means for instructing a computer processor to retrieve a plurality of first structured documents each including at least one first component including a value in which at least one of the first desired word and the second desired words is included, from the structured-document-database; and fourth program instruction means for instructing a computer processor to retrieve a plurality of second structured documents each including a second component corresponding to the first desired component and including or corresponding to the first component, from the first structured documents.

* * * * *

UNITED STATES PATENT AND TRADEMARK OFFICE
CERTIFICATE OF CORRECTION

| | |
|---|---|
| PATENT NO. | : 7,293,018 B2 |
| APPLICATION NO. | : 10/973869 |
| DATED | : November 6, 2007 |
| INVENTOR(S) | : Hattori et al. |

It is certified that error appears in the above-identified patent and that said Letters Patent is hereby corrected as shown below:

Title page, item (57), in the Abstract, line 5, change "acquirers" to --acquires--.

\* Claim 10, column 45, line 59, delete "p2" and insert a paragraph break.

Claim 11, column 46, line 41, change "component" to --components--.

Signed and Sealed this

Eighteenth Day of March, 2008

JON W. DUDAS
*Director of the United States Patent and Trademark Office*